United States Patent
Lee et al.

(10) Patent No.: US 12,382,475 B2
(45) Date of Patent: Aug. 5, 2025

(54) METHOD AND APPARATUS FOR ENHANCING COVERAGE OF MACHINE TYPE COMMUNICATION (MTC) DEVICES

(71) Applicant: INTERDIGITAL PATENT HOLDINGS, INC., Wilmington, DE (US)

(72) Inventors: Moon-il Lee, Melville, NY (US); Janet A. Stern-Berkowitz, Little Neck, NY (US); Nobuyuki Tamaki, Melville, NY (US); John W. Haim, Baldwin, NY (US); Pouriya Sadeghi, San Diego, CA (US); Marian Rudolf, Montreal (CA); Shahrokh Nayeb Nazar, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 5 days.

(21) Appl. No.: 17/462,927

(22) Filed: Aug. 31, 2021

(65) Prior Publication Data
US 2022/0022163 A1    Jan. 20, 2022

Related U.S. Application Data

(63) Continuation of application No. 16/192,486, filed on Nov. 15, 2018, now Pat. No. 11,109,351, which is a continuation of application No. 14/046,173, filed on Oct. 4, 2013, now Pat. No. 10,142,962.
(Continued)

(51) Int. Cl.
*H04L 1/18* (2023.01)
*H04B 17/318* (2015.01)
(Continued)

(52) U.S. Cl.
CPC .......... *H04W 72/30* (2023.01); *H04B 17/318* (2015.01); *H04L 1/1819* (2013.01);
(Continued)

(58) Field of Classification Search
CPC ..... H04L 1/1819; H04L 1/189; H04L 5/0055; H04L 5/0053; H04W 24/02; H04W 4/02;
(Continued)

(56) References Cited

U.S. PATENT DOCUMENTS 7,382,832 B2    6/2008 Magee et al.
7,765,497 B2    7/2010 Cheng et al.
(Continued)

FOREIGN PATENT DOCUMENTS

CN    101771951    7/2010
EP    2 495 887    9/2012
(Continued)

OTHER PUBLICATIONS

Alcatel-Lucent et al., "Feasibility of coverage extension of physical channels for MTC devices," 3GPP TSG-RAN WG1 Meeting #72, R1-130462, St Julian's, Malta (Jan. 28-Feb. 1, 2013).
(Continued)

*Primary Examiner* — Mansour Oveissi
(74) *Attorney, Agent, or Firm* — VOLPE KOENIG

(57) ABSTRACT

A method and apparatus are described for a low cost machine-type-communication (LC-MTC) wireless transmit/receive unit (WTRU) to enhance coverage. An example method for physical broadcast channel (PBCH) enhancement includes receiving system information on an enhanced PBCH (ePBCH). The ePBCH is located in a set of radio frames which is a subset of available radio frames, where the subset includes fewer than all the available radio frames. The ePBCH is received in at least one radio frame of the set of radio frames. An example method for physical random access channel (PRACH) enhancement includes receiving configuration of legacy PRACH resources and enhanced PRACH (ePRACH) resources. The WTRU selects one of legacy PRACH resources or ePRACH resources based on a
(Continued)

coverage capability. Another example method for PRACH enhancement includes receiving configuration of ePRACH resources. The ePRACH resources include multiple ePRACH resource types, each ePRACH resource type being associated with a coverage capability.

11 Claims, 12 Drawing Sheets

Related U.S. Application Data

(60) Provisional application No. 61/710,315, filed on Oct. 5, 2012, provisional application No. 61/753,263, filed on Jan. 16, 2013, provisional application No. 61/807,945, filed on Apr. 3, 2013, provisional application No. 61/863,223, filed on Aug. 7, 2013.

(51) Int. Cl.
| | |
|---|---|
| *H04L 1/1812* | (2023.01) |
| *H04L 1/1867* | (2023.01) |
| *H04W 4/029* | (2018.01) |
| *H04W 4/70* | (2018.01) |
| *H04W 24/02* | (2009.01) |
| *H04W 72/30* | (2023.01) |
| *H04W 74/00* | (2009.01) |
| *H04W 4/02* | (2018.01) |
| *H04W 4/06* | (2009.01) |
| *H04W 48/12* | (2009.01) |
| *H04W 74/0833* | (2024.01) |

(52) U.S. Cl.
CPC ............. *H04L 1/189* (2013.01); *H04W 4/029* (2018.02); *H04W 4/70* (2018.02); *H04W 24/02* (2013.01); *H04W 74/006* (2013.01); *H04W 4/027* (2013.01); *H04W 4/06* (2013.01); *H04W 48/12* (2013.01); *H04W 74/0833* (2013.01); *Y02D 30/70* (2020.08)

(58) Field of Classification Search
CPC ....... H04W 4/027; H04W 4/029; H04W 4/06; H04W 4/70; H04W 48/12; H04W 72/005; H04W 72/0406; H04W 72/0413; H04W 72/042; H04W 74/006; H04W 74/0833; Y02D 30/70; H04B 17/318
See application file for complete search history.

(56) References Cited

U.S. PATENT DOCUMENTS

| | | | |
|---|---|---|---|
| 8,014,359 B2 | 9/2011 | Cave et al. | |
| 8,134,940 B2 | 3/2012 | Torsner et al. | |
| 8,229,494 B1 | 7/2012 | Kela et al. | |
| 8,400,998 B2 | 3/2013 | Kuchibhotla et al. | |
| 8,666,398 B2 | 3/2014 | Vajapeyam et al. | |
| 8,693,412 B2 | 4/2014 | Jarni et al. | |
| 9,160,555 B2 | 10/2015 | Kliger et al. | |
| 9,246,620 B2 | 1/2016 | Yang et al. | |
| 9,398,615 B1 | 7/2016 | Zhang et al. | |
| 2007/0171889 A1 | 7/2007 | Kwon et al. | |
| 2007/0211671 A1 | 9/2007 | Cha | |
| 2008/0075043 A1 | 3/2008 | Wang et al. | |
| 2008/0267126 A1 | 10/2008 | Vujcic et al. | |
| 2009/0088160 A1 | 4/2009 | Pani et al. | |
| 2009/0135769 A1 | 5/2009 | Sambhwani et al. | |
| 2009/0257408 A1 | 10/2009 | Zhang et al. | |
| 2009/0279493 A1* | 11/2009 | Gaal | H04L 1/1861 |
| | | | 370/329 |
| 2009/0305693 A1 | 12/2009 | Shimomura et al. | |
| 2010/0054235 A1 | 3/2010 | Kwon et al. | |
| 2010/0178920 A1 | 7/2010 | Kitazoe et al. | |
| 2010/0202288 A1 | 8/2010 | Park et al. | |
| 2010/0232382 A1 | 9/2010 | Gauvreau et al. | |
| 2010/0248732 A1 | 9/2010 | Baldemair et al. | |
| 2010/0284358 A1 | 11/2010 | Han et al. | |
| 2010/0296436 A1 | 11/2010 | Kwon et al. | |
| 2011/0044239 A1 | 2/2011 | Cai et al. | |
| 2011/0116364 A1 | 5/2011 | Zhang et al. | |
| 2011/0194478 A1 | 8/2011 | Lee et al. | |
| 2011/0194493 A1 | 8/2011 | Centonza et al. | |
| 2011/0205983 A1 | 8/2011 | Bharadwaj et al. | |
| 2011/0222475 A1 | 9/2011 | Hole et al. | |
| 2011/0222476 A1 | 9/2011 | Hole et al. | |
| 2011/0237265 A1 | 9/2011 | Sugawara et al. | |
| 2011/0255631 A1 | 10/2011 | Pi | |
| 2011/0260863 A1 | 10/2011 | Hooli et al. | |
| 2011/0292816 A1 | 12/2011 | Lee et al. | |
| 2011/0292854 A1* | 12/2011 | Terry | H04L 5/0098 |
| | | | 370/329 |
| 2011/0299490 A1* | 12/2011 | Nordstrom | H04L 1/1887 |
| | | | 370/329 |
| 2011/0310857 A1 | 12/2011 | Vujcic | |
| 2012/0033613 A1 | 2/2012 | Lin et al. | |
| 2012/0033646 A1 | 2/2012 | Luo et al. | |
| 2012/0087334 A1* | 4/2012 | Suzuki | H04W 72/0453 |
| | | | 370/329 |
| 2012/0099543 A1 | 4/2012 | Yang et al. | |
| 2012/0113846 A1 | 5/2012 | Narasimha et al. | |
| 2012/0115469 A1 | 5/2012 | Chen et al. | |
| 2012/0115485 A1 | 5/2012 | Narasimha et al. | |
| 2012/0182914 A1 | 7/2012 | Hariharan et al. | |
| 2012/0207102 A1 | 8/2012 | Martin et al. | |
| 2012/0207231 A1 | 8/2012 | Zhang et al. | |
| 2012/0213108 A1 | 8/2012 | Ji et al. | |
| 2012/0213151 A1 | 8/2012 | Zhao et al. | |
| 2012/0250644 A1 | 10/2012 | Sambhwani et al. | |
| 2012/0270540 A1 | 10/2012 | Ode et al. | |
| 2012/0320842 A1 | 12/2012 | Jeong et al. | |
| 2012/0320889 A1 | 12/2012 | Zhang et al. | |
| 2013/0016687 A1* | 1/2013 | Yang | H04L 5/0053 |
| | | | 370/329 |
| 2013/0034059 A1 | 2/2013 | Lee et al. | |
| 2013/0114521 A1 | 5/2013 | Frenne et al. | |
| 2013/0114522 A1 | 5/2013 | Frenne et al. | |
| 2013/0188473 A1 | 7/2013 | Dinan | |
| 2013/0201960 A1 | 8/2013 | Kim et al. | |
| 2013/0258882 A1 | 10/2013 | Dinan | |
| 2013/0272220 A1 | 10/2013 | Li et al. | |
| 2013/0301608 A1 | 11/2013 | Frenne et al. | |
| 2014/0064225 A1 | 3/2014 | Iwai et al. | |
| 2014/0126520 A1 | 5/2014 | Quan et al. | |
| 2014/0135018 A1 | 5/2014 | Hedberg et al. | |
| 2014/0169343 A1* | 6/2014 | Skov | H04L 5/003 |
| | | | 370/336 |
| 2014/0211685 A1 | 7/2014 | Kim et al. | |
| 2014/0247775 A1 | 9/2014 | Frenne et al. | |
| 2014/0334448 A1 | 11/2014 | Langereis et al. | |
| 2015/0173105 A1 | 6/2015 | Bergstrom et al. | |
| 2015/0365976 A1 | 12/2015 | Lee et al. | |
| 2016/0192348 A1* | 6/2016 | Dai | H04W 72/00 |
| | | | 370/329 |

FOREIGN PATENT DOCUMENTS

| | | |
|---|---|---|
| EP | 2 618 515 | 7/2013 |
| EP | 2 800 292 | 11/2014 |
| EP | 3 051 915 | 8/2016 |
| JP | 2007-266733 | 10/2007 |
| WO | 2011/085195 | 7/2011 |
| WO | 2012052911 A1 | 4/2012 |
| WO | 2012/086932 | 6/2012 |
| WO | 2012/109542 | 8/2012 |

OTHER PUBLICATIONS

China Telecom, "Evaluation of TTI bundling enhancement for medium rate PUSCH," TSG-RAN WG1 #68bis, R1-121129, Jeju, Korea (Mar. 26-30, 2012).

(56) References Cited

OTHER PUBLICATIONS

Fujitsu, "On the UL BW Reduction of LTE Low-cost UE," 3GPP TSG RAN WG1 #68, R1-120766, Dresden, Germany (Feb. 6-10, 2012).
Fujitsu, "Conclusions and Recommendations in TR36.888," 3GPP TSG-RAN WG1 Meeting #73, R1-131951, Fukuoka, Japan (May 20-24, 2013).
Huawei et al., "Bandwidth reduction for low cost MTC UE and text proposal," 3GPP TSG RAN WG1#68, R1-120051, Dresden, Germany (Feb. 6-10, 2012).
Intel Corporation, "Discussion on PRACH Coverage Enhancement for Low Cost MTC," 3GPP TSG RAN WG1 Meeting #74, R1-132930, Barcelona, Spain (Aug. 19-23, 2013).
New Postcom, "UL Coverage Improvement for Low Cost MTC," 3GPP TSG-RAN WG1 Meeting #72, R1-130196, St Julian's, Malta (Jan. 28-Feb. 1, 2013).
Nokia Siemens Networks et al., "HARQ-ACK resource allocation for data scheduled via ePDCCH," 3GPP TSG-RAN WG1 Meeting #70, R1-123656, Qingdao, P.R. China (Aug. 13-17, 2012).
NTT Docomo, "Discussion on Multi-level PRACH Coverage Enhancements," 3GPP TSG RAN WG1 Meeting #74bis, R1-134493, Guangzhou, China (Oct. 7-11, 2013).
Sony Europe Ltd., "Coverage improvement techniques for low cost MTC UEs," 3GPP TSG RAN WG1 #71, R1-125039, New Orleans, USA (Nov. 12-16, 2012).
Third Generation Partnership Project, "Technical Specification Group Radio Access Network; Evolved Universal Terrestrial Radio Access (E-UTRA); Requirements for support of radio resource management (Release 8)," 3GPP TS 36.133 V8.19.0 (Sep. 2012).
Third Generation Partnership Project, "Technical Specification Group Radio Access Network; Evolved Universal Terrestrial Radio Access (E-UTRA); Requirements for support of radio resource management (Release 8)," 3GPP TS 36.133 V8.23.0 (Sep. 2013).
Third Generation Partnership Project, "Technical Specification Group Radio Access Network; Evolved Universal Terrestrial Radio Access (E-UTRA); Requirements for support of radio resource management (Release 9)," 3GPP TS 36.133 V9.13.0 (Sep. 2012).
Third Generation Partnership Project, "Technical Specification Group Radio Access Network; Evolved Universal Terrestrial Radio Access (E-UTRA); Requirements for support of radio resource management (Release 9)," 3GPP TS 36.133 V9.17.0 (Sep. 2013).
Third Generation Partnership Project, "Technical Specification Group Radio Access Network; Evolved Universal Terrestrial Radio Access (E-UTRA); Requirements for support of radio resource management (Release 10)," 3GPP TS 36.133 V10.8.1 (Sep. 2012).
Third Generation Partnership Project, "Technical Specification Group Radio Access Network; Evolved Universal Terrestrial Radio Access (E-UTRA); Requirements for support of radio resource management (Release 11)," 3GPP TS 36.133 V11.2.0 (Sep. 2012).
Third Generation Partnership Project, "Technical Specification Group Radio Access Network; Evolved Universal Terrestrial Radio Access (E-UTRA); Requirements for support of radio resource management (Release 11)," 3GPP TS 36.133 V11.6.0 (Sep. 2013).
Third Generation Partnership Project, "Technical Specification Group Radio Access Network; Evolved Universal Terrestrial Radio Access (E-UTRA); Requirements for support of radio resource management (Release 10)," 3GPP TS 36.133 V10.12.0 (Sep. 2013).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.5.0 (Jun. 2012).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.7.0 (Feb. 2013).
Third Generation Partnership Project, "Technical Specification Group Radio Access Network; Evolved Universal Terrestrial Radio Access (E-UTRA); Physical Channels and Modulation (Release 11)," 3GPP TS 36.211 V11.0.0 (Sep. 2012).
Third Generation Partnership Project, "Technical Specification Group Radio Access Network; Evolved Universal Terrestrial Radio Access (E-UTRA); Physical Channels and Modulation (Release 11)," 3GPP TS 36.211 V11.4.0 (Sep. 2013).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.6.0 (Jun. 2012).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.8.0 (Jun. 2013).
Third Generation Partnership Project, "Technical Specification Group Radio Access Network; Evolved Universal Terrestrial Radio Access (E-UTRA); Multiplexing and channel coding (Release 11)," 3GPP TS 36.212 V11.0.0 (Sep. 2012).
Third Generation Partnership Project, "Technical Specification Group Radio Access Network; Evolved Universal Terrestrial Radio Access (E-UTRA); Multiplexing and channel coding (Release 11)," 3GPP TS 36.212 V11.3.0 (Jun. 2013).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.7.0 (Sep. 2012).
Third Generation Partnership Project, "Technical Specification Group Radio Access Network; Evolved Universal Terrestrial Radio Access (E-UTRA); Physical layer procedures (Release 10)," 3GPP TS 36.213 V10.10.0 (Jun. 2013).
Third Generation Partnership Project, "Technical Specification Group Radio Access Network; Evolved Universal Terrestrial Radio Access (E-UTRA); Physical layer procedures (Release 11)," 3GPP TS 36.213 V11.0.0 (Sep. 2012).
Third Generation Partnership Project, "Technical Specification Group Radio Access Network; Evolved Universal Terrestrial Radio Access (E-UTRA); Physical layer procedures (Release 11)," 3GPP TS 36.213 V11.4.0 (Sep. 2013).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.12.0 (Mar. 2012).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.6.0 (Mar. 2012).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.6.0 (Sep. 2012).

(56) References Cited

OTHER PUBLICATIONS

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.9.0 (Sep. 2013).
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.0.0 (Sep. 2012).
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.3.0 (Sep. 2013).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.17.0 (Jun. 2012).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.20.0 (Jun. 2013).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.12.0 (Sep. 2012).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.16.0 (Sep. 2013).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.7.0 (Sep. 2012).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.11.0 (Sep. 2013).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.1.0 (Sep. 2012).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.5.0 (Sep. 2013).
Third Generation Partnership Project, "Technical Specification Group Radio Access Network; Evolved Universal Terrestrial Radio Access (E-UTRA); Requirements for support of radio resource management (Release 10)," 3GPP TS 36.133 V12.1.0 (Sep. 2013).
Third Generation Partnership Project, "Technical Specification Group Radio Access Network; Study on provision of low-cost MTC UEs based on LTE; (Release 11)," 3GPP TR 36.888 V2.0.0 (Jun. 2012).
Third Generation Partnership Project, "Technical Specification Group Radio Access Network; Study on provision of low-cost Machine-Type Communications (MTC) User Equipments (UEs) based on LTE (Release 12)," 3GPP TR 36.888 V12.0.0 (Jun. 2013).
Third Generation Partnership Project, "Technical Specification Group Radio Access Network; Evolved Universal Terrestrial Radio Access (E-UTRA);LTE coverage enhancements (Release 11)," 3GPP TR 36.824 V11.0.0 (Jun. 2012).
Zhou et al., "LTE Uplink Coverage Enhancement Techniques Based on Enhanced TTI Bundling," 8th International Conference on Wireless Communications, Networking, and Mobile Computing, pp. 1-4 (Sep. 2012).
ZTE Corporation, "TP for evaluation/analysis of reduction of maximum bandwidth," 3GPP TSG RAN WG1 Meeting #68, R1-120290, Dresden, Germany (Feb. 6-10, 2012).
ZTE, "HARQ timing of PDSCH on cross-carrier scheduled SCell for TDD CA with different UL-DL configurations," 3GPP TSG RAN WG1 Meeting #70, R1-123388, Qingdao, P.R. China (Aug. 13-17, 2012).
ZTE, "Synchronized New Carrier Type," 3GPP TSG-RAN WG1 Meeting #71, R1-124831, New Orleans, USA (Nov. 12-16, 2012).
Qualcomm Incorporated, "PUCCH Resource Allocation for ePDCCH," 3GPP TSG RAN WG1 #70, R1-123703, Qingdao, China (Aug. 13-17, 2012).

* cited by examiner

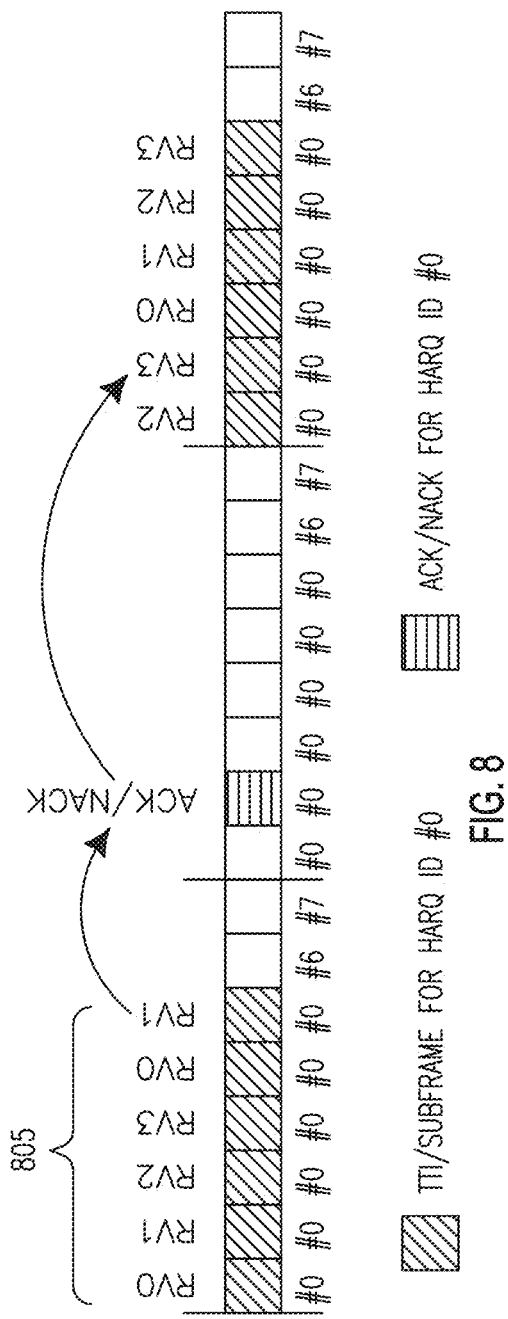
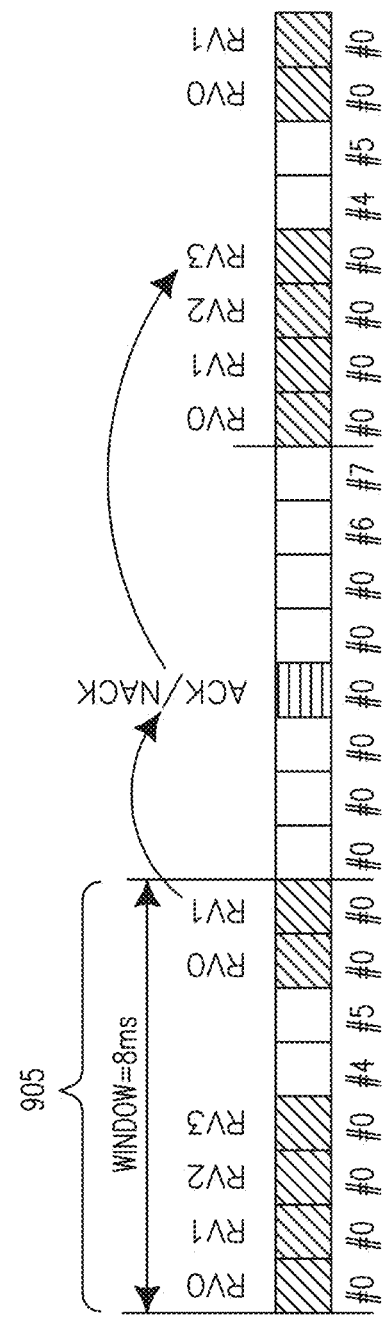
FIG. 8
FIG. 9

METHOD AND APPARATUS FOR ENHANCING COVERAGE OF MACHINE TYPE COMMUNICATION (MTC) DEVICES

CROSS REFERENCE TO RELATED APPLICATIONS

This application is the continuation of U.S. patent application Ser. No. 16/192,486, filed Nov. 15, 2018, which is a continuation of U.S. patent application Ser. No. 14/046,173, filed Oct. 4, 2013, which claims the benefit of U.S. provisional application No. 61/710,315 filed Oct. 5, 2012; U.S. provisional application No. 61/753,263 filed Jan. 16, 2013; U.S. provisional application No. 61/807,945 filed Apr. 3, 2013 and U.S. provisional application No. 61/863,223 filed Aug. 7, 2013, the contents of which are hereby incorporated by reference herein.

FIELD OF THE INVENTION

This application is related to wireless communications.

BACKGROUND

A communication device, such as a wireless transmit/receive unit (WTRU), may communicate with a remote device via a communication system. The WTRU may be configured to perform machine-to-machine (M2M) or machine-type communications (MTC), which are communications that may be performed without human interaction. This form of communications may have applications in smart metering, home automation, eHealth, fleet management, and other similar environments.

It may be desirable to improve the service coverage of a device or type of device, (for example, a long term evolution (LTE) or LTE-Advanced (LTE-A) device), such as a low-cost MTC device by, for example, up to a number of dB, (for example, 20 dB), as compared to the LTE cell coverage defined for devices other than the low-cost MTC devices. In this case, the requirements for throughput and latency may be relaxed. For example, message size may be limited, such as on the order of a maximum of 100 bytes per message in the uplink (UL) and/or 20 bytes per message in the downlink (DL). In another example, latency may be relaxed so as to allow up to 10 seconds for the DL and/or up to an hour for the UL. Such relaxation of requirements may preclude support for certain services, such as voice.

SUMMARY

A method and apparatus are described for a low cost machine-type-communication (LC-MTC) wireless transmit/receive unit (WTRU) to enhance coverage. In an example, a method for physical broadcast channel (PBCH) enhancement includes receiving system information at the WTRU on an enhanced PBCH (ePBCH) from a base station. The ePBCH is located in a set of radio frames which is a subset of available radio frames, where the subset includes fewer than all the available radio frames. The ePBCH is received in at least one radio frame of the set of radio frames. In another example, a method for physical random access channel (PRACH) enhancement includes receiving configuration of legacy PRACH resources and configuration of enhanced PRACH (ePRACH) resources by the WTRU. The WTRU selects one of legacy PRACH resources or ePRACH resources based on a coverage capability. In another example, a method for physical random access channel (PRACH) enhancement includes receiving configuration of enhanced PRACH (ePRACH) resources, where the ePRACH resources comprise multiple ePRACH resource types, each ePRACH resource type being associated with a coverage capability.

BRIEF DESCRIPTION OF THE DRAWINGS

A more detailed understanding may be had from the following description, given by way of example in conjunction with the accompanying drawings wherein:

FIG. 8 is a diagram of an example cyclic RV assignment without window size;

FIG. 9 is a diagram of an example of TTI bundling with bitmap indication;

DETAILED DESCRIPTION

Figure 1A:
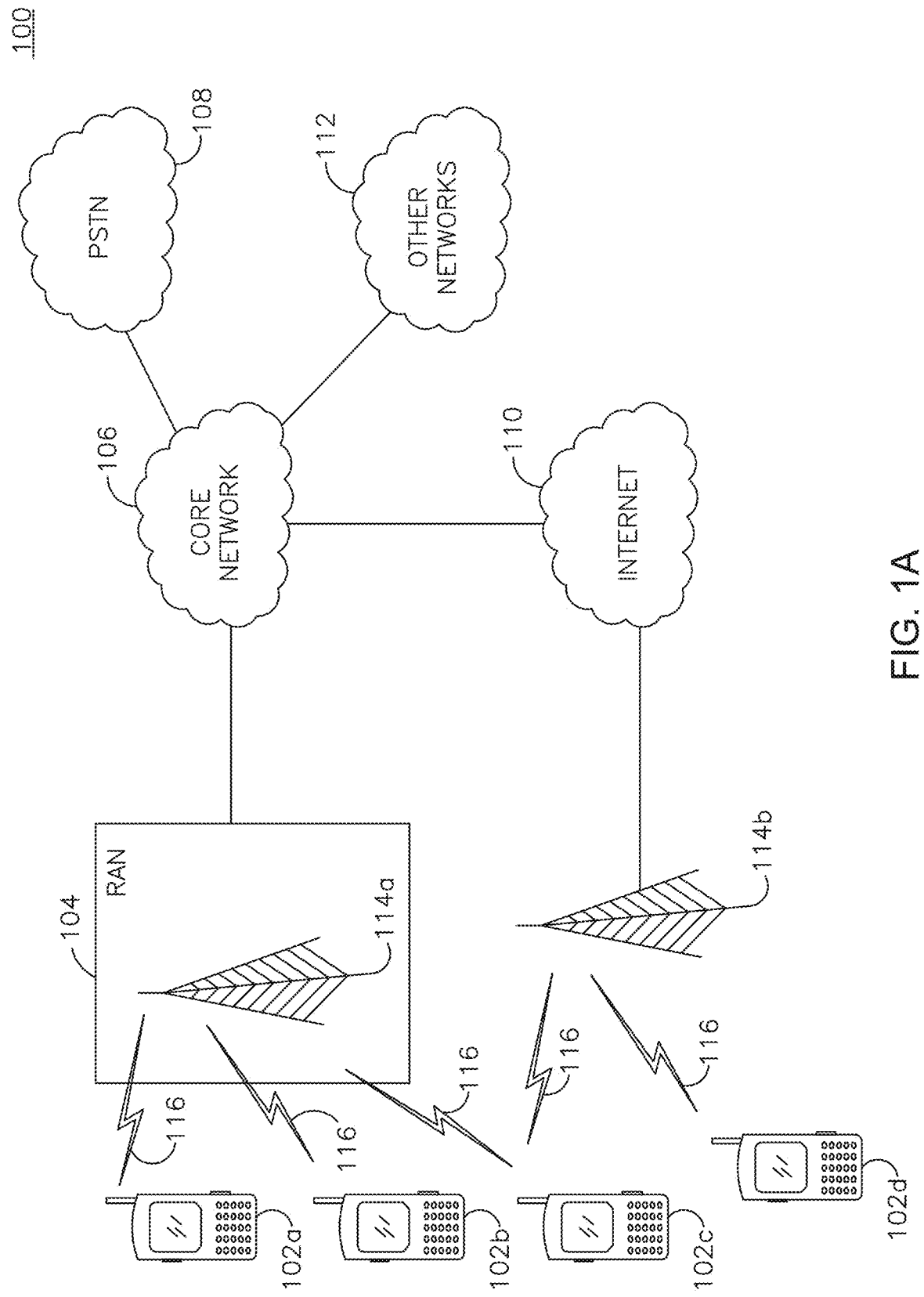
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, machine to machine and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
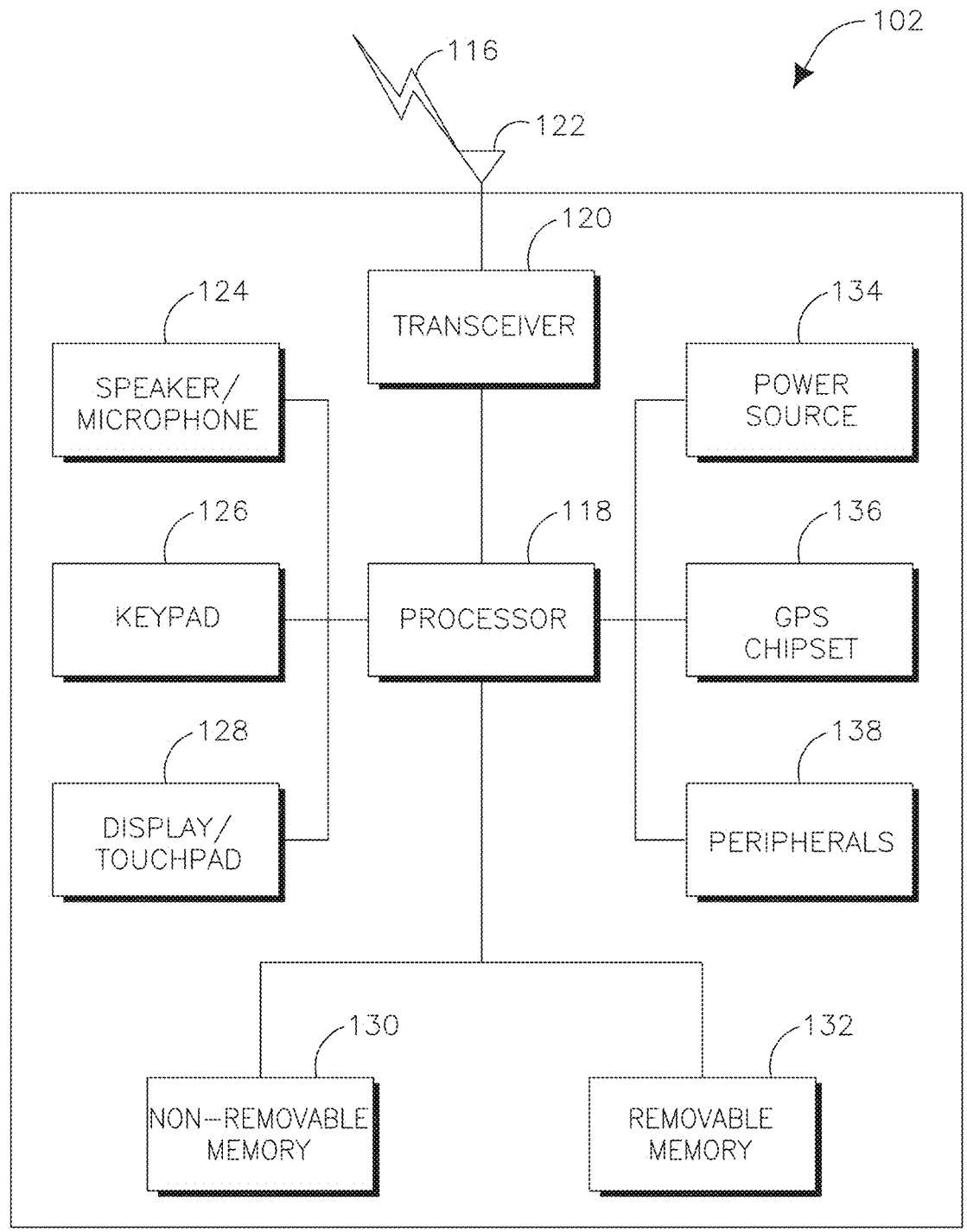
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
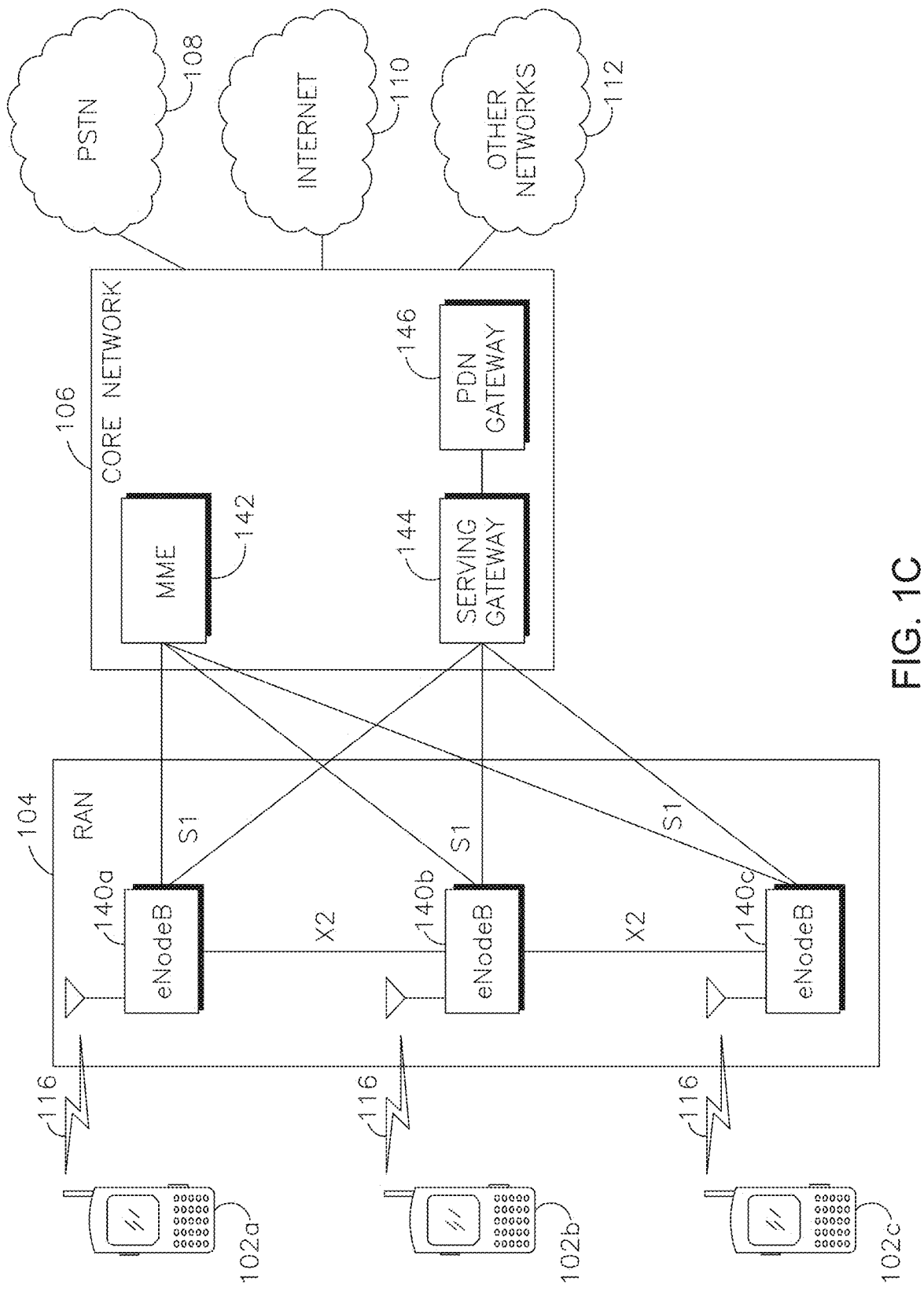
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Transmission time interval (TTI) bundling may enhance uplink (UL) coverage for a user or WTRU that experiences limited UL coverage, for example as its transmission power approaches the maximum. Using TTI bundling, the same data may be transmitted in multiple consecutive TTIs, which may allow the WTRU to extend the effective transmission time window for the data. For example up to four consecutive TTIs may be bundled for frequency division duplex (FDD) LTE, which may extend the effective transmission time window by up to four times. A single transport block may be coded and transmitted with different redundancy versions (RVs) in each of the consecutive subframes, where subframe and TTI may be used interchangeably. For example, the consecutive TTIs in the same TTI bundle may be assigned to consecutive RVs. The same hybrid automatic repeat request (HARQ) process number may be assigned to all TTIs in a TTI bundle, and all TTIs within a TTI bundle may be treated as a single resource, where a single UL grant and a single acknowledgement/negative acknowledgement (ACK/NACK), (e.g., physical HARQ indicator channel (PHICH)), may be associated with them. A TTI bundling mechanism may be configured by higher layer signaling per WTRU. In FDD TTI bundling, the roundtrip time (RTT) for every re-transmission may be equal to 16 ms. When the FDD TTI bundling is activated, the WTRU may receive the UL grant for the first subframe in the TTI bundle according to the rules of an FDD UL grant, and once the UL data is transmitted in a TTI bundle, a PHICH, or other UL grant, may be expected by the WTRU according to PHICH rules corresponding to the last subframe of that TTI bundle. The rules may be for example, 3GPP Release 8 rules.

Figure 2:
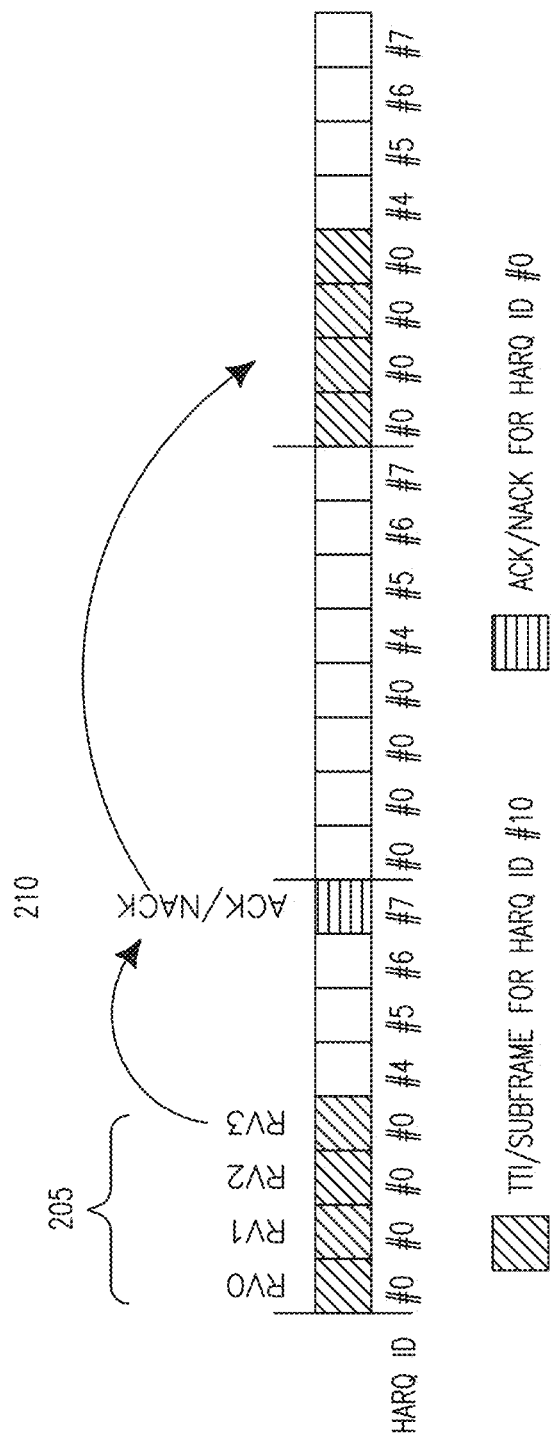
FIG. 2 is a diagram of an example of transmission time interval (TTI) bundling with a TTI bundle of four consecutive TTIs.

FIG. 2 is a diagram of an example of TTI bundling with a TTI bundle of four consecutive TTIs. In the example, HARQ ID #0 includes four bundled TTIs 205, the ACK/NACK 210 is received four TTIs after the last TTI of the TTI bundle 205, and re-transmission occurs sixteen TTIs after the first TTI of the initial transmission. Once FDD TTI bundling is activated, the WTRU may support up to a certain number of HARQ processes, for example up to four for 3GPP Release 10. In FDD operation, all TTI bundles of the same HARQ process may have the same number of UL subframes, may have the same pattern, (for example, including consecutive UL subframes), and may be uniformly distributed in the time domain.

Figure 3:
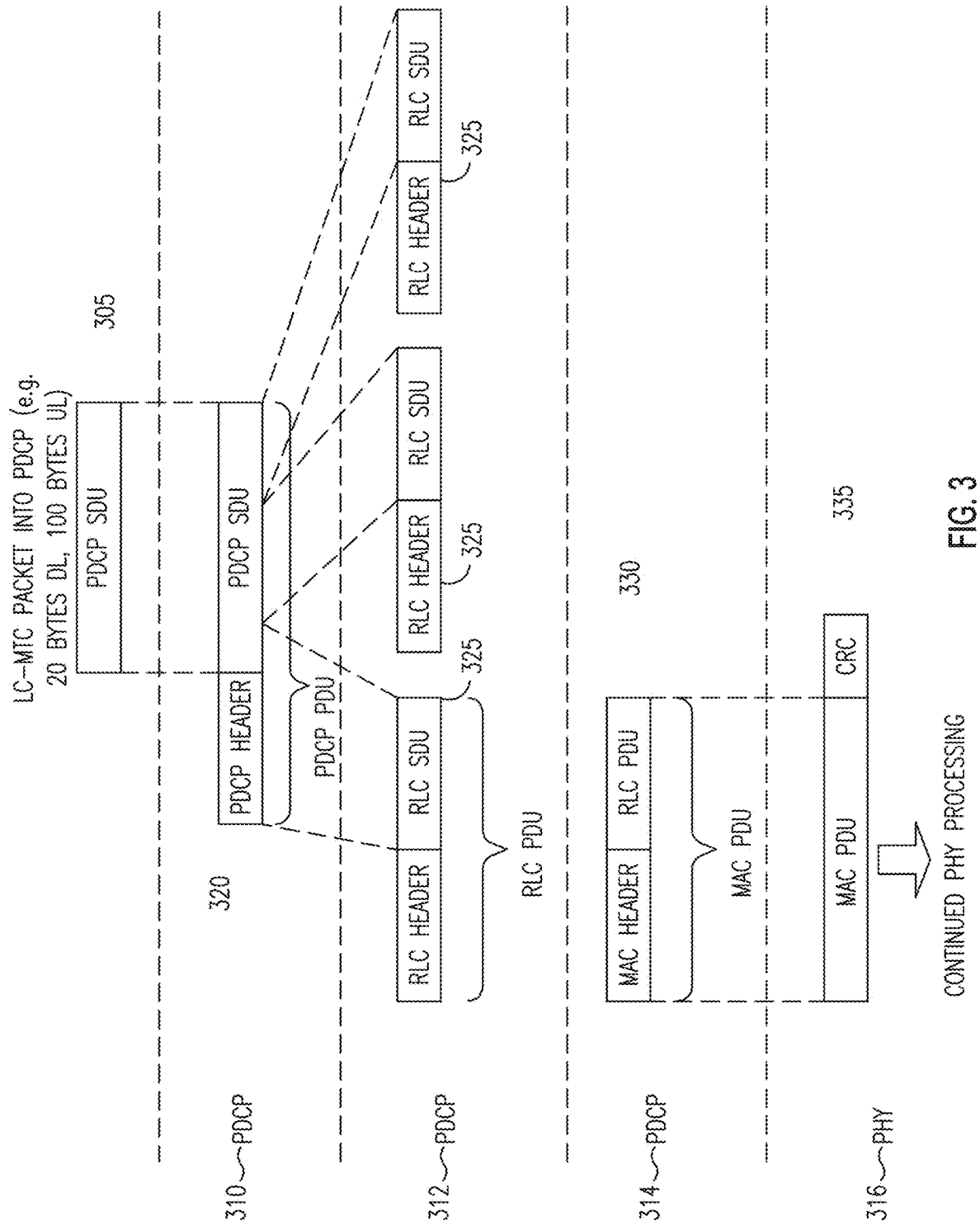
FIG. 3 is a diagram of example of layer 2 (L2) processing for an incoming data packet.

FIG. 3 is a diagram of example of layer 2 (L2) processing 300 for an incoming data packet 305. In general, the incoming data packet 305 may be processed through a packet data convergence protocol (PDCP) layer or entity 310, a radio link control (RLC) layer or entity 312, a medium access control (MAC) layer or entity 314 and a physical (PHY) layer or entity 316. In the example, a PDCP header 320 is appended to the incoming packet that is to be transmitted in the DL or UL direction. The example illustrated is simplified for low data rates where the RLC layer 312 segments, but does not concatenate, PDCP protocol data units (PDUs), (for example, into 3 RLC PDUs 325), such that each MAC PDU 330 may include a single RLC service data unit (SDU) 325. In this manner, the protocol header overhead for each layer may include a PDCP header (e.g., eight bits) 320 which may include a number of bits, e.g., one bit, for data or control PDU indication and may include other bits, e.g., seven bits, for the sequence number (SN), an RLC header having a size that may be dependent on the configured mode, for example, whether unacknowledged mode (UM) or acknowledged mode (AM) is configured, a MAC header, for example eight bits with five bits for the logical channel ID (LCID), and a cyclic redundancy check (CRC) (e.g., twenty-four bits) which may be attached to the end of the MAC PDU 330 prior to further processing in the PHY layer 316. With respect to the PDCP header 320, the SN may be used for in-sequence delivery of PDCP SDUs to higher layers and for hyper frame number (HFN) sequence management and ciphering. With respect to the RLC header for AM, a sixteen bit header may be included, with, for example ten bits of the header being for the SN. With respect to the RLC header for UM, an eight bit header may be included, with, for example, five bits of the header being for the SN. The header may apply to each segmented RLC SDU 325.

Larger headers may be configured for each protocol layer when a high data rate data radio bearer (DRB) is configured. For example, the PDCP 310 and RLC 312 layers may allocate a larger SN bit size in the header. The RLC layer 312 may concatenate or combine multiple RLC SDUs 325 into a single PDU, which may increase the RLC header size further. The MAC layer 314 may multiplex multiple MAC SDUs into a single MAC PDU 335 as the allocated transport block size permits for the transmission opportunity, and the MAC header may increase according to the number of MAC SDUs that are multiplexed into the MAC PDU 335.

The physical resources which may be used for the physical uplink control channel (PUCCH) may depend on two parameters, $N_{RB}^{(2)}$ and $N_{cs}^{(1)}$, which may be given by higher layers. The variable $N_{RB}^{(2)} \geq 0$ may denote the bandwidth in terms of resource blocks (RBs) that may be available for use by certain PUCCH formats, such as formats 2/2a/2b, in each slot. The variable $N_{cs}^{(1)}$ may denote the number of cyclic shifts which may be used for certain PUCCH formats, such as formats 1/1a/1b, in a RB which may be used for a mix of formats such as 1/1a/1b and 2/2a/2b. The value of $N_{cs}^{(1)}$ may be an integer multiple of $\Delta_{shift}^{PUCCH}$ where the integer multiple may be within the range of $\{0, 1, \ldots, 7\}$, and where $\Delta_{shift}^{PUCCH}$ may be provided by higher layers. In an embodiment, no mixed RB may be present if N=0. In an embodiment, at most, one RB in each slot may support a mix of formats 1/1a/1b and 2/2a/2b. Resources which may be used for transmission of certain PUCCH formats such as 1/1a/1b, 2/2a/2b and 3 may be represented by the non-negative indices $n_{PUCCH}^{(1,\tilde{p})}$, $$n_{PUCCH}^{(2,\tilde{p})} < N_{RB}^{(2)} N_{sc}^{RB} + \left\lceil \frac{N_{cs}^{(1)}}{8} \right\rceil \cdot \left( N_{sc}^{RB} - N_{cs}^{(1)} - 2 \right),$$

and $n_{PUCCH}^{(3,\tilde{p})}$, respectively.

The block of complex-valued symbols $z^{(\tilde{p})}(i)$ may be multiplied with the amplitude scaling factor $\beta_{PUCCH}$ in order to conform to the transmit power $P_{PUCCH}$ and may be mapped in sequence to resource elements starting with $z^{(\tilde{p})}(0)$. PUCCH may use one RB in each of the two slots in a subframe. Within the physical resource block used for transmission, the mapping of $z^{(\tilde{p})}(i)$ to resource elements (k,l) on antenna port p which may not be used for transmission of reference signals may be in increasing order of first k, then l and finally the slot number, starting with the first slot in the subframe. The physical resource blocks to be used for transmission of the PUCCH in slot $n_s$ may be given by:

$$n_{PRB} = \begin{cases} \left\lfloor \frac{m}{2} \right\rfloor & \text{if } (m+n_s \bmod 2) \bmod 2 = 0 \\ N_{RB}^{UL} - 1 - \left\lfloor \frac{m}{2} \right\rfloor & \text{if } (m+n_s \bmod 2) \bmod 2 = 1, \end{cases} \quad \text{Equation 1}$$

where the variable m may depend on the PUCCH format. For formats 1, 1a and 1b, for example:

and for formats 2, 2a and 2b, for example:

$$m = \lfloor n_{PUCCH}^{(2,\tilde{p})} / N_{sc}^{RB} \rfloor \quad \text{Equation 3}$$

and for format 3, for example:

$$m = \lfloor n_{PUCCH}^{(3,\tilde{p})} / N_{SF,0}^{PUCCH} \rfloor \quad \text{Equation 4}$$

Figure 4:
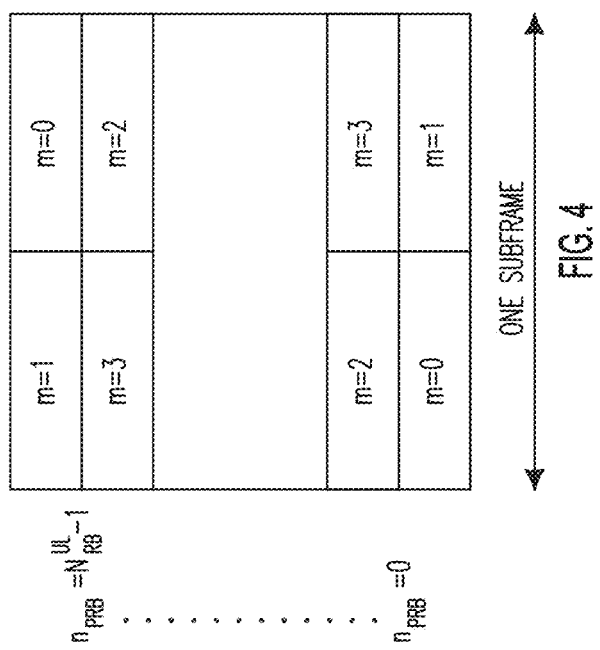
FIG. 4 is a diagram of an example mapping of modulation symbols for a physical uplink control channel (PUCCH)

FIG. 4 is a diagram of an example mapping of modulation symbols for a PUCCH.

In an embodiment where a sounding reference signal (SRS) and the PUCCH format 1, 1a, 1b or 3 may be simultaneously transmitted when there may be one serving cell configured, a shortened PUCCH format may be used where the last single carrier frequency division multiple access (SC-FDMA) symbol which may be in the second slot of a subframe may be left empty. HARQ-ACK transmission on two antenna ports ($p \in [p_0, p_1]$) may be supported for PUCCH format 1a/1b.

For an embodiment of FDD with one configured serving cell, the WTRU may use a PUCCH resource $n_{PUCCH}^{(1,\tilde{p})}$ for transmission of a HARQ-ACK in subframe n for $\tilde{p}$ mapped to antenna port p for PUCCH format 1a/1b. In this embodiment, for example, for a physical DL shared channel (PDSCH) transmission which may be indicated by the detection of a corresponding physical DL control channel (PDCCH) in subframe n−4, or for a PDCCH indicating downlink semi-persistent scheduling (SPS) release which may be in subframe n−4, the WTRU may use $n_{PUCCH}^{(1,\tilde{p}_0)} = n_{CCE} + N_{PUCCH}^{(1)}$ for antenna port $p_0$, where $n_{CCE}$ may be the number of the first control channel element (CCE), (e.g., the lowest CCE index which may be used to construct the PDCCH), used for transmission of the corresponding DL control information (DCI) assignment, and $N_{PUCCH}^{(1)}$ may be configured by higher layers. For two antenna port transmission, the PUCCH resource for antenna port $p_1$ may be given by $n_{PUCCH}^{(1,\tilde{p}_1)} = n_{CCE} + 1 + N_{PUCCH}^{(1)}$. For a PDSCH transmission on the primary cell where there may be no corresponding PDCCH detected in subframe n−4, the value of $n_{PUCCH}^{(1,\tilde{p})}$ may be determined according to a higher layer configuration. For a WTRU configured for two antenna port transmissions, a PUCCH resource value may map to two PUCCH resources with the first PUCCH resource $n_{PUCCH}^{(1,\tilde{p}_0)}$ for antenna port $p_0$ and the second PUCCH resource $n_{PUCCH}^{(1,\tilde{p}_1)}$ for antenna port $p_1$. The PUCCH resource value may, otherwise, map to a single PUCCH resource $n_{PUCCH}^{(1,\tilde{p}_0)}$ for antenna port $p_0$.

A PHICH may be used to transmit an ACK or NACK corresponding to the PUSCH transmitted in a UL subframe. A PHICH may be transmitted in a distributed manner across system bandwidth and orthogonal frequency division multiplexing (OFDM) symbols within a DL control channel. The number of OFDM symbols may be defined as a PHICH duration and may be configurable via higher layer signaling. The physical resource position of a PHICH may vary according to PHICH duration which may be different from the physical control format indicator channel (PCFICH).

Figure 5:
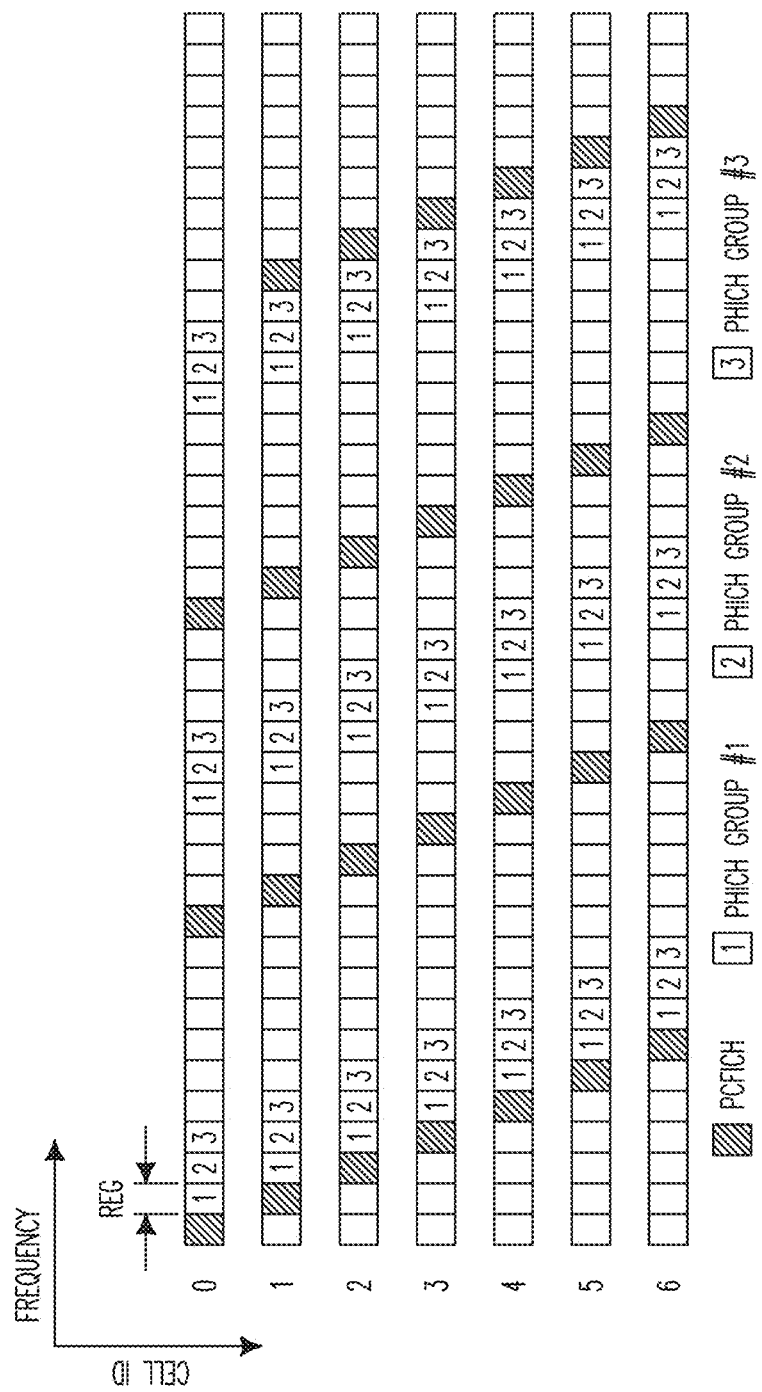
FIG. 5 is a diagram of an example of a physical control format indicator channel (PCFICH) and physical hybrid automatic repeat request (HARQ) indicator channel (PHICH) resource element group (REG) allocation according to a physical cell identifier (PCI)

FIG. 5 is an example diagram of PCFICH and PHICH resource element group (REG) allocation according to a $$m = \begin{cases} N_{RB}^{(2)} & \text{if } n_{PUCCH}^{(1,\tilde{p})} < c \cdot N_{cs}^{(1)} / \Delta_{shift}^{PUCCH} \\ \left\lfloor \frac{n_{PUCCH}^{(1,\tilde{p})} - c \cdot N_{cs}^{(1)} / \Delta_{shift}^{PUCCH}}{c \cdot N_{sc}^{RB} / \Delta_{shift}^{PUCCH}} \right\rfloor + N_{RB}^{(2)} + \left\lceil \frac{N_{cs}^{(1)}}{8} \right\rceil & \text{otherwise} \end{cases} \quad \text{Equation 2}$$

$$c = \begin{cases} 3 & \text{normal cyclic prefix} \\ 2 & \text{extended cyclic prefix} \end{cases}$$

physical cell identifier (PCI). In the example, multiple PHICH groups are defined in a cell, and a PHICH group may include multiple PHICHs with orthogonal sequences. In an embodiment, the PHICH for a WTRU may be defined dynamically with resource information in a UL grant, such as lowest physical resource block (PRB) index ($I_{PRB_{RA}}^{lowest_{index}}$) and demodulation reference signal (DM-RS) cyclic shift ($n_{DMRS}$). Two index pairs, (PHICH group index: $n_{PHICH}^{group}$, PHICH sequence index: $n_{PHICH}^{seq}$) may indicate the PHICH resource for a specific WTRU. In the PHICH index pair ($n_{PHICH}^{group}$, $n_{PHICH}^{seq}$) each index may be defined as:

$$n_{PHICH}^{group} = (I_{PRB_{RA}}^{lowest_{index}} + n_{DMRS}) \bmod N_{PHICH}^{group}; \quad \text{Equation 5}$$

$$n_{PHICH}^{seq} = (\lfloor I_{PRB_{RA}}^{lowest_{index}} / N_{PHICH}^{group} \rfloor + n_{DMRS}) \bmod 2N_{SF}^{PHICH}, \quad \text{Equation 6}$$

where the $N_{PHICH}^{group}$ may denote the number of PHICH groups available in the system and may be defined as:

$$n_{PHICH}^{group} = \begin{cases} \lceil N_g(N_{RB}^{DL}/8) \rceil \\ 2 \cdot \lceil N_g(N_{RB}^{DL}/8) \rceil \end{cases}, \quad \text{Equation 7}$$

where $N_g$ may be information (e.g., 2 bits of information) and may be transmitted via a physical broadcasting channel (PBCH) and the information may be within $N_g \in \{1/6, 1/2, 1, 2\}$. The orthogonal sequence according to the spreading factor may, for example, be as provided in Table 1.

TABLE 1

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

An eNB and/or a WTRU may use a random access procedure for at least one of: WTRU initial access (for example to a cell or eNB), reset of UL timing (for example to reset or align WTRU UL timing with respect to a certain cell), and reset of timing during handover (for example to reset or align WTRU timing with respect to the handover target cell). The WTRU may transmit a certain physical random access channel (PRACH) preamble sequence at a certain power PPRACH, which may be based on configured parameters and/or measurements, and the WTRU may transmit the preamble using a certain time-frequency resource or resources. The configured parameters, which may be provided or configured by the eNB, may include one or more of initial preamble power (e.g., preambleInitialReceivedTargetPower), a preamble format based offset (e.g., deltaPreamble), a random access response window (e.g., ra-ResponseWindowSize), a power ramping factor (e.g., powerRampingStep), and a maximum number of retransmissions (e.g., preambleTransMax). The PRACH resources (which may include preambles or sets of preambles and/or time/frequency resources which may be used for preamble transmission) may be provided or configured by the eNB.

The measurements may include pathloss. The time-frequency resource(s) may be chosen by the WTRU from an allowed set or may be chosen by the eNB and signaled to the WTRU. Following WTRU transmission of a preamble, if the eNB may detect the preamble, it may respond with a random access response (RAR). If the WTRU may not or does not receive an RAR for the transmitted preamble (which may, for example, correspond to a certain preamble index and time/frequency resource), within an allotted time (for example, ra-ResponseWindowSize), the WTRU may send another preamble at a later time, at a higher power, (for example, higher than the previous preamble transmission by powerRampingStep) where the transmission power may be limited by a maximum power, for example a WTRU configured maximum power which may be for the WTRU as a whole (for example $P_{CMAX}$) or for a certain serving cell of the WTRU (for example $P_{CMAX,c}$). The WTRU may wait again for receipt of an RAR from the eNB. This sequence of transmitting and waiting may continue until the eNB may respond with an RAR or until the maximum number of random access preamble transmissions (for example, preambleTransMax) may have been reached. The eNB may transmit and the WTRU may receive the RAR in response to a single preamble transmission.

A particular instance of a random access procedure may be contention-based or contention-free. A contention-free procedure may be initiated by a request, for example from an eNB, which may, for example, be via physical layer signaling such as a PDCCH order or by higher layer signaling such as an RRC reconfiguration message (e.g., an RRC connection reconfiguration message) which may include mobility control information and may, for example, indicate or correspond to a handover request. For a contention-free procedure which may be initiated by PDCCH order in subframe n, the PRACH preamble may be transmitted in the first subframe (or the first subframe available for PRACH) n+$k_2$, $k_2 \geq 6$. When initiated by RRC command, there may be other delays which may be specified (for example, there may be minimum and/or maximum required or allowed delays). The WTRU may autonomously initiate a contention-based procedure for reasons which may include for example, initial access, restoration of UL synchronization, or recovering from radio link failure. For certain events, for example events other than recovery from radio link failure, it may not be defined or specified as to how long after such an event the WTRU may send the PRACH preamble.

For a contention-free random access (RA) procedure, a network-signaled PRACH preamble may be used. For a contention-based random access procedure, the WTRU may autonomously choose a preamble where the WTRU. The preamble format and/or the time/frequency resource(s) available for preamble transmissions may be based on an indication or index (e.g., prach-configIndex) which may be provided or signaled by the eNB.

Inherent in the LTE system design is that eventually one of the preambles transmitted at the progressively higher transmit powers may be detected by the eNB. An RAR may be sent by the eNB in response to that one detected preamble.

The preamble formats for PRACH may be defined as three parts: cyclic prefix ($T_{CP}$), preamble ($T_{PRE}$), and guard time ($T_{GT}$). The total time including these three parts may be considered as time for RA ($T_{RA}$). For an FDD system, a number of preamble formats, for example four preamble formats, may be supported, for example, as shown in Table 2 below, which includes example preamble formats for PRACH.

TABLE 2

| Preamble format | $T_{CP}$ | $T_{SEQ}$ |
| --- | --- | --- |
| 0 | 3168 · Ts | 24576 · Ts |
| 1 | 21024 · Ts | 24576 · Ts |
| 2 | 6240 · Ts | 2 · 24576 · Ts |
| 3 | 21024 · Ts | 2 · 24576 · Ts |

In the Table 2 example, the $T_{SEQ}$ may equal $T_{PRE}+T_{GT}$ and Ts may denote a basic time unit, (for example, sample time). The preamble formats 2 and 3 may have twice the $T_{SEQ}$ length as compared with the other two formats, whereby signal power may be increased by repeating the preamble two times.

Paging may be used for network initiated connection setup of a WTRU, for example in IDLE mode. At the PHY layer, paging may be sent using PDCCH and PDSCH. A single paging radio network temporary identity (P-RNTI) may be allocated for the paging channel (PCH). In the MAC, a HARQ process may not be used for PCH, and RLC transparent mode (TM) may be applied to the paging control channel (PCCH). The RRC paging message may include individual WTRU indications or identities for specific WTRUs being paged for connection initiation, and/or may include common indications for changes to certain system information, including changes to system information blocks (SIB) and information related to earthquake and tsunami warning systems (ETWS), commercial mobile alert systems (CMASs) and extended access barring (EAB).

For energy efficiency purposes, for example, a discontinuous reception (DRX) mechanism may be used along with paging to allow the WTRU to save energy in between receiving paging messages, which may be allocated on a single subframe per paging (DRX) cycle per WTRU. The parameters for the DRX cycle may be configured via system information block (SIB) or higher layers. For example, a higher layer may be a non-access stratum (NAS) layer.

A paging occasion for a given WTRU may be defined by its WTRU identity such as for example, international mobile subscriber identity (IMSI), DRX cycle length, and parameter "nB" set in the RRC layer. The value of nB may define the density of paging occasions in a given cell, ranging from a paging frame and occasion occurring every 32 frames (nB=T/32) to four paging occasions in a subframe s{0, 1, 5, 6} for TDD or s{0, 4, 5, 9} for FDD per paging frame (nB=4T). A WTRU may receive a WTRU-specific paging record only during its allocated paging occasion, and may read the indication for changes to broadcast information in other paging occasions.

In some embodiments, certain terms may be used interchangeably. eNB, cell, and network may be used interchangeably. Serving cell and component carrier may be used interchangeably. Carrier and a cell may be used interchangeably One or more of message, command, request, and signaling may be used interchangeably. One or more of provide, signal, configure, and transmit may be used interchangeably. Send and transmit may be used interchangeably.

A WTRU may acquire cell and/or network related system information which it may, for example, use for cell selection, access, connection establishment, cell reselection, and the like. The system information may be signaled, for example broadcast, by the eNB or cell in groups or blocks. One or more of a master information block (MIB) and/or one or more system information blocks (SIBs) such as a system information block type 1 (SIB1) and a system information block type 2 (SIB2) may be provided by an eNB or cell and/or may be needed by a WTRU for one or more functions such as cell access. SIBs, with the possible exception of SIB1, may be carried in system information (SI) messages. Each SIB may be contained in a single SI message.

A MIB may be transmitted on a physical broadcast channel (PBCH) where the PBCH may have a fixed schedule. For example a PBCH such as the LTE legacy PBCH may be transmitted in subframe #0 of every radio frame. The MIB, such as the legacy MIB, may have a periodicity in radio frames (e.g., 4 frames or 40 ms) and may be repeated in every radio frame (e.g., 10 ms) within the period (e.g., 40 ms). In each of the radio frames of the MIB period, the information or information bits may be the same. In each of the radio frames of the MIB period, the coded bits may be different. The physical resources of the PBCH may be fixed and may be located within the 72 center subcarriers which may be the center 6 PRBs of the transmission band. The PBCH resources may be in the first four symbols of the second timeslot of the subframe. The information contained in the MIB may include one or more of at least part of the system frame number (SFN), (for example, the 8 most significant bits of the SFN), the configured DL bandwidth of the cell and the PHICH configuration for the cell. By acquiring (for example successfully decoding) at least one of the repeated MIBs (e.g., one of the four repeated MIBs) in the MIB period (e.g., 40 ms), the WTRU may be able to derive the least significant bits (e.g., two least significant bits) of the SFN which it may combine with the partial SFN contained in the MIB to obtain the full SFN value (e.g., the full SFN value of the frame in which the MIB was successfully decoded). The term legacy PBCH may be used to represent the PBCH according to a certain standard or specification such as 3GPP LTE Release 10 (R10) or one or more 3GPP LTE releases prior to a certain release such as Release 11 (R11). The term legacy MIB may be used to represent the MIB according to a certain standard or specification such as 3GPP LTE R10 or one or more 3GPP LTE releases prior to a certain release such as R11. The term legacy PRACH may be used to represent the PRACH according to a certain standard or specification such as 3GPP LTE Release 10 (R10) or one or more 3GPP LTE releases prior to a certain release such as Release 11 (R11). The term legacy, in general, may be used to represent or refer to a certain standard or specification such as 3GPP LTE Release 10 (R10) or one or more 3GPP LTE releases prior to a certain release, such as, for example, Release 11 (R11).

The SIB1 may be transmitted on a PDSCH in a certain subframe such as subframe 5, may have a TTI of 80 ms and may be repeated every 20 ms. The resource location of SIB1 may be indicated by a PDCCH scrambled with a system information radio network temporary identifier (SI-RNTI). The SIB1 may provide information that a WTRU may use for access to the cell and network as well as scheduling information for the other SIBs.

The SIB2 may be transmitted on a PDSCH based on the scheduling information included in SIB1. The resource location may be indicated by a PDCCH scrambled by an SI-RNTI. The SIB2 may provide information that a WTRU may use to access and initiate connectivity with the cell and the network. The information in SIB2 may include a common channel configuration for example to provide configuration for channels such as PRACH and/or RACH, a Multicast-broadcast single-frequency network (MBSFN) subframe configuration, and/or UL information.

A scheduling information list for the system information (SI) messages may also be used. Each listed SI in the scheduling information list may include one or more SIBs. Scheduling of SIs may be based on periodicity of the system information and SI window length. The eNB may have some flexibility in the time and frequency resource for sending SIBs.

Other SIB information may be related to cell reselection information, multimedia broadcast multicast service (MBMS), or emergency and warning system (EWS) related information that the WTRU may need. Relevance of SIBs to a cell may be based on the configuration of the cell or network and may not be transmitted by a cell if not relevant.

A WTRU, such as a WTRU in RRC_CONNECTED mode, may, for example continuously (e.g., every radio frame), monitor DL radio link quality. The WTRU may monitor the quality of the DL radio link and compare it to thresholds, such as $Q_{in}$ and $Q_{out}$. In an embodiment, $Q_{out}$ may be defined as the quality level at which the DL radio link may not be reliably received and may correspond to a ten percent block error rate (BLER) for a hypothetical PDCCH transmission. In an embodiment, $Q_{in}$ may be defined as the quality level at which the DL radio link may be significantly more reliable than $Q_{out}$ and may correspond to a two percent BLER for a hypothetical PDCCH transmission. Thresholds may be configured for a reference signal received power (RSRP) measurement value and radio link monitoring may be performed on the primary cell (PCell) cell-specific reference signal (CRS).

The $Q_{in}$ may be evaluated over a certain evaluation period, e.g., 100 ms without DRX. If the radio link quality is better than $Q_{in}$ during the evaluation period, then an in-sync indication may be provided to higher layers. Correspondingly, $Q_{out}$ may be evaluated over an evaluation period, e.g., 200 ms without DRX. If the radio link quality is worse than $Q_{out}$ during the evaluation period, then an out-of-sync indication may be provided to the higher layers.

Higher layer processing of in-sync or out-of-sync indications may be performed based on radio resource control (RRC) configured radio link monitoring (RLM) counters and timers, which may be provided in system information such as in SIB2. For example, N310 consecutive out-of-sync indications may start a timer T310. For another example, N311 consecutive in-sync indications while T310 is running may cause T310 to be stopped. For another example, if T310 expires, a radio link failure indication may be detected, and a WTRU may initiate RRC re-establishment procedures. A T311 timer may be started at this point.

Radio link failure may be declared based on detection of physical layer problems, random access problems, or if the radio link controller (RLC) indicates that a maximum number of retransmissions has been reached.

It may be desirable to improve the service coverage of a device or type of device, (for example, an LTE or LTE-Advanced (LTE-A) device), such as a low-cost machine type communication (MTC) (LC-MTC) device by, for example, up to a number of dB, (for example, 15 or 20 dB), as compared to LTE cell coverage which may be defined for other devices which may not be LC-MTC devices. In this case, the requirements for throughput and latency may be relaxed. For example, message size may be limited, such as on the order of a maximum of 100 bytes per message in the UL and/or 20 bytes per message in the DL. For another example, latency may be relaxed so as to allow up to 10 seconds for the DL (e.g., for available DL data to be transmitted by an eNB and successfully received by a WTRU) and/or up to an hour for the UL (e.g., for available UL data to be transmitted by a WTRU and successfully received by an eNB). Such relaxation of requirements may preclude support for certain services such as voice.

In the embodiments described herein, WTRU, device, LC WTRU, LC device, LC-MTC WTRU, LC-MTC, and LC-MTC device may be used interchangeably. A LC-MTC device is used as a non-limiting example. The embodiments described herein may be applicable to another device, such as one which may benefit from increased coverage and may tolerate relaxed throughput and/or latency requirements.

In some embodiments, legacy WTRU may refer to a WTRU which may comply with certain releases or versions such as 3GPP or LTE standards releases or versions. For example WTRUs which may comply with 3GPP or LTE standards releases which may be no later than a certain release such as Release 8, Release 9, or Release 10 may be considered legacy WTRUs. A legacy WTRU may refer to a WTRU which may support or not support certain functionality. For example, a legacy WTRU may be one which may not support certain coverage enhancement techniques such as those which may be introduced for certain devices such as LC-MTC devices or coverage limited LC-MTC devices.

For the physical UL shared data channel (PUSCH), TTI bundling may be supported in up to four consecutive sub-frames (for example, 4 ms) which may provide a coverage improvement of up to 6 dB. Additional techniques may be supported for a PUSCH in order to achieve additional coverage enhancement such as up to 15 or 20 dB. The coverage of the DL shared channels (PDSCHs) may also be improved since TTI bundling in DL PDSCHs has not previously been supported.

Segmentation functionality in an RLC layer may allow for smaller segmented data to be transmitted with increased energy per bit. However, the layer 2 (L2) header overhead added to each segmented data may limit gains to coverage enhancements provided by segmentation. The overhead added by L2 protocol headers may be reduced to further these gains.

As the coverage of the shared channels in both the UL and DL are improved, the coverage of the associated HARQ ACK channels may need to be improved as well in order to support the HARQ process.

Coverage may be degraded for control channels as well as data channels. Since a control channel may be received (e.g., to indicate resources and parameters) for the data channel transmission and/or reception, enhancement for control channel coverage may be needed as well as for data channel coverage.

A PBCH, such as the legacy PBCH, may be transmitted over 40 ms and repeated four times so that a WTRU may integrate signals in a 40 ms window size if a WTRU suffers from low received signal to interference plus noise ratio (SINR) which may be at least because the integration of signals may increase received SINR. However, PBCH signal integration over more than 40 ms may not be possible at least because the SFN which may be carried by the PBCH (e.g., in the MIB) may change every 40 ms. PBCH coverage enhancement techniques may be considered.

PBCH coverage may affect SFN acquisition which may impact an LC-MTC device performing cell access and other procedures that depend on frame level timing. Improvements for determining SFN may be considered. Additionally, LC-MTC specific system information acquisition may be considered for further coverage enhancements.

The eNB may eventually detect and respond to a power-ramped preamble transmission from a WTRU. A LC-MTC device may experience a much higher pathloss, (for example, up to 20 dB), than was anticipated in the LTE system design. For a LC-MTC device experiencing such high pathloss, it may be possible that none of the ramped preambles, including those transmitted with the maximum transmission power, may be detected and responded to by the eNB. As such, methods and procedures may be desirable for a random access procedure for a device such as a LC-MTC device which may be experiencing very high pathloss.

The configuration of a paging channel may not include a HARQ process, and, as such, may not benefit from retransmissions. The PCCH may operate in an RLC TM and may benefit from additional gains from an RLC segmentation process. Methods may be desirable for the PCH to benefit from signaling accumulation for coverage enhancement gains.

In order to improve the coverage of channels such as the enhanced PDCCH (EPDCCH), the PDSCH, and the PUCCH, repetitive transmission may be considered as a coverage enhancement technique. In this case, the current HARQ process, such as the n+4 timing relationship (e.g., for FDD), may not be used since the reference subframe may be redefined among the repetitively transmitted subframes. In addition, the timing relationship between UL grant and PUSCH transmission may also be redefined with a new reference subframe n. The term (E)PDCCH may be used to mean PDCCH and/or EPDCCH, which may also be represented by PDCCH/EPDCCH.

Described herein are methods for enhancing service coverage for data channels in the UL and DL. Given that an LC-MTC WTRU may support very low data rates with high delay tolerance in terms of quality of service, a WTRU may reduce the size of each protocol layer header for each transport block that the WTRU may receive and/or transmit.

In an example embodiment, the PDCP and RLC may allocate a smaller sequence number (SN) size in its headers. In the PDCP, a WTRU may allocate an SN size of smaller than 7 bits. In the RLC, a WTRU may allocate an SN size of smaller than 5 bits for UM or 10 bits for AM. A WTRU may coordinate sizes of RLC and PDCP PDUs such that the resultant PDU with the header and data part may maintain octet (byte) alignment. A WTRU may have a PDCP PDU that is not byte aligned, but the RLC header and PDUs may be processed such that the resulting RLC PDU byte alignment may be maintained.

In another example embodiment, a WTRU may not include the extension ("E") fields in MAC and RLC, thus further reducing the header sizes. For example, a WTRU may be configured for a data radio bearer (DRB), with a very low data rate such that small data packets, (for example, 100 bytes in the UL) may arrive into the PDCP infrequently, (for example, once every hour). A WTRU may then be configured with a small SN size, such as 2 bits, in the PDCP such that the sequence numbers may range from 0 to 3. In RLC, a WTRU may be configured for UM, and the RLC SDU may be segmented into 8 smaller RLC PDUs, and, relatively, the RLC SN size may be specified for 3 bits. Further, a WTRU may not include an RLC or MAC "E" bit into the header since RLC SDUs and MAC SDUs may not be concatenated into the RLC and MAC PDU (for example, 1 PDU per SDU). The WTRU may then perform L1 processing of the resultant MAC PDU for UL transmission. Given the reduced header size, the PDPC may have its header size reduced to 3 bits, its RLC reduced to 6 bits and its MAC reduced to 7 bits. The WTRU and eNB may apply the same reduction of protocol headers in the DL also.

A WTRU may be configured with reduced PDCP, RLC, and MAC header configurations as part of a DRB setup procedure, which may be signaled by the RRC. For example, as part of the RRC procedure, a WTRU may be signaled to apply a 2 bit SN length in the PDCP, apply a 3 bit SN length for RLC with UM mode, and apply a bit to indicate the exclusion of the "E" bit in the MAC header. The WTRU may use a default or pre-defined set of MAC, RLC, and PDCP configurations, which may include the example header configuration defined in the RRC. The WTRU may be explicitly indicated by the network to use the coverage enhancement mode protocol layer parameters, or the WTRU may autonomously use the coverage enhancement mode parameters and signal its use to the network.

In another example embodiment, a WTRU/eNB may reduce RLC header size by scrambling the CRC bits, which may be appended to the MAC PDU, with the SN of the RLC PDU included in the MAC PDU. The WTRU may then remove the SN from the RLC header. For example, independently or in combination with RLC SN size reduction, the WTRU may, upon receiving a MAC PDU, descramble the CRC parity bits with possible SN values prior to performing the CRC check. The WTRU may perform the descrambling based on the entire possible SN range or based on the current RLC receiver window, excluding SNs that have already been received. Once the correct SN has been identified and the MAC PDU has been correctly received, the WTRU may pass the determined SN value to the RLC for proper PDU processing.

In another example embodiment, a WTRU may scramble the CRC parity bits with MAC LCID information. For example, the WTRU may use 5 bit LCID information of the DRB to scramble the CRC parity bits if, for example, there is a single LCID associated with the MAC SDUs that are multiplexed into the MAC PDU.

In another example embodiment, a WTRU may transmit and receive data on the DRB on a single HARQ process for the UL and/or DL direction. For example, given that the LC-MTC WTRU may transmit and receive data at very low data rates with high tolerance for delay, a WTRU may use a single HARQ process in each of the UL and/or DL directions. Since the WTRU may only receive a single MAC PDU at a time, the sequence numbering maintenance burden in both the RLC and PDCP layers may be reduced, further supporting the SN size reduction described above.

In another example embodiment, a WTRU may use a multi-step CRC attachment and computation procedure to reduce CRC size. Here, the WTRU may reduce the overhead from CRC parity bit attachment to the data. For transmitting data, the WTRU may, in the RLC layer, calculate and attach long CRC parity bits to the RLC SDU prior to the segmentation/concatenation procedure. The WTRU may then segment the RLC SDU with CRC parity bits attached to the end of the RLC SDU. The WTRU may, in the PHY layer, calculate and attach a shorter set of CRC parity bits to each MAC PDU prior to transmission. For receiving data, the WTRU may, in the MAC layer, upon reception of the MAC PDU and correct calculation of CRC, consider the reception successful and deliver the corresponding MAC SDU to the RLC.

The WTRU may, in the RLC layer, upon receiving RLC PDUs and successfully reconstructing a RLC SDU, perform a CRC check based on the long CRC calculation and parity bits applied to the RLC SDU. Based on the outcome of the CRC check, if the CRC check passes, the WTRU may deliver the RLC SDU to PDCP. If the CRC check fails, the WTRU may discard the SDU and associated PDUs, for example, if the WTRU has been configured for RLC UM, or may discard the SDU and provide an indication to the transmitter side for re-transmission of the associated PDUs. For example, if the WTRU has been configured for RLC AM, the WTRU may provide an RLC STATUS PDU indicating the SNs of the RLC PDUs that may be part of the discarded RLC SDU.

In an example embodiment, the WTRU may attach a 24-bit CRC to the RLC SDU prior to segmentation in the RLC. For the purpose of this example, the RLC SDU may have been segmented into 8 RLC PDUs. Subsequently, the WTRU may attach an 8-bit CRC to the MAC PDU, which may include the previously segmented RLC SDU. In relative comparison to attaching a 24-bit CRC to each MAC PDU, where the CRC overhead is 24×8=192 bits, the above CRC attachment procedure may yield a 24+8×8=88 bit CRC overhead. The CRC overhead may be further reduced, for example, if the number of segmented RLC PDUs is increased.

Described herein are methods for providing coverage enhancements using TTI bundling. TTI bundling may be used since it may provide a higher received signal-to-noise ratio (SNR).

In an embodiment, if a WTRU is configured with a coverage enhancement mode of operation, TTI bundling may be used with longer than four TTIs, where the number of subframes for TTI bundling may be predefined or configured. In addition, the bundled subframes may be repetitively transmitted over the time, which may further enhance coverage. For example, if $N_{TTI}$ subframes are bundled and the $N_{TTI}$ subframes are repeatedly transmitted ($N_{rep}$), then $N_{TTI} \times N_{rep}$ subframes may be used, effectively, in total. In a broadcasting channel, an indication related to capacity of the coverage enhancement mode of operation may be included so that a WTRU that is capable of entering coverage enhancement mode may select the coverage enhancement mode or report a preferred mode of operation, (for example, coverage enhancement mode), according to the conditions.

One or more of the following may apply for a bundling size ($N_{TTI}$) and/or a repetition rate ($N_{rep}$) for the coverage enhancement mode. In an example, the bundling size and/or repetition rate may be configured via higher layers together with the transmission mode configuration. In another example, a default value of bundling size and/or repetition rate for coverage enhancement mode may be defined, and the default value may be used if a WTRU is configured for or falls under coverage enhancement mode until the WTRU receives WTRU-specific configuration of a bundling size and/or a repetition rate. In this case, the default value may be the largest value among the candidate values, or a WTRU may start to receive the PDSCH with the default value and may perform a certain number of trials of PDSCH reception. If a WTRU fails to receive the PDSCH, the WTRU may increase the bundling size and/or repetition rate with a specific step size. The step size may be predefined and may be the same irrespective of the number of failures or may be different according to the number of failures. In another example, TTI bundling and repetition may be used together, and HARQ-ACK may not be reported until the last bundled TTI is received within the number of repetitions.

In another embodiment, TTI bundling may be supported for up to $N_{TTI}$ subframes, where the $N_{TTI}$ subframes may be configured by an eNB in a semi-static manner. In the embodiments described herein, subframe, TTI and ms may be used interchangeably.

A WTRU may transmit/receive the same data in consecutive $N_{TTI}$ subframes, and the data may be coded with a different redundancy version (RV) according to the subframe index or the location of the subframe among the bundled subframes.

Figure 6:
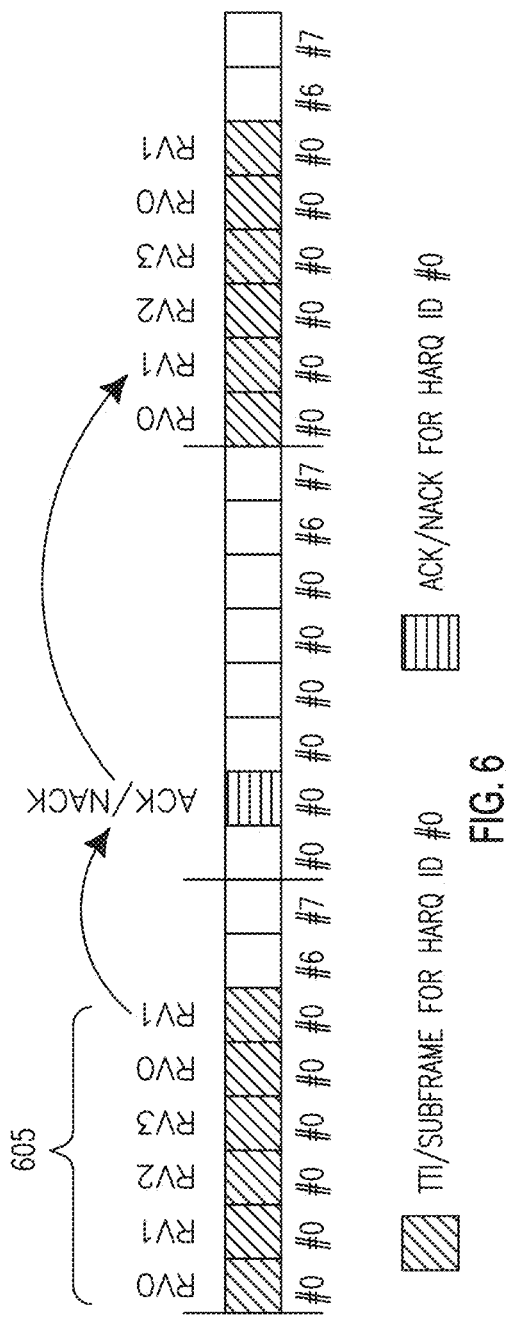
FIG. 6 is a diagram of an example cyclic RV assignment with RV order {0, 1, 2, 3}.

FIG. 6 is a diagram of an example cyclic RV assignment with RV order {0, 1, 2, 3}. The RV may be changed with the order {0, 1, 2, 3} cyclically within a window so that, for example, RV—{0, 1, 2, 3, 0, 1} may be used in order, using an 8-TTI window size, if 6 subframes are bundled (605) as in the example illustrated in FIG. 6. The 8 ms window size may be used when 8 HARQ processes are used for other WTRUs not configured with TTI bundling. The window size may not be defined, thus allowing bundling any subframes while the maximum $N_{TTI}$ may be equal to or smaller than 8.

Figure 7:
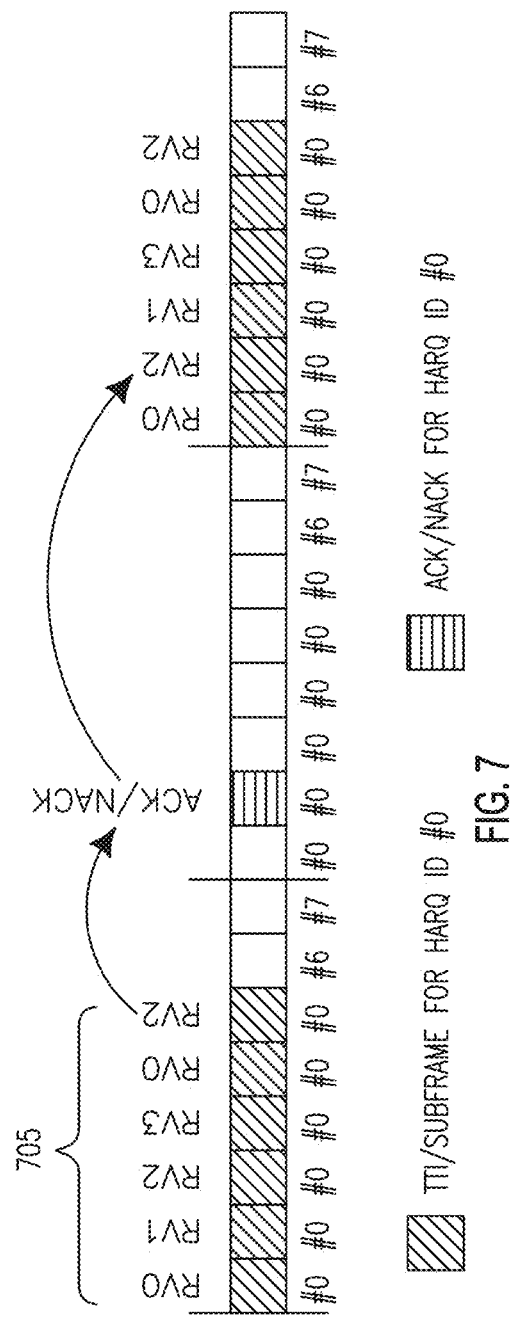
FIG. 7 is a diagram of an example cyclic RV assignment with RV order {0, 2, 1, 3}.

FIG. 7 is a diagram of an example cyclic RV assignment with RV order {0, 2, 1, 3}. The RV may be changed with the order {0, 2, 1, 3} cyclically within a window so that, for example, RV-{0, 2, 1, 3, 0, 2} may be used in order when an 8 TTI window size is used if 6 subframes are bundled (705). In this case, the RV order {0, 2, 1, 3} may be used only for DL TTI bundling, the RV order {0, 2, 1, 3} may be used if the $N_{TTI}$ is larger than a threshold value, (for example, the threshold value may be 4, otherwise, the RV order {0, 1, 2, 3} may be used), and the RV order {0, 2, 1, 3} may be replaced with another RV order such as {1, 3, 0, 2}. More than one RV order, (for example, RV orders {0, 1, 2, 3} and {0, 2, 1, 3}), may be used for transmission and/or reception to or from one or more WTRUs. For example, one RV order, (for example, the RV order {0, 1, 2, 3}), may be used in an initial transmission and the other RV order, (for example, the RV order {0, 2, 1, 3}), may be used for a retransmission.

FIG. 8 is a diagram of an example cyclic RV assignment without window size. The RV may be cyclically changed with an RV order without window size for the retransmission case. For example, if the RV order {0, 1, 2, 3} is used and 6 subframes are bundled (805), RV—{0, 1, 2, 3, 0, 1} may be used for the initial transmission and RV—{2, 3, 0, 1, 2, 3} may be used for the first retransmission. In the example illustrated in FIG. 8, the window may not be defined if the maximum $N_{TTI}$ is equal to or smaller than 8. A WTRU may not transmit/receive any shared data within the subframes not configured for TTI bundling.

A WTRU may transmit/receive the same data in $N_{TTI}$ subframes within a window, and the data may be coded with different RVs according to the subframe index or the location of the subframe among the bundled subframes. The bundled $N_{TTI}$ subframes may be defined as any subset of subframes within the window. In this case, the window size ($N_{window}$) may be defined and/or the subset of subframes for TTI bundling may be indicated by using a bitmap within the window, and the bitmap may be informed via higher layer signaling.

The window size ($N_{window}$) may be defined as at least one of a positive integer number, (that may have a fixed value such as 8), a positive integer number, (that may be configured via higher layer signaling), a positive integer number, (that may be defined as a function of at least one of the system parameters), or a WTRU identity number, (that may be a C-RNTI or IMSI).

FIG. 9 is a diagram of an example of TTI bundling with bitmap indication. The subset of subframes for TTI bundling 905 may be indicated by using a bitmap within the window, and the bitmap may be informed via higher layer signaling.

TTI bundling may be supported for up to $N_{TTI}$ subframes, where $N_{TTI}$ may be configured by an eNB in a dynamic manner. Here, a WTRU may be configured with a specific transmission mode supporting TTI bundling dynamically. For example, a new transmission mode (e.g., TM-x) and its associated new DCI (e.g., DCI format 1E) may be defined. In the new DCI format, indication bits for TTI bundling may be included so that, for each DL/UL data transmission, the $N_{TTI}$ may be defined so that a WTRU may transmit/receive data $N_{TTI}$ times according to the indication.

A set of TTI bundling cases may be defined via higher layer signaling, and the indication bits in the DCI format may indicate one of the bundling sizes within the set. For example, if four TTI bundling cases are defined as $\{N_{TTI,1}=1, N_{TTI,2}=4, N_{TTI,3}=6, N_{TTI,4}=8\}$, then two bits, for example, for the indication may be used in the DCI format to inform which TTI bundling case is used for the UL and/or DL grant. A set of TTI bundling cases may be predefined and fixed for all WTRUs so that higher layer signaling may not be needed to define the set of TTI bundling cases. The indication bits may still be used to indicate which TTI bundling case is used for the UL and/or DL grant. A WTRU may be configured with TTI bundling dynamically, regardless of the transmission mode configured for PUSCH/PDSCH transmission. A WTRU may not monitor (E)PDCCH for PDSCH including DCI formats 1A/2/2A/2B and 2C in the subframe in which the WTRU may receive a PDSCH as a TTI bundled subframe. For example, if a WTRU receives a DCI containing TTI bundling indication ($N_{TTI}$) in subframe n for PDSCH and the TTI bundling indication which indicates $N_{TTI}=3$, the WTRU may receive PDSCH in the bundled TTIs from subframe n to subframe n+2 and the WTRU may not monitor (E)PDCCH within the subframe n+1, and n+2.

Described herein is HARQ processing with TTI bundling. In an embodiment, the bundled TTIs may have a single HARQ_ACK so that a WTRU may transmit/receive a HARQ_ACK after receiving/transmitting bundled TTIs for a PDSCH/PUSCH. A WTRU may transmit a HARQ_ACK when TTI bundling is used in the DL. A WTRU may transmit HARQ_ACK in the UL subframe n+k if the downlink subframe n is the last subframe within the bundled subframes associated with the PDSCH. Here, the k may be defined as a fixed positive integer number, such as k=4. A WTRU may transmit HARQ_ACK in the UL subframe n+k if the downlink subframe n includes the PDCCH or EPDCCH associated with the grant for the PDSCH. In this case, the k may be defined as a function of $N_{TTI}$, (e.g., k=$N_{TTI}$+4).

The subframe n may be the subframe including the PDCCH or EPDCCH associated with the grant for the PDSCH. Here, the k may be defined as a function of the bundling window $N_{window}$ (e.g., k=$N_{window}$+4).

A WTRU may transmit a HARQ_ACK corresponding to the bundled DL transmission if the WTRU successfully received the PDSCH of the bundled DL transmission.

A WTRU may transmit HARQ_ACK in the UL subframe m if the WTRU received a PDSCH within a time window of x ms, (for example, 8 ms). A single PDSCH may be transmitted over one or more subframes within a time window of x ms. The subframe m may be a predefined subframe, which may be located in the next radio frame of the last subframe of the window in which the corresponding PDSCH is transmitted. The PUCCH resource for HARQ_ACK transmission may be defined as a function of the first CCE and/or enhanced CCE (ECCE) index of the PDCCH/EPDCCH associated with the PDSCH. Alternatively, the PUCCH resource may be defined via higher layer signaling. The term (E)CCE may be used to mean CCE and/or ECCE, which may also be represented by CCE/ECCE.

A WTRU may receive a HARQ_ACK when TTI bundling is used in the UL. A WTRU may receive HARQ_ACK in the DL subframe n+k. The UL subframe n may be the latest subframe within the bundled subframes associated with the PUSCH transmission. Here, k may be a fixed number such as 4. The DL subframe n may be the subframe in which a WTRU receives a UL grant for the associated PUSCH. Here, k may be a function of the bundling size or the bundling window. For example, k=$N_{TTI}$+4 or k=$N_{window}$+4.

The bundled TTIs may have two or more HARQ_ACKs so that a WTRU may accumulate the multiple HARQ_ACKs in order to improve the coverage. A WTRU may assume that all individual subframes within the bundled subframes may have an associated HARQ_ACK in the subframe n+k, and the multiple HARQ_ACKs may have the same HARQ indicator (HI) code so that the WTRU may add multiple HARQ_ACKs to improve the coverage. The multiple HARQ_ACKs for the bundled subframes may be used when the $N_{TTI}$ is larger than a threshold. For example, if $N_{TTI}$ is larger than 4, then a WTRU may assume that multiple HARQ_ACKs are transmitted.

A WTRU may assume that a subset of subframes within the bundled subframes may have an associated HARQ_ACK. The WTRU may assume that the subset of subframes have the same HI code. In an embodiment, the multiple HARQ_ACKs for the bundled subframes may be used when the $N_{TTI}$ is larger than a threshold. For example, if $N_{TTI}$ is larger than 4, then a WTRU may assume that multiple HARQ_ACKs are transmitted.

Figure 10:
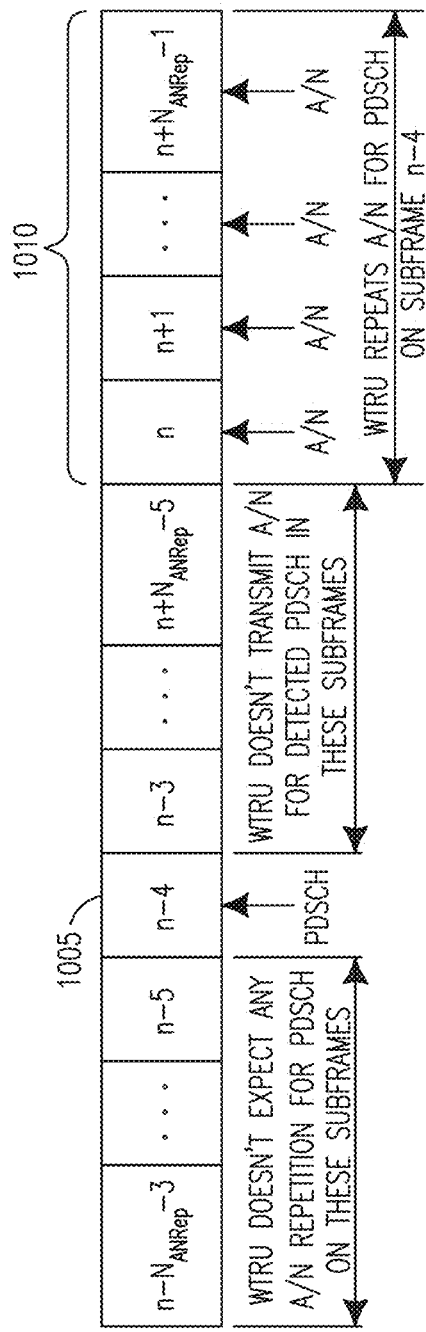
FIG. 10 is a diagram illustrating example behavior of a legacy WTRU for an ACK/NACK repetition embodiment.

FIG. 10 is a diagram illustrating example behavior of a legacy WTRU for an ACK/NACK repetition embodiment. ACK/NACK repetition has been introduced in LTE to enhance coverage for cell edge WTRUs that may be prone to power limitation and/or inter-cell interference. More specifically, if configured, a legacy WTRU may repeatedly transmit ACK/NACK information in the $N_{ANRep}$−1 consecutive subframes following the initial HARQ_ACK transmission. In terms of the HARQ time line when ACK/NAK repetition is enabled, upon detection of a PDSCH transmission in subframe n−4 (1005), the legacy WTRU may transmit the HARQ_ACK response in $N_{ANRep}$ consecutive subframes (1010) starting from subframe n, unless the WTRU is repeating the transmission of an HARQ_ACK in subframe n corresponding to a PDSCH transmission in subframes n−$N_{ANRep}$−3, . . . , n−5. The legacy WTRU also may not transmit any HARQ_ACK response corresponding to any detected PDSCH transmission in subframes n−3, . . . , n+$N_{ANRep}$−5.

Figure 11:
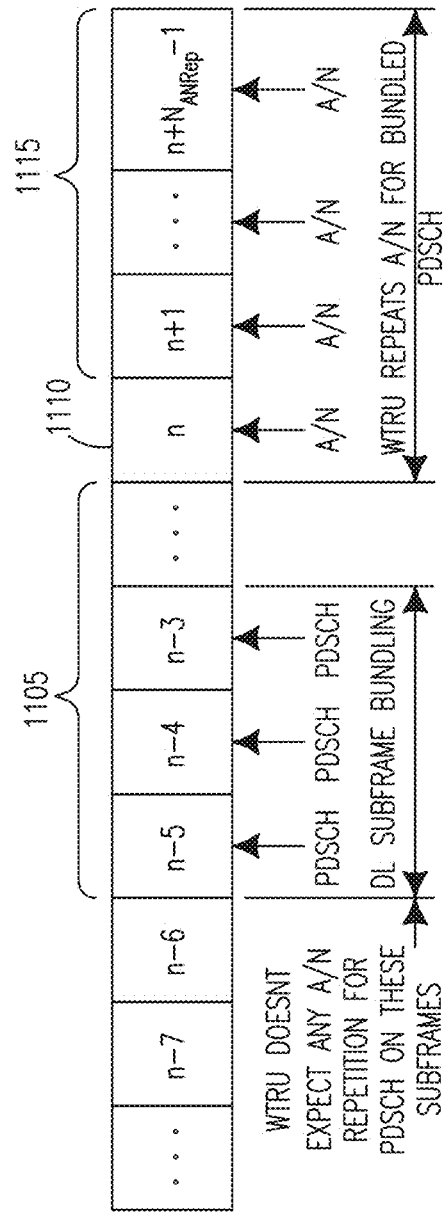
FIG. 11 is a diagram of an example of ACK/NACK repetition for DL subframe bundling.

FIG. 11 is a diagram of an example of ACK/NACK repetition for DL subframe bundling. In an embodiment where subframe bundling is used in the DL to improve DL coverage, a WTRU may repeat the transmission of a single HARQ_ACK response corresponding to the whole PDSCH transmissions within the bundle on the UL. Thus, the WTRU may first collect and decode all PDSCH transmissions within the DL subframe bundle and then generate a single HARQ_ACK response for transmission on the UL. As for UL ACK/NACK timing, according to an embodiment, the WTRU may, upon detection of a PDSCH transmission within subframe(s) n−l (1105), (where l is the index of the subframe within the DL subframe bundle), intended for the WTRU, transmit the initial HARQ_ACK response in UL subframe n (1110) and then repeat the HARQ_ACK response in n+1, . . . , n+$N_{ANRep}$−1 subframes (1115). In the example illustrated in FIG. 11, the index l is 3, 4 or 5, and the size of the DL subframe bundle is three.

For a PDSCH transmission with a corresponding (E)PDCCH detected in subframes within the DL subframe bundle, the WTRU may transmit the initial ACK/NACK response corresponding to the entire DL bundle transmission in UL subframe n and then may repeat the transmission of the corresponding ACK/NACK response for the entire DL bundle transmission on subframes n+1, . . . , n+$N_{ANRep}$−1 using the PUCCH resources derived from the corresponding (E)PDCCH (E)CCE index detected in the bundled subframes. Accordingly, for every subframe within the DL subframe bundle, the WTRU may first detect the (E)PDCCH in that subframe and then derive the PUCCH index for ACK/NACK repetition in the corresponding UL subframe based on the lowest (E)CCE index used to construct the corresponding DCI assignment.

The WTRU may repeat the transmission of the corresponding ACK/NACK response for the entire DL transmission on subframes n+1, . . . , n+$N_{ANRep}$−1 using the PUCCH resource derived from the (E)PDCCH (E)CCE index detected in the last subframe of the bundle, the PUCCH resource derived from the (E)PDCCH (E)CCE index detected in the first subframe of the bundle, or the PUCCH resource configured by higher layer signaling.

For a PDSCH transmission without a corresponding (E)PDCCH detected in the bundled subframes, the WTRU may transmit the initial ACK/NACK response corresponding to the entire DL bundle transmission in UL subframe n and then may repeat the transmission of corresponding ACK/NAK response for the whole transmission on subframes n+1, . . . , n+$N_{ANRep}$−1 using the PUCCH resource derived from the (E)PDCCH (E)CCE index detected in the most recent DL scheduling assignment, or the PUCCH resource configured by higher layer signaling.

In LTE, ACK/NACK repetition may be limited to a repetition factor of four to enhance UL coverage. A WTRU may need to retransmit the ACK/NACK response using a higher repetition factor. The enhanced repetition factor used by the WTRU may be signaled to the WTRU through a higher layer or may be implicitly derived based on subframe bundling parameters used in the DL. For example, this may be indicated by the number of DL subframes within a bundle or a function of the number of DL subframes within a bundle.

Described herein are methods that may be used by the WTRU to improve PHICH coverage in the DL. The methods or embodiments may be employed singularly or in combination with one another.

In an embodiment of PHICH repetition, the WTRU may receive and detect the ACK/NACK (A/N) information associated with the UL PUSCH transmission using multiple PHICH resources. In this embodiment, the ACK/NACK information transmitted on the PHICH may be associated with the UL PUSCH transmission over a single subframe. For a subframe bundling operation, the ACK/NACK feedback may be associated with the bundled PUSCH transmission over multiple subframes. The ACK/NACK feedback may also be distributed over multiple subframes or within a single subframe. This may be different from legacy WTRU operation where a WTRU may process a single PHICH resource for a given subframe corresponding to a single UL transport block.

In terms of PHICH resources, a WTRU may determine the corresponding PHICH resources from physical resource block (PRB) indices of the UL resource allocation. The PRB indices may be associated with the PRBs used for PUSCH transmission within a single subframe. Here, for a given subframe, a WTRU may use the lowest index PRB to determine its first PHICH resource and then determine its other assigned PHICH resources within that subframe by sequentially increasing the PRB index that constitutes its UL resource allocation based on its configured PHICH repetition factor.

Thus, PHICH resources may be identified by the index pair ($n_{PHICH,i}^{group}$, $n_{PHICH,i}^{seq}$), where $n_{PHICH,i}^{group}$ may be the PHICH group number and $n_{PHICH,i}^{seq}$ may be the orthogonal sequence index within the group for the ith PHICH resource, which may be defined by:

$$n_{PHICH,i}^{group} = (I_{PRB\_RA,i} + n_{DMRS}) \bmod N_{PHICH,i}^{group} + I_{PHICH} N_{PHICH,i}^{group} \quad \text{Equation 8}$$

$$n_{PHICH,i}^{seq} = (\lfloor I_{PRB\_RA,i}/N_{PHICH,i}^{group} \rfloor + n_{DMRS}) \bmod 2N_{SF}^{PHICH},$$

where $$I_{PRB\_RA,i} = \begin{cases} I_{PRB\_RA}^{lowest\_index} + i \\ i = 0, \ldots, N_{PHICH\,Rep} - 1 \end{cases}, \quad \text{Equation 9}$$

with $N_{PHICHRep}$ being the PHICH repetition factor.

For a subframe bundling operation, PHICH resources may be derived from the PRB indices associated with UL transmissions over multiple UL subframes in the bundle. This approach may be different from that of the legacy WTRU behavior wherein the corresponding PHICH resource is exclusively associated with the last subframe in the bundle.

In terms of PHICH resources, a WTRU may determine the corresponding PHICH resources from UL demodulation reference symbol (DMRS) cyclic shift associated with PUSCH transmission(s). DMRS cyclic shifts may be associated with the PUSCH transmission within a single subframe. Here, for a given subframe, the WTRU may use the cyclic shift from the DMRS field in the most recent PDCCH to determine its first PHICH resource and then determine its other assigned PHICH resources within that subframe by sequentially increasing the cyclic shifts. There may, however, be a limit of a maximum of eight cyclic shifts that may be used by the WTRU. Thus, PHICH resources may be identified by the index pair ($n_{PHICH,i}^{group}$, $n_{PHICH,i}^{seq}$) where $n_{PHICH,i}^{group}$ is the PHICH group number and $n_{PHICH,i}^{seq}$ is the orthogonal sequence index within the group for the ith PHICH resource as defined by:

$$n_{PHICH,i}^{group} = (I_{PRB\_RA} + n_{DMRS,i}) \bmod N_{PHICH,i}^{group} + I_{PHICH} N_{PHICH,i}^{group} \quad \text{Equation 10}$$

$$n_{PHICH,i}^{seq} = (\lfloor I_{PRB\_RA}/N_{PHICH,i}^{group} \rfloor + n_{DMRS,i}) \bmod 2N_{SF}^{PHICH},$$

where $$n_{DRMS,i} = \begin{cases} n_{DMRS} + i \\ i = 0, \ldots, N_{PHICH\,Rep} - 1 \end{cases}, \quad \text{Equation 11}$$

with $N_{PHICHRep}$ as the PHICH repetition factor.

In an embodiment of PHICH power boosting, depending on a WTRU's channel conditions, power control may be applied on the PHICH. Power boosting, together with ACK/NACK repetition using multiple PHICH resources, may considerably enhance the coverage of the PHICH.

In a PHICH without code-division multiplexing (CDM), a legacy PHICH group may include multiple PHICH resources that are code-division multiplexed and mapped to the same set of resource elements. This may result in power splitting across multiple PHICH resources at the transmitter. Further, due to channel estimation error at the WTRU, orthogonality among PHICH resources that are code-division multiplexed within a PHICH group may be lost, which, in turn, may result in loss of coverage. In an embodiment, a WTRU may assume that there is only one PHICH resource utilized within the PHICH group without any code-division multiplexing.

In an embodiment, a PHICH, or a group of PHICHs, may be transmitted using enhanced PHICH (EPHICH). For example, a new DCI format may be defined to carry information for PHICH or a group of PHICHs. For another example, a DCI including A/N information may be transmitted in a specific (E)PDCCH location including (E)PDCCH common search space. Alternatively, a DCI including A/N information may be transmitted in a predefined (E)CCE or a higher layer configured (E)CCE. For another example, a new RNTI may be defined for detection of a DCI including A/N information. For example, a HARQ RNTI (HA-RNTI) may be defined, and if a WTRU transmitted the PUSCH in a subframe n, the WTRU may monitor a DCI that includes corresponding A/N information whose CRC may be scrambled with an HA-RNTI in the subframe n+k, where the k may be 4 in an FDD case.

The location of an A/N information bit for a WTRU transmitting the PUSCH in a subframe n may be defined and may include at least one of the starting (E)CCE number of a corresponding UL grant, the starting PRB number for a PUSCH transmission, cyclic shift of the uplink DM-RS, or a higher layer configured value. The number of DCIs including A/N information may be configured as the number of PHICH groups.

Described herein are coverage enhancement methods to improve coverage of an (E)PDCCH carrying DCI that includes A/N information. The (E)PDCCH has been used for DL/UL grants, broadcasting channel transmissions, paging, RACH responses, group power control, and the like. DCI formats have been introduced to support various DL/UL transmission modes, such as DCI formats 0 and 4 for UL grant, DCI formats 1A, 1B, 1C, 2, 2A, 2B, 2C for DL transmission, and DCI formats 3 and 3A for group power control. Embodiments described herein may be applied for both PDCCH and EPDCCH or may only be applicable for either PDCCH or EPDCCH. Terminology typically used with respect to the PDCCH, such as CCE, resource element group (REG), PDCCH candidates, and search space, may be used interchangeably with ECCE, enhanced REG (EREG) and EPDCCH candidates and search space.

In an embodiment, DCI contents may be downsized for better coverage. Since (E)PDCCH link adaptation may be based on the number of (E)CCEs, the number of (E)CCEs may be closely related to the coverage of the (E)PDCCH. For example, 1 CCE may be equivalent to the coding rate 1/2. Thus, the 2 CCEs may be equivalent to the coding rate 1/4 because double the number of (E)PDCCH resources are used for a DCI transmission. Since there are four CCE aggregation levels available, (for example, {1, 2, 4, 8}), reducing DCI contents may increase the coverage of the (E)PDCCH in a given (E)CCE aggregation level.

A new DCI format associated with DL transmission and/or UL grant may be defined, for example, for this category of WTRUs. Two or less bits may be used for HARQ process number indication, which implies that the number of HARQ processes may be reduced from 8 HARQ processes. No HARQ process number field may be included in the DCI so that a single HARQ process or a synchronous HARQ process is used. Four or less bits may be used for a modulation and coding scheme (MCS) indication. Assuming that N-bit (N<5) may be used for the MCS, the most significant bit (MSB) of the 5-bit MCS table may be assumed at the receiver, and the least significant bit (LSB) may be assumed as a predefined bit. For example, a 3-bit MCS field (N=3) may be used in a new DCI format, the three bits corresponding to the first three bits of the MCS table, and the two bit LSB may be predefined as '00'. Therefore, the three bits of the MCS table may be used with the 3-bit MCS field, and a WTRU may interpret the 3-bit MCS field as xxx00, where xxx is the MSB of the 5-bit MCS field and '00' is the 2-bit LSB. Alternatively, a 3-bit MCS field may be considered as a part of the LSB, and the MSB may be predefined. For both alternatives, the LSB part or MSB part of the 5-bit MCS field, which is not indicated by the 3-bit MCS field in the new DCI format, may be either predefined or configured by higher layer signaling and/or broadcasting.

A new MCS table may be defined with an N-bit MCS field, and the new MCS table may be defined with a subset of a previous release 5-bit MCS table.

The resource allocation bits, according to the resource allocation type (0, 1, and/or 2), may be reduced by limiting the maximum number of PRBs used for PDSCH transmission. For example, assuming that 25 PRB-pairs are available in a DL system bandwidth, the maximum number of PRBs allocated in a subframe may be limited to 6 PRB pairs so that the number of bits for resource allocation may be reduced since the resource allocation indication may be needed within restricted number of PRB pairs such as 6 PRB pairs instead of 25 PRBs for example. Alternatively, the resource allocation field may not be used in a new DCI format while using higher layer signaling instead. Therefore, a DL resource allocation in a frequency domain may be a semi-static allocation, while the time allocation may be based on the (E)PDCCH. For example, a WTRU may receive PDSCH or EPDCCH in the configured PRB pairs among the PRB pairs in the system while the WTRU may be indicated to receive a PDSCH or not in the subframe via (E)PDCCH.

The redundancy version may be removed or downsized in a new DCI format. For example, the redundancy version may be fixed as '0,' and no bit field for a redundancy version may be used. Assuming that a lower coding rate may be used for a new DCI format to support better coverage, the other redundancy versions {i.e., 1, 2, and 3} may not be needed and a single redundancy version may be sufficient. Therefore, a single redundancy version among {0, 1, 2, or 3} may be used as a fixed manner. Alternatively, a 1-bit redundancy version may be used so that two out of four redundancy versions may be used.

In another embodiment, a repetition or extension of the (E)PDCCH format may be used to improve (E)PDCCH coverage. The repetition of (E)PDCCH may be applied in a subframe or over multiple subframes. For embodiments described herein, (E)PDCCH coverage enhancement mode, (E)PDCCH coverage extension mode, coverage enhancement mode, and coverage enhanced mode may be used interchangeably.

The (E)CCE aggregation levels may be different so that (E)PDCCH candidates may have larger aggregation levels as compared with the legacy (E)PDCCH. For instance, the aggregation levels {2, 4, 8, 16} or {4, 8, 16, 32} may be used for coverage enhancement mode for which the (E)PDCCH coverage enhancement mode may only be applicable to a WTRU-specific search space, the PDCCH coverage enhancement mode may be used irrespective of the transmission, or the PDCCH coverage enhancement mode may be applicable for a specific DCI format and/or transmission mode.

The (E)CCE aggregation level set for WTRU-specific or common search space may be different according to the WTRU mode of operation. The WTRU mode of operation may include coverage enhancement mode. A larger (E)CCE aggregation level set (e.g., {16, 32}) may be used if a WTRU is configured as the coverage enhancement mode of operation while the legacy (E)CCE aggregation level sets (e.g., {4, 8}) may be used if a WTRU is not configured as the coverage enhancement mode of operation. A WTRU may be configured as coverage enhancement mode of operation via higher layer signaling or indicated during PRACH procedures.

The (E)CCE aggregation level set may be configured or defined according to the PRACH resource used for PRACH preamble transmission from a WTRU. A larger (E)CCE aggregation level set may be used if a WTRU received RAR by using PRACH resource which may be used for coverage enhancement mode of operation. A smaller (E)CCE aggregation level set may be used if a WTRU received RAR by using PRACH resource which may be configured for a WTRU without coverage limitation.

The (E)CCE aggregation level set may be configured or defined according to the coverage limitation level of a WTRU where the coverage limitation level may be defined by one or more of RSRP, pathloss, timing advance, and PRACH resource. For example, if pathloss or RSRP calculated at a WTRU receiver is lower than a predefined threshold, the WTRU may determine a larger (E)CCE aggregation level set among the (E)CCE aggregation level set candidates.

A default WTRU-specific search space may be defined for the (E)PDCCH coverage enhancement mode, where a subset of aggregation levels may be used. For example, if {1, 2, 4, 8, 16, 32, 64} is the set of aggregation levels used for an (E)PDCCH coverage enhancement mode, a subset {2, 4, 8, 16} may be used in the default WTRU-specific search space. Therefore, a WTRU before a WTRU-specific configuration may monitor the (E)PDCCH in a default WTRU-specific search space with the subset of aggregation levels {2, 4, 8, 16}. If a WTRU fails to decode the (E)PDCCH within the default WTRU-specific search space for a certain number of trials or over a period of time, the WTRU may autonomously change the aggregation levels to a higher aggregation level set (e.g., {4, 8, 16, 32}). Alternatively, a WTRU may monitor the default WTRU-specific search space until the WTRU receives a WTRU-specific configuration from higher layer.

Two or more of default WTRU-specific search spaces (WSS) may be defined in different time/frequency resources, and the aggregation level set may be different according to the location of the default WTRU-specific search spaces. For example, two default WTRU-specific search spaces may be, for example, default WSS1 and default WSS2, and the aggregation level set {1, 2, 4, 8} may be used for the default WSS1 and the aggregation level set {16, 32, 64, 128} may be used for the default WSS2. A WTRU may be informed which default WSS the WTRU may need to monitor implicitly during the PRACH procedure.

The subframes may be bundled for an (E)PDCCH transmission in the (E)PDCCH coverage enhancement mode. For instance, an (E)PDCCH may be transmitted for K-subframes (where K>1). Within the bundled subframe, the starting (E)CCE number may be the same so that a WTRU may integrate the (E)CCEs over multiple subframes without demodulation. The (E)PDCCH coverage enhancement mode may be applicable to a WTRU-specific search space. The (E)PDCCH coverage enhancement mode may be used irrespective of the transmission. The (E)PDCCH coverage enhancement mode may only be applicable for a specific DCI format and/or transmission mode.

WTRU behavior may be defined by two control channel modes (mode-1 and mode-2) and may be configured by higher layer signaling. The mode-1 may be called/defined as, but not limited, normal mode, legacy mode, normal coverage mode, and/or legacy coverage mode. The mode-2 may be called/defined as, but not limited to, extended mode, coverage extension mode, extend coverage mode, and larger coverage mode. A WTRU may be configured with any type of transmission mode (TM-1~TM-10) and control channel mode. A WTRU category may be defined with one or more control channel coverage extension schemes. Therefore, a WTRU that falls under this category may know which type of control channel mode needs to be used. This WTRU category using control channel coverage extension scheme may first work as the other category WTRUs until the WTRU transmits the WTRU category to the eNB.

Two modes of operation may be defined as normal mode and coverage enhancement mode. If a WTRU switches to or falls under coverage enhancement mode, the solutions for (E)PDCCH coverage enhancement mode may be used.

Described herein is closed-loop MIMO operation with enhanced feedback. In an example method for (E)PDCCH coverage enhancement, closed-loop beamforming with large feedback overhead may be used. While the LC-MTC device may suffer from short coverage, the channel status may be static since the LC-MTC device may be located, for example, in a basement. Therefore, closed-loop beamforming with larger feedback overhead may be reported for better beamforming gain at least because the channel is not changing frequently. Here, a channel quality indicator (CQI)/precoder matrix indicator (PMI) and/or rank indicator (RI) may apply and/or a WTRU may report a channel covariance matrix in a long-term manner when a WTRU is configured with control channel coverage extension mode. If a WTRU is configured with control channel coverage extension mode, the WTRU may need to report explicit channel feedback. Here, the explicit channel feedback may include wideband and/or subband channel covariance matrix, wideband and/or subband quantized channel matrix, and/or multi-rank PMIs, the explicit channel feedback may be reported via higher layer signaling, and/or whether the explicit channel feedback is reported or not may be based on eNB configuration.

Described herein are methods for providing enhanced or improved PBCH coverage. The PBCH may include some important information for initial access in order to allow DL signal reception at a WTRU receiver, such as DL system bandwidth, SFN number information, (for example, 8 MSBs of a 10 bit SFN), PHICH configuration, and number of common reference signal (CRS) ports. Embodiments described herein may provide robust system information for a WTRU suffering from low received SINR. Some embodiments may be based on actual PBCH coverage enhancement and other embodiments may use another container for carrying the system information.

In an embodiment, a new PBCH may be used or may be intended for use by or for certain WTRUs such as WTRUs which may be experiencing coverage limitation. The new PBCH may be referred to herein as enhanced PBCH or ePBCH and new PBCH may be used interchangeably with those terms. The ePBCH may be transmitted in addition to the legacy PBCH which may enable backward compatibility, for example in a system or on a carrier which may or may be intended to support legacy signals and/or legacy WTRUs. The ePBCH may be transmitted in a non-backward compatible carrier, (for example, a new carrier type) which may not or may not be intended to support certain legacy signals and/or legacy WTRUs. The ePBCH may be different from the legacy PBCH in terms of at least one of a transmission scheme, a time/frequency position or a repetition frequency (for example in subframes and/or frames).

In an example, the ePBCH may use a DM-RS based transmission, thus using at least one of, but not limited to, an antenna port {107, 108, 109, 110} or {7, 8, 9, 10}. Alternatively, a new antenna port may be defined. The DM-RS may be scrambled with a physical cell-ID or physical cell identity (PCI). A DM-RS based TxD may be used for the broadcasting channels. For example, a 2Tx or 4Tx transmit diversity (TxD) scheme. One of a transmission scheme among a single antenna port, 2Tx TxD, or 4Tx TxD may be used in a predefined manner. One of a transmission scheme among a single antenna port, 2Tx TxD, or 4Tx TxD may be used, and a WTRU may need to blindly decode one of them.

The antenna port number for the single antenna port 2Tx TxD and/or 4Tx TxD may be defined in at least one of following manners: a single antenna port may be predefined as a fixed antenna port number, such as port-107, or a single antenna port may be configured as a function of PCI among the antenna ports {107, 108, 109, 110} or {107, 108} with modulo operation. For example, a modulo-4 operation may be used with the PCI, such as n=(PCI)modulo-4, and the n may indicate one of the antenna ports. Two or four antenna ports may be predefined, such as {107, 109} for 2Tx and {107, 108, 109, 110}. For a simple system design, a single antenna port and 2Tx TxD may be used for the ePBCH transmission.

In another embodiment, an ePBCH may be located in a number of PRBs such as 6 or fewer PRBs which may be the center PRBs, for example a center 6 PRBs, where center may be with respect to the transmission bandwidth. The ePBCH may be in different subframes from the legacy PBCH. Since the legacy PBCH may be or may always be transmitted in the first subframe in a radio frame, the ePBCH may be located in other subframes. The ePBCH may be located in different PRBs from the legacy PBCH and if located in different PRBs (or non-overlapping resources) may be located in the same subframe as the legacy PBCH. In each subframe in which an ePBCH may be located, the same PRBs may be used for the ePBCH.

The ePBCH and/or legacy PBCH may be transmitted by an eNB or cell.

In an embodiment, the ePBCH may be located in one or more subframes in each radio frame or certain radio frames, for example, radio frames with certain SFN numbers or radio frames with SFNs with certain properties, where located and transmitted may be used interchangeably. Examples of SFNs with certain properties may include SFNs where the SFN modulo of a certain number X equals 0 or another value, SFNs where the most significant n bits of the SFN modulo of a certain number X equals 0 or another value, or SFNs where the (SFN plus an offset Y) modulo of a certain number X equals 0 or another value. An example of certain SFNs may be one or more sets of consecutive SFNs where the starting SFN of each set may have certain properties such as one of the SFN properties above, for example the most significant n bits (which may include all the bits) of the SFN modulo of a certain number X equals 0 or another value. The subframes and/or radio frames and/or radio frame properties for the ePBCH may be fixed or may be a function of the cell's physical cell identifier (PCI) and/or other system parameters.

In an example, the ePBCH may be located in one or more subframes in certain radio frames, where the certain radio frames may be a certain (e.g., predefined) subset of radio frames, for example within an SFN cycle (which may include 1024 radio frames which may be numbered from 0 to 1023). The subset of radio frames may occur or be located periodically. For example, the ePBCH may be located in a number, e.g., four, consecutive radio frames with a certain periodicity (e.g., repeating every x-ms or y-radio frames where x and y may be a positive integer number). The starting radio frame (e.g., the lowest SFN number) of the subset of radio frames (or of each period of radio frames) containing ePBCH may be determined or defined as a function of one or more system parameters and/or PCI. As an alternative to the frames being consecutive, they may be separated by a certain (e.g., fixed) number of frames. In the embodiments described herein, frame and radio frame may be used interchangeably.

In some embodiments, associated with each radio frame which may be transmitted by an eNB or a cell, and/or received by a WTRU may be a system frame number (SFN). The SFN or a part of SFN may be transmitted or broadcasted in at least one subframe of each radio frame (for example, 8 bits of SFN may be broadcasted in legacy PBCH in subframe 0 of every radio frame). The SFN may have a cycle of N frames such that the SFN number may have a range from 0 to N−1 and after reaching frame N−1 may begin again from 0 in the next frame. For a system such as LTE, N may be 1024. N frames may constitute an SFN cycle.

The information, e.g., system information, carried by the ePBCH may be the same for a certain period of time such as one or more repetition periods or one or more SFN cycles, or may be the same in all radio frames unless, for example, the system parameters of the cell may be reconfigured.

In an embodiment, an ePBCH located in a certain radio frame may have the same signal structure as a legacy PBCH which may be transmitted in the certain radio frame, for example in subframe 0. Signal structure may include at least one of information, information bits, and coded bits. The ePBCH may be transmitted in one or more subframes in the certain radio frame and may have in each of those subframes the same signal structure as the legacy PBCH in the certain radio frame. In each of the subframes in which the ePBCH may be transmitted in a certain radio frame, ePBCH transmission may be in the same time/frequency location as the legacy PBCH which may be transmitted in subframe 0. For example, an ePBCH transmitted in one or more subframes in radio frame m may have the same signal structure as a legacy PBCH which may be transmitted in subframe 0. For ePBCH transmitted in consecutive frames such as four consecutive frames, e.g., frames m, m+1, m+2, and m+3, in each of those frames, the ePBCH, which may be located in one or more subframes in each frame, may have the same signal structure as the PBCH of that frame (e.g., ePBCH in m may have the same signal structure as PBCH in m, ePBCH in m+1 may have the same signal structure as PBCH in m+1, etc.) where the PBCH signal structure may be different in one or more of those frames (e.g., different in each of those frames). The ePBCH in each subframe of a frame may have the same signal structure.

In an embodiment, an ePBCH located in a certain radio frame may have the same signal structure in each of the subframes of the certain radio frame in which the ePBCH is located. The ePBCH may have a different signal structure for different radio frames. For example, for ePBCH transmitted in consecutive frames such as four consecutive frames, e.g., frames m, m+1, m+2, and m+3, in each of those frames, the ePBCH signal structure may the same in the subframes in which the ePBCH is transmitted, but may be different in the different frames. This may correspond to repeating coded bits within a frame and distributing the coded bits across frames.

In another embodiment, an ePBCH located in a certain radio frame may have a different signal structure in each of the subframes of the certain radio frame in which the ePBCH is located and the ePBCH transmission in radio frames within a certain period may be the same. For example, for ePBCH transmitted in consecutive frames such as four consecutive frames, e.g., frames m, m+1, m+2, and m+3, in each of those frames, the ePBCH signal structure may be different in each of the subframes in which the ePBCH is transmitted and the transmissions in the consecutive frames may be the same. This may correspond to distributing the coded bits within a frame and repeating in multiple frames.

In another example, ePBCH may include a smaller payload size than that of the legacy PBCH. This may be possible since the configuration options may not need as many bits as defined for the legacy MIB. The ePBCH may include, for example a 3 bit DL system bandwidth (which may be sufficient for the options which may be 6, 15, 25, 50, 75, and 100 PRBs), a 3 bit PHICH configuration (which may be sufficient for the options which may include normal and extended duration and resource equal to oneSixth, half, one, and two), an 8 bit SFN and a 16 bit CRC, which may result in a 30 bit payload size for ePBCH. Alternatively, 3 bit DL system bandwidth, 3 bit PHICH configuration, and 8 bit SFN number with 8 bit CRC may be used, thus resulting in 22 bit payload size. Alternatively, one or more of system information may be removed from the ePBCH payload such as PHICH configuration.

In another embodiment, a WTRU may determine SFN based on the location of ePBCH, for example based on the frame or frames in which the WTRU may determine ePBCH to be present. In this case, the ePBCH payload may not include bits (e.g., 8 bits) for SFN number. For example, ePBCH may be located in certain frames, such as consecutive frames (e.g., four consecutive frames) which may have a certain SFN property, for example the SFN of the consecutive frames may have the same k most significant bits, for example k may equal 8 and/or may be determined based on one or more system parameters and and/or PCI.

In an embodiment, a WTRU may determine the SFN of a radio frame (e.g., of one or more radio frames in a set such as a consecutive set of radio frames, e.g., the first radio frame in the set) based on information carried by the ePBCH and/or based on the frame or frames in which the WTRU may determine ePBCH to be present. The WTRU may, for example, use a window approach in which it may know what to expect regarding ePBCH (e.g., format, content, coding, and the like) in a set of subframes within a set of frames (e.g., 3 subframes in each of 4 consecutive frames) in which ePBCH may be present. The WTRU may move the window from one set of frames to the next, may attempt to decode ePBCH (which may include combining across subframes and/or frames as needed to achieve gain), and may move the window a number such as one frame at a time until it may decode ePBCH information bits. Once the WTRU may successfully decode the ePBCH, it may obtain the SFN (e.g., SFN of the first frame of the window) from the information bits, or the WTRU may determine the SFN based on the frames in which it may have found the ePBCH, for example, based on the certain (e.g., certain known) SFNs or certain (e.g., certain known) SFN properties of the frames in which ePBCH may be found. As a variation, PBCH may be used in addition to ePBCH, for example in the case that the ePBCH signal structure in a frame is the same as the PBCH signal structure in the frame. PBCH may be treated in the same manner as if it were ePBCH and may be combined with ePBCH, for example to achieve gain.

In another embodiment, the ePBCH subframe or subframes within a frame may be located with a subframe offset so that a WTRU may know the subframe(s) in which ePBCH may be located and in which successful ePBCH demodulation may be possible. Since a WTRU may synchronize with a cell before attempting to receive the legacy PBCH and the synchronization signals may be transmitted in known subframes, the WTRU may know which subframes may include a legacy PBCH or the sync channels after finishing synchronization. The WTRU may determine the location of the ePBCH with the subframe offset (or offsets), which may be an offset (or offsets) from the subframe of the sync channels (primary synchronization signal (PSS) or secondary synchronization signal (SSS)), or the subframe in which the legacy PBCH may be found.

In an example, the subframe offset may be predefined as a fixed number, such as $N_{offset}=4$, or the subframe offset may be configured as a function of the physical cell ID (PCI), for example with modulo operation. For example, $N_{offset}=(PCI)$ modulo-K, where the K could be a predefined number which may, for example, be larger than 2 and/or smaller than 10. For ePBCH in more than one subframe in a frame, there may be more than one offset.

In an example for TDD, the subframe offset(s) may be a function of the TDD UL/DL configuration.

In another example, multiple subframe offsets may be used for the repetition. For example, $N_{offset,1}$ and $N_{offset,2}$ may be used in order to transmit the ePBCH more frequently. The subframe offsets may be predefined as fixed numbers or configured as a function of the physical cell-ID.

In another embodiment for an ePBCH, a smaller number of bits may be used for an SFN indication. For example, a 7-bit or less SFN number indicator may be used instead of an 8 bit SFN number so that the SFN number provided by the ePBCH may be the same in a longer time window. If a 7 bit SFN number indicator may be used, the 7 bit SFN number may, for example, indicate the most significant 7 bits of 10 bit SFN numbers, and a WTRU may implicitly detect the least significant 3 bit number 000, 001, 010, 011, 100, 101, 110, and 111 in each radio frame from, for example, the scrambling code of coded bits, where a broadcast channel (BCH) transport block may be coded/rate-matched and scrambled in bit level so that each radio frame may have a different part of scrambled coded bits. For a 7 bit SFN indication, the ePBCH time window may be 80 ms, which may be double the legacy PBCH time window, where the PBCH time window may be considered as the TTI for a PBCH transmission.

In another embodiment, if both a legacy PBCH and an ePBCH may be transmitted in the same cell, a WTRU behavior for the PBCH reception may include at least one of the following example behaviors. In an example, a WTRU may measure Reference Signal Receive Power (RSRP) before the reception of the PBCH, and if the measured RSRP is lower than a threshold, the WTRU may (or may start to) attempt to receive and/or decode ePBCH. Otherwise, the WTRU may (or may start to) attempt to receive and/or decode legacy PBCH. In another example, a WTRU may (or may start to) attempt to receive and/or decode a legacy PBCH, for example, at the beginning of an initial access, and if the WTRU may fail to receive and/or decode the legacy PBCH, for example within a certain number of attempts (which may be predefined or implementation dependent), then the WTRU may stop attempting to receive and/or decode the legacy PBCH and may (or may start to) attempt to receive and/or decode the ePBCH. In another example, if a WTRU may fall under or be of a specific WTRU category, the WTRU may or may always attempt or start to attempt to receive and/or decode the ePBCH which may be instead of or in addition to attempting to receive and/or decode the legacy PBCH.

In another example, if both a legacy PBCH and an ePBCH may be transmitted in the same cell, a WTRU behavior for the PBCH reception may include at least one of the following. A WTRU may (or may start to) attempt to receive and/or decode a legacy PBCH, for example, at the beginning of an initial access, and if the WTRU may fail to receive and/or decode the legacy PBCH, for example within a certain number of attempts (which may be predefined or implementation dependent), then the WTRU may (or may start to) attempt to receive and/or decode the ePBCH. The WTRU may combine ePBCH reception (e.g., ePBCH bits which may be demodulated bits) with legacy PBCH reception (e.g., PBCH bits which may be demodulated bits) to achieve gain. Alternatively, the WTRU may make the decision to attempt (or start to attempt) to receive and/or decode ePBCH in addition to a legacy PBCH based on RSRP or another measurement meeting a certain criteria such as being below a threshold. Alternatively, the WTRU may make the decision to attempt (or start to attempt) to receive and/or decode ePBCH or a legacy PBCH based on RSRP measurement or another measurement meeting a certain criteria such as being below a threshold.

Described herein are certain WTRUs, such as WTRUs which may have low received SINR or which may fall under or be a certain WTRU category, which may not be able to successfully receive system information which may be carried via a legacy PBCH. Another channel may provide and/or may be used by a WTRU such as the certain WTRU to receive system information, such as one or more of the elements of system information typically provided by the legacy PBCH.

An (E)PDCCH common search space (or a newly defined search space) may be used to carry system information, such as at least one of DL system bandwidth, PHICH configuration, and SFN number. The (E)PDCCH common search space or subset of the (E)PDCCH common search space, (or other search space, such as a system information search space (for example, system information PDCCH (SI-PDCCH))), may be used for carrying system information.

A new DCI format may be defined for the system information. For example, DCI format-x may be defined for the system information and may include one or more of the following: DL system bandwidth, PHICH configuration, SFN number. The DCI format may contain the same information provided by the legacy PBCH and that information may represented the same way (e.g., the information elements (IEs) of the MIB may be included in the DCI). The same coding chain with other DCI formats may be used for the system information DCI format-x. Predefined ECCE numbers may be used for the DCI format-x. Here, the aggregation level may be a predefined number (for example, 8), or multiple aggregation levels may be used in a blind decoding manner.

The DCI format-x that may include system information may be transmitted periodically in a predefined subframe. For example, in every subframe 4 in a radio frame, the DCI format-x may be transmitted within the EPDCCH common search space, (or other search space that may be used for system information).

The subframe location in a radio frame may be different, such as 2, 3, 4, or 6. Therefore, a WTRU under a coverage enhancement mode of operation may decode the DCI format-x which may include system information rather than the PBCH.

In TDD, the subframe location may be defined as a function of the TDD UL/DL subframe configuration. For example, subframe 4 may be used in UL/DL subframe configuration 1, while subframe 3 may be used in UL/DL subframe configuration 2.

Consecutive subframes, or multiple subframes, which may be in a certain time window, may include the DCI format-x without changing the SFN number. In order to improve the coverage, the DCI format-x may be transmitted repetitively for multiple subframes which may, for example, be consecutive DL subframes. Since the SFN may not be changed in these multiple subframes, a WTRU may integrate the DCI format-x to improve the coverage. The time window may be a radio frame. The multiple subframes in which DCI format-x may be transmitted without changing the SFN number may be in the same frame.

Two types of (E)PDCCH may be defined, such as type-1 and type-2 (E)PDCCH common search spaces (CSS), and one of the (E)PDCCH common search space types may be used for system information. The type-1 (E)PDCCH CSS may be interchangeably used with Cell-specific (E)PDCCH CSS, system (E)PDCCH CSS, predefined (E)PDCCH CSS, distributed (E)PDCCH CSS and/or broadcasting (E)PDCCH CSS. The type-1 (E)PDCCH CSS location may be predefined within the center 6 RBs and may not be transmitted in all subframes. For example, in FDD, the type-1 (E)PDCCH CSS may be, or may only be, transmitted in all or a subset of the subframes {1, 2, 3, 4, 6, 7, 8, 9}. The type-1 (E)PDCCH CSS may be transmitted in a subset of the radio frames. The type-2 (E)PDCCH CSS may be interchangeably used with WTRU-specific (E)PDCCH CSS, eNB configured (E)PDCCH CSS, and/or localized (E)PDCCH CSS. The type-2 (E)PDCCH CSS location may be configured by higher layer signaling and/or a broadcasting channel. The broadcasting channel may include the DCI format-x. The DCI format-x for the system information may be transmitted in the type-1 (E)PDCCH CSS.

A newly defined search space to use for system information (for example, SI-PDCCH), may have the properties described above for type-1 (E)PDCCH. Based on the means in which an eNB (or cell) transmits certain system information, (for example, the system information that may be included in the legacy PBCH, for example, to a certain WTRU that may be part of a certain group of WTRUs and/or based on the means in which a WTRU receives such information), one or more of the following may apply. An eNB or cell communicating with a certain WTRU may not provide a PHICH in response to a UL transmission from the WTRU that was granted or scheduled by the eNB or cell. The WTRU may understand that it is not expected to support the PHICH. The WTRU may not look for, expect and/or act upon the PHICH that may be provided by an eNB or cell in response to a UL transmission from the WTRU.

The WTRU may understand that it is not expected to support a CRS-based transmission. The WTRU may assume that CRS is not transmitted in a subframe in which the WTRU receives a DL grant and may assume that rate-matching around CRS for PDSCH reception is not required. An exception to this may be certain subframes in which a CRS is known by the WTRU to be transmitted, and the port number or numbers is/are a priori known, (for example, CRS may be transmitted in subframes 0 and 5 with port 0). The means may include the channel in which certain system information is transmitted or received, for example, ePDCCH common search space or SI-PDCCH.

An eNB or cell may transmit, and a WTRU may receive, for example, in a channel other than the PBCH, such as the (E)PDCCH CSS or SI-PDCCH, a subset of the system information that may be included in the legacy PBCH.

PHICH configuration may not be provided and/or CRS port number may not be provided. The system information that may be included in the legacy PBCH may be grouped into multiple subsets that may be transmitted by an eNB or cell and/or received by a WTRU separately.

Each subset, such as system information subset-1 (SBS-1) and system information subset-2 (SBS-2), may be defined and transmitted or received separately. For example, the SBS-1 may include DL system bandwidth and an SFN number, and the SBS-2 may include a CRS port number and/or a PHICH configuration. In another example, the SBS-1 may include a DL system bandwidth, and the SBS-2 may include an SFN number and a CRS port number. In another example, the SBS-1 may include DL bandwidth and a CRS-port number while the SBS-2 may include an SFN number only.

Some of the system information that may be included in the legacy PBCH may not be included in any of the subsets, (for example, a PHICH configuration may not be included in any of the subsets).

Each subset may have a different period or pattern for the transmission. In an example, SBS-1 may be transmitted every 5 ms, and SBS-2 may be transmitted every 10 ms. In another example, SBS-1 may be transmitted once every j-ms while SBS-2 may be transmitted over consecutive subframes in every k-ms.

Described herein is LC-MTC specific system information. Certain devices, such as LC-MTC or other devices in low SINR coverage areas, may acquire network and cell information for cell access and connection establishment from a certain system information block (LC-SIB) that may be broadcast by the eNB that may be supporting coverage enhancement, such as LC-MTC coverage enhancement. In this case, one or more of the following methods may apply to the LC-SIB. There may be one or more LC-SIBs.

In an example, an LC-SIB may be a signaling message, (for example, radio resource control (RRC) message), transmitted in a predefined frequency and time location. An LC-SIB may be semi-static, (for example, may not change for long period of time), and may be repeated periodically in pre-defined frames and in one or more pre-defined subframes during that frame.

In an example, the WTRU may consider stored LC-SIB information as valid for a pre-defined window duration or, follow the legacy SIB modification procedure. The WTRU may receive a specific indication of an LC-SIB change in paging information. In an embodiment, the WTRU may re-acquire the LC-SIB upon each connection establishment for small data reception and/or reception. For example, an LC-SIB may include the sysInfoValue Tag to indicate whether the LC-SIB currently stored in a WTRU is valid and up-to-date.

In an example, an LC-SIB may not include the SFN, and an LC-MTC device may acquire an SFN through means other than a LC-SIB or legacy MIB.

In an example, LC-SIB contents may be limited to one or more of the following information, which may be for the purpose of LC-MTC device connection establishment to the network. The information may be a PLMN-IdentityList. The list may be limited to a single public land mobile network (PLMN) ID as mobility of LC-MTC devices may be limited. The information may be cell selection information. This may include the RSRP/RSRQ threshold for suitable cell selection. LC-MTC devices may operate under coverage enhancements and may have no threshold for suitable cell selection criteria. The proper detection of an LC-SIB may be selection criteria for a suitable cell. For example, an LC-MTC may consider cell selection with coverage enhancements operation once suitable cell selection by legacy criteria has failed.

In another example embodiment, the information contained in LC-SIB may include random access channel (RACH) configuration information. Both RACH and physical RACH (PRACH) common configuration may be needed for an LC-MTC device to initiate connection establishment with the network. Certain parameters, such as those related to power control and UL transmission power for the RACH procedure, may be pre-defined in the WTRU such that maximum transmission power may be reached relatively quickly in the random access process. For example, parameters, such as number of preambles, maximum number of preamble transmissions and re-transmission power step, may be pre-defined to the maximum allowable values as defined in the RRC. The configuration for RACH and PRACH may be specified in the LC-SIB, for example, if the parameters are different than those that are pre-defined. The configuration may be different than that of the RACH and PRACH in the SIB providing configuration for legacy (e.g., not coverage limited) WTRUs and may include separate resources (e.g., preambles or preamble sets, and/or time/frequency resources).

In another example embodiment, the information contained in LC-SIB may include PDSCH/PUSCH/PUCCH common configuration parameters. These parameters may be included for WTRU operation of UL/DL signaling radio bearers upon initial connection establishment with the network. The LC-SIB may also include UL information. For example, the UL carrier information is specified in an LC-SIB if the UL is not configured with the default UL/DL separation or the UL bandwidth is not the same as the DL bandwidth.

LC-SIB may include information for RRC specific timers. In an embodiment, LC-MTC devices may be pre-defined with different constant and timer values compared to normal WTRUs. For example, the default value of radio link failure detection timers and constants T310, N310, T311 may be set to different and longer values to allow for lower possibility of radio link failure (RLF) detection by LC-MTC devices in a coverage enhancement scenario. In an embodiment, an LC-MTC device may be configured not to perform radio link monitoring or indicate radio link failure.

Some parameters in legacy SIBs which may be needed for normal WTRU cell access may not be included in an LC-SIB since some functionality may not be supported by LC-MTC devices in coverage enhancement operation. It may also be possible for LC-MTC devices to fall back to normal operation for legacy SIB acquisition by reading and using the normal cell system information. Once the WTRU has successfully read and maintained the validity of regular system information, the WTRU may use the information from normal SIBs instead of the LC-SIB.

Described herein is SFN indication without reading SFN in legacy PBCH. A WTRU or device, such as an LC-MTC device or other device which may be in a low SINR coverage area, may acquire or otherwise determine the SFN of a cell, where such acquisition or determination may be acquired without obtaining it from a legacy PBCH. In an embodiment, determination of an SFN may be based on reception, (for example, successful reception or acquisition of a known signal and the timing of that signal).

The WTRU may determine the SFN to a certain resolution, which may be full resolution, (e.g., 10-bit resolution for a SFN cycle of 1024), or less than full resolution. Full resolution SFN may be referred to as full SFN. An SFN with less than full resolution may be referred to as reduced resolution SFN, reduced SFN, or subset SFN.

The timing of the signal may include the subframe or subframes in which the signal may be transmitted, the frame or frames in which the signal may be transmitted, the subframe or subframes in which the WTRU may receive or successfully receive the signal, the frame or frames in which the WTRU may receive or successfully receive the signal, and/or the periodicity of the transmission of the signal.

The known signal may be transmitted by an eNB or cell. The signal may be transmitted in one or more of the following ways. In an example embodiment, the signal may be transmitted in one or more predefined time/frequency resources. In another example embodiment, the signal may be transmitted periodically with a predefined period, which may be a number of frames. In another example embodiment, the signal may be transmitted in a fixed or configured frame or frames within the period. The frame or frames in which the signal may be transmitted may be a function of a cell specific configuration (e.g., physical cell ID). For example, a cell with a PCI of 100 may transmit the known signal every SFN cycle, (e.g., every 1024 frames), to indicate a certain SFN, such as SFN 100, to the WTRU.

In another example embodiment, the signal may be repeated in two or more of the subframes within a frame in which the signal may be transmitted. In another example embodiment, the signal may be a predefined sequence, a system information block, such as an LC-SIB or SIB1, a P-RNTI, or an SI, or an ePBCH.

A WTRU may receive or attempt to receive and/or decode the signal in one or more subframes of a frame in which the signal may be transmitted. The WTRU may combine (e.g., integrate) signals from multiple such subframes within a frame in which the signal may be transmitted and may use that combination to successfully receive and/or decode the signal, for example, in a single frame.

The frame or frames in which the signal may be transmitted and/or the periodicity of the transmission may indicate the SFN with full resolution. For example, the signal may be transmitted in a certain frame, (e.g., frame 0), once every SFN cycle, (e.g., every 1024 frames), and may be used to indicate a certain SFN, such as 0. Upon successful reception of the signal, the WTRU may understand the frame of the reception to be the certain SFN, (e.g., SFN 0). The WTRU may integrate the signal over multiple frames, which may be separated by SFN cycle frames to achieve successful reception. The certain frame may be fixed or may be a function of a physical cell ID.

In another embodiment, the signal may be transmitted in multiple subframes, (e.g., certain subframes or all DL subframes), of a certain frame every SFN cycle, (e.g., every 1024 frames), and may be used to indicate a certain SFN, such as 0. Upon successful reception of the signal, the WTRU may understand the frame of the reception to be the certain SFN, (e.g., SFN 0). The WTRU may integrate the signal over one or more of the multiple subframes to achieve successful reception. Successful reception by the WTRU may be accomplished in one frame. The certain frame and/or subframes may be fixed or may be a function of physical cell ID.

The frame or frames in which the signal may be transmitted and/or the periodicity of the transmission may indicate the SFN with reduced resolution. For example, the signal may be transmitted every N frames, where (SFN cycle)/N may be an integer. The WTRU may integrate its reception in a certain frame, such as every Nth frame, until the signal is successfully received. Since the signal may be transmitted every N frames, the resolution of the SFN may be reduced.

For example, once a WTRU may successfully receive the signal, which it may accomplish by integrating signals it receives every N frames, (e.g., in certain one or more subframes every N frames), then the WTRU may understand which frames are the set of frames X, (X+N) modulo SFN cycle, (X+2*N) modulo SFN cycle, (X+3*N) modulo SFN cycle, . . . , etc., but may not know which frame is which. For instance, X may be 0, another known value, or X may be a function of a physical cell ID. For example, if X=0, N=8, and the SFN cycle is 1024, the WTRU may determine which frames are the set of frames that includes frames 0, 8, 16, . . . 1016 but may not know which frame is which. For another example, if X=0, N=512, and the SFN cycle=1024, the WTRU may determine which frames are the set of frames that includes frames 0 and 512, but it may not know which is frame 0 and which is frame 512.

The value of X may be provided to the WTRU via signaling, such as broadcast signaling, which may, for example, be provided in the frames in which the signal used for SFN determination may be transmitted. The WTRU may use the value of X to determine a revised set of frames beginning with 0 (e.g., 0, N, 2N, etc.). For example, if X=3, N=8, and the SFN cycle=1024, the WTRU may recognize the set of frames that are 3, 11, 19, etc. In those frames, the WTRU may receive signaling, such as broadcast signaling, which identifies X to be 3. The WTRU may then determine which frames are the set of frames 0, 8, 16, 24, etc.

If an SIB or other control signaling may be used as the signal for SFN determination, that SIB or control signaling may include the value of X.

When a WTRU understands the SFN with reduced resolution, (e.g., the set of frames X, (X+N) modulo SFN cycle, (X+2*N) modulo SFN cycle, (X+3*N) modulo SFN cycle, . . . , etc.), the WTRU may implicitly determine which frames are even, which are odd and the frames between the known frames. The WTRU may use that information for certain procedures, such as a random access procedure. For example, if a WTRU may know the set of frames 0, 8, 16 . . . , it may also know the set of frames 1, 9, 17 . . . and 2, 10, 18 . . . , by shifting by one and two frames, respectively. The WTRU may, therefore, know which are the even and which are the odd subframes that may be needed for a random access procedure, such as an initial random access procedure.

Acquisition or determination of a subset SFN by a WTRU may mean or result in the WTRU distinguishing one or more sets of frames, which may include every Nth frame, (where N is the period in frames of the signal), which may be used by the WTRU to determine the subset SFN. The sets of frames may be unique. There may be up to N such sets of frames. The number of elements in each set may be (SFN cycle)/N. This may be equivalent to the WTRU understanding, for each frame, the value of SFN for that frame modulo N.

A WTRU may acquire or determine a subset SFN based on acquisition of an LC-SIB, pre-defined frame rules, and periodicity of the LC-SIB transmission. A WTRU may acquire or determine the subset SFN based on properly decoding SIB1. For example, SIB1 may be transmitted in SFN X, where X may be 0 and may be repeated every 20 ms, which may correspond to every 2 frames, (e.g., even frames). The WTRU may understand that acquisition of SIB1 may correspond to finding the even frames, which may enable the WTRU to determine which frames are even and which are odd.

A WTRU may acquire or determine a subset SFN based on P-RNTI detection in the common search space of PDCCH or EPDCCH given the paging density of the cell, (e.g., nB parameter in RRC), is greater than 1 frame, (e.g., nB=T/2, T/4, T/8, T/16 or T/32).

A WTRU may acquire a subset SFN based on SI periodicity, which may be indicated in the SI schedule. The configuration of certain SI may allow for periodicity of up to 512 frames.

In another embodiment, the determination of SFN may be based on reception, (e.g., successful reception), of a full resolution SFN and/or a subset SFN. A subset SFN may be sufficient for certain procedures, such as system information acquisition, and random access, such as initial random access, (e.g., random access).

The eNB or cell may transmit a signal, which may include a full resolution SFN, (e.g., 10-bit resolution for a SFN cycle of 1024), and/or a subset SFN. One or more of the following may apply to the signal. In an example, the subset SFN may represent the least significant B bits of the full resolution SFN, such as the 3 least significant bits. This may correspond to SFN modulo ($2^B$), which for the example of 3 bits, may be SFN modulo 8. Given successful reception of the subset SFN, the WTRU may acquire SFN modulo ($2^B$) for the frames in which the subset SFN may be received and may use that to understand SFN modulo ($2^B$) for other frames, such as all frames.

In another example, the full resolution SFN may be transmitted periodically with a shorter duty cycle than the SFN cycle. For example, the signal with the full SFN may be transmitted every 8, 16, or 32, frames, among others. The subset SFN may be transmitted once or multiple times during the duty cycle of the full SFN. The full SFN and/or the subset SFN may be transmitted in one or more, including possibly all or all DL, subframes in the frames in which they are each transmitted. The full SFN and the subset SFN may be transmitted in a different number of subframes in the frames in which they are transmitted In another example, the definition of periodicity and length of signaled SFN for a cell may be a function of the acceptable tolerance to delay for the cell access procedure of the device, such as an LC-MTC device, as well as the cell specific configuration for certain SFN-based procedures, such as DRX and RACH access. The signaled SFN by a cell may be the full SFN and/or a subset of SFN, based on the periodicity of the full SFN and/or subset of SFN.

A WTRU may acquire and decode a signal, which may include a full SFN or a subset SFN. A WTRU may understand which SFN to receive based on the schedule or schedules for the different SFNs. A WTRU may integrate or otherwise combine same signals (e.g., full SFN with full SFN, subset SFN with subset SFN) from multiple subframes in a frame in order to successfully receive a signal.

A WTRU may integrate or otherwise combine identical signals (e.g., full SFN with full SFN, subset SFN with subset SFN) from multiple frames, such as signals in frames that are separated by the periodicity of the transmission, in order to, for example, successfully receive the signal. This may be applicable to a full SFN when the periodicity is equal to the SFN cycle. This may also be applicable to the subset SFN when the periodicity is a multiple of the subset SFN cycle. For example, if the subset is 3 bits, then the subset cycle may be 8. The SFN subset signals in a given frame may be combined with SFN subset signals that are 8, or a multiple of 8, frames away from that subframe.

For the purpose of cell access, the WTRU may use one or more of the above methods of SFN acquisition to complete the establishment of connection with the cell. For example, the knowledge of odd/even SFNs may allow for the WTRU to initiate the random access procedure, once the RACH/PRACH configuration has been acquired by LC-SIB and/or normal SIB.

Described herein are methods for PRACH coverage enhancement. In an embodiment to increase PRACH coverage, (and for example with the intent of some form of preamble integration at the eNB), for each instance of a random access procedure, the WTRU may send multiple (e.g., many) preambles (or repeated preambles), which may elicit only one RAR from an eNB. The repeated preambles may use the same preamble sequence as the first preamble and may use the same transmit power, PPRACH. RACH may be used interchangeably with random access. The number of repetitions for repeated preambles may be defined as 'n' (e.g. a repetition factor and may be positive integer number).

In an embodiment, a WTRU may transmit a RACH preamble. Following the first preamble for a RACH procedure, the WTRU may transmit repeated preambles at later times, for example, using the same resource but in later allowed frames. For example, for a first preamble using the resource "any SFN subframe 4", the repeated preambles may be transmitted in subsequent frames in subframe 4. As another example, for a first preamble using the resource "even SFN subframe 4", the repeated preambles may be transmitted in subsequent even frames in subframe 4.

The first preamble which may be followed by repeated preambles may be in any frame, or if limited to certain frames (e.g., even frames) to any such limited, (e.g., even) frame. Alternatively, the first such preamble may be further limited to only certain frames. The first frame with that first preamble and the subsequent frames with the repeated preambles may be referred to as a block of frames. The WTRU may, for example, transmit or only transmit the first preamble in the first frame of a block.

Blocks may be identified as being within groups of frames, in which any frame may be identified as being at a specific position within a specific block and each block may be identified as being at a specific position within a group. This may be known at the eNB and WTRU. For example, a frame group may be a series of 1024 contiguous frames starting with SFN 0 and ending with SFN 1023.

Figure 12:
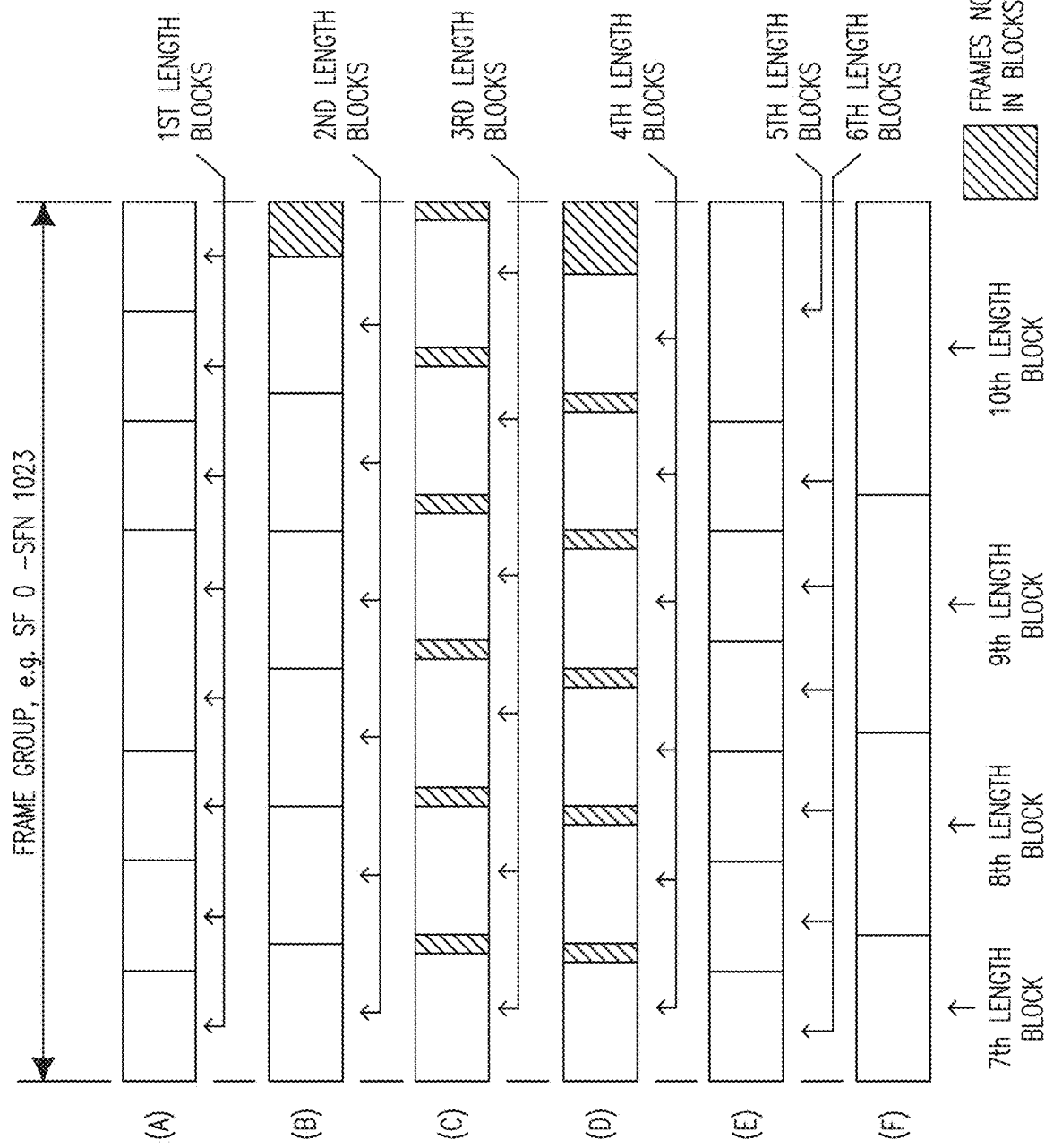
FIG. 12 is a diagram of different identifications of frames and blocks of a preamble for a random access channel (RACH) procedure.

The identification of frames within blocks could be, for example, as depicted in FIG. 12 (a) where the length of a series of equal-length blocks, denoted as "1st Length, 2nd Length, etc., for different block lengths, may equal the length of the frame group, or, as depicted in FIGS. 12 (b), (c), and (d), where the length of a series of equal-length blocks may not equal the length of the frame group and some frames in a frame group may not be in a block, or as depicted in FIGS. 12 (e) and (f), where the length of a series of equal and unequal-length blocks are equal to the length of a frame group, or some combination of all methods shown in FIG. 12. An alternative method not depicted is that the frames within blocks, and the blocks within groups, may be scattered, for example, not contiguous, or intermixed, in some deterministic manner which may be known to the eNB and the WTRU, which may be specified or configured.

An example of determining the frames within a block is as follows. Let a group of frames be frames numbered as SFN 0 through SFN 1023. Let Npre be the number, or the maximum number, of preambles transmitted in a block, where Npre is a power of two, (e.g., 64, 128, etc.), such that an integer number of blocks may be configured first within a group, as illustrated in FIG. 12(a). For preambles that may be transmitted in any frame, the frames in the first block may be frames with SFN 0 through (Npre−1), the second block may be frames with SFN Npre through 2Npre−1, and so forth, with the last block including frames with SFN 1023−(Npre−1) through 1023. For preambles that may be transmitted in only even numbered frames, the frames in the first block may be frames with SFN 0 through 2Npre−1, (although the last frame itself may not be used to transmit a preamble as its SFN is odd), the second block may be frames with SFN 2Npre through 4Npre−1, (although that last frame itself may not be used to transmit a preamble as its SFN is odd), and so forth, with the last block including frames with SFN 1024−2Npre through 1023, (although the last frame itself may not be used to transmit a preamble as its SFN is odd).

In an example, the eNB may respond to a block of preambles with an RAR which it may send after the last preamble in the block, for example after it may receive the last preamble or after the time which may correspond to the last preamble if it has received a preamble. The WTRU may look for the RAR after the last preamble during the configured response window for that preamble. In another example, the eNB may respond to the block of preambles with an RAR which it may send after receiving any preamble in a block, for example during the response window for any such preamble. If the WTRU may receive the RAR before having transmitted the last preamble in a block, the WTRU may, for example, not transmit any more preambles in the block.

If the WTRU may not receive the RAR in the response window of the last preamble of the block, the WTRU may initiate the transmission of another block of preambles. For the contention-based RACH procedure, the WTRU may pick another specific preamble sequence for the subsequent block and also apply the same time backoff rules, for example as is done for Release 11.

The number of preambles transmitted in a block, the maximum number of preambles transmitted in a block, or the length of a block may be configured or specified. The value may indicate the total number of preambles to send, the length (e.g., in frames) of the preambles, or how many additional preambles to send. In such a case, for example, zero may indicate that no repeated preambles may be sent.

The eNB may directly indicate its capability to detect repeated preambles or may indicate it by broadcasting a related quantity (e.g., the number of preambles transmitted in a block) and/or by indicating separate PRACH resources for repeated preambles. Such resources may use various indices or tables. Alternatively, there may be no special resources for repeated preambles.

For an eNB capable of detecting repeated preambles, the maximum number of RACH preamble transmissions, for example preambleTransMax, may refer to the maximum number of preamble blocks. Alternatively, the network may separately configure the maximum number of preamble blocks.

The WTRU may autonomously decide to transmit repeated preambles, if for example allowed by the network, and such decision may be based on one or more conditions which may include at least one of: if Pcmax <preambleInitialReceivedTargetPower+deltaPreamble+pathloss, if (Pcmax±some amount)<preambleInitialReceivedTargetPower+deltaPreamble+pathloss, if the previous RACH procedure failed due to reaching max number of PRACH transmissions (preambleTransMax), or always if a device is so configured or is hard wired. Repeated preambles may be sent at the same power using the same preamble using certain resources.

In an embodiment, a new or enhanced preamble format may be introduced which may increase the repetition factor (e.g., the number of repetitions) for the preamble. The terms new and enhanced may be used interchangeably. As a result, the energy for the PRACH preamble may be increased over a larger number of subframes. For example, a new preamble format may be introduced, such as shown in Table 3, which may be used for coverage enhancement purposes.

TABLE 3

| Preamble format | $T_{CP}$ | $T_{SEQ}$ |
| --- | --- | --- |
| 5 | 3168 · Ts | n · 24576 · Ts |
| 6 | 21024 · Ts | n · 24576 · Ts |
| 7 | 6240 · Ts | n · 24576 · Ts |

In Table 3, the 'n' may be an integer number larger than 2 and may be considered as the repetition factor for the PRACH preamble.

A new preamble format per CP length (i.e. $T_{CP}$) may be introduced, for example, for coverage enhancement purposes. The repetition factor, 'n', may be defined with a configuration. For example, the 'n' may be a PRACH configuration parameter. An eNB may indicate or inform the value of 'n,' for example, as a part of PRACH configuration, where the 'n' may apply for the new preamble format. A subset of the preamble format may have the repetition factor 'n'.

The repetition factor 'n' may be calculated or determined by a WTRU, and the value 'n' may be configured as a function of at least one of DL pathloss, RSRP, RSRQ and/or other measurements. As an example WTRU behavior, a WTRU may measure DL pathloss, and if the pathloss is larger than a threshold, the WTRU may use the new additional preamble format. The repetition value 'n' may be obtained using the pathloss value calculated or determined. Once a WTRU obtains the repetition value 'n', the WTRU may transmit a PRACH preamble in a specific PRACH resource, which may be used for the new preamble format with the repetition value 'n'.

According to the repetition value 'n', a separate PRACH resource may be defined. For example, the repetition candidates {4, 8, 16} may be defined, and if a WTRU may need to use a repetition value such as n=4, there may be a specific PRACH resource that may, for example, be used for the repetition value n=4. In an example, the repetition candidates {4, 8, 16} may be used or may only be used, but another number and value of repetition candidates may be selected. In another example, the repetition value 'n' may be a predefined number larger than 2 and there may be a PRACH resource configured for the repetition value 'n' and another PRACH resource configured for the legacy PRACH format.

The subframes for the PRACH transmission may be defined as a function of the repetition factor 'n' since the required subframes may be dependent on the repetition factor. Table 4 shows an example of required subframe length according to the repetition factors. For example, if the repetition factor is smaller than a threshold (e.g., 9), the starting subframe for PRACH transmission may be configured in every radio frame. Otherwise, the subframe may be configured in even or odd radio frames. Table 4 also indicates an example of required subframe length for preamble formats according to 'n'.

TABLE 4

|  | n = 2 | n = 4 | n = 8 | n = 16 |
|---|---|---|---|---|
| Preamble format 5 | 2 ms | 4 ms | 7 ms | 13 ms |
| Preamble format 6 | 3 ms | 4 ms | 8 ms | 14 ms |
| Preamble format 7 | 2 ms | 4 ms | 7 ms | 14 ms |

One or more additional preamble formats may be introduced for coverage enhancement purposes. For example, additional preamble formats may be defined, and each CP length ($T_{CP}$) may have different repetition factors. Table 5 shows an example of multiple additional preamble formats per CP length ($T_{CP}$).

TABLE 5

| Preamble format | $T_{CP}$ | $T_{SEQ}$ |
|---|---|---|
| 5-1 | 3168 · Ts | n1 · 24576 · Ts |
| 5-2 | 21024 · Ts | n1 · 24576 · Ts |
| 5-3 | 6240 · Ts | n1 · 24576 · Ts |
| 6-1 | 3168 · Ts | n2 · 24576 · Ts |
| 6-2 | 21024 · Ts | n2 · 24576 · Ts |
| 6-3 | 6240 · Ts | n2 · 24576 · Ts |
| 7-1 | 3168 · Ts | n3 · 24576 · Ts |
| 7-2 | 21024 · Ts | n3 · 24576 · Ts |
| 7-3 | 6240 · Ts | n3 · 24576 · Ts |

As an example, preamble format 5 may include all supportable CP lengths in the preamble format 0-3, while the sequence length may be the same with the repetition factor n1. The same may apply for other new preamble formats except for the repetition factor, thus resulting in the preamble formats 5, 6 and 7 having the repetition factors n1, n2 and n3, respectively.

The repetition factors {n1, n2, n3} may be predefined, for example {4, 8, 16}. The repetition factor may be defined as a function of path loss and/or other measurements.

The PRACH resource may be configured/defined according to the repetition factors. For example, a WTRU may obtain the repetition factor, and the WTRU may know which PRACH resource the WTRU needs to use for preamble transmission. The new preamble formats may use the same CP length in the previous preamble formats, while the sequence lengths may be increased. The new preamble formats may the same sequence as the legacy formats but with the sequence repeated some number of times.

The preamble format and subframe configurations may be configured together in a broadcast channel. For FDD, the unused PRACH configuration index (e.g., 30, 46, 60, 61, 62) may be used for the new additional preamble formats.

A separate random access configuration table may be defined for the coverage enhanced PRACH configuration. A separate group of preamble sequence indices may be allocated (e.g., "group C") and may be used by, for example used specifically by, WTRUs for coverage enhancements purpose, and may be signaled to WTRUs (e.g., in SIB2). Extended preamble format configuration and configuration indices may also be included in the configuration of group C preambles, which may be different than those specified for configuration of preamble group A and B. WTRUs may use the group C configuration in addition to, or instead of, group A/B preamble configuration, as specified in SIB2.

In another embodiment, preamble formats such as preamble formats 0-3 may be reused with repetitions. The same preamble format may be used in the same PRACH resources. Here, the coverage enhanced PRACH transmission may use repetition of the same PRACH preambles. For the repetition of the PRACH transmission, at least one of the following techniques may be used.

In an example, a subset of PRACH preambles may be predefined or configured for the repetition based PRACH preambles, where the repetition based PRACH preambles may be transmitted repetitively within a time window size. For example, the time window size may be defined as a $N_{Win}$ subframe or radio frame, and the same PRACH preamble may need to be transmitted in all PRACH resources within the $N_{win}$ time window. For example, if $N_{Win}=3$ is used and the PRACH subframes are defined as {1 in any radio frame}, then a WTRU may need to transmit the repetition-based PRACH preamble in 3 radio frames. The window size may be predefined or configured as a function of the PRACH configuration.

Additional frequency resources may be reserved for the repetition based PRACH preambles, which may be mutually orthogonal with the frequency resources for non-repetition-based PRACH preambles, (such as PRACH preambles for legacy WTRU). Therefore, both types of WTRU may use the same PRACH configuration except for the frequency offset index (prach-FrequencyOffset). The time window may be used in order to indicate the repetition number of PRACH preamble transmissions.

A subset of PRACH subframes may be reserved for the repetition based PRACH preambles. Therefore, a WTRU may transmit the repetition based PRACH preambles only in the subset of PRACH subframes configured.

The same preamble format may be used in the different PRACH subframes. For example, a subframe offset may be used, which may indicate the PRACH subframe for repetition based PRACH preambles. The subframe offset may be informed or indicated to a WTRU via a broadcasting channel, so that the WTRU that is required to transmit repetition based PRACH preambles may use the subframes for transmitting repetition based PRACH preambles.

Described herein are techniques for PRACH link adaptation and enhanced coverage. In an embodiment, PRACH resources which may be used by or may be intended for use by legacy WTRUs and/or normal coverage WTRUs (for example PRACH resource type A) and/or PRACH resources which may be used by or may be intended for use by WTRUs which may need coverage enhancement (for example PRACH resource type B) may be available in a cell. PRACH resource type A may be configured by a broadcasting channel (e.g., a SIB). The normal coverage WTRU, here, may imply that the coverage enhancement mode of operation is not used for the WTRU. PRACH resource type B may be configured by a broadcasting channel. The coverage enhanced WTRU, here, may imply that the WTRU is configured with or using coverage enhancement mode of operation. The broadcasting channel for PRACH resource type B configuration may be a dedicated broadcasting channel for coverage enhanced WTRUs. PRACH resource type A and type B may be used according to the PRACH preamble formats. For example, PRACH resource type A may be used for the PRACH preamble formats 0-3, while PRACH resource type B may be used for the other PRACH preamble formats (e.g., format 5-7). The PRACH resources for type A and type B may be configured in separate time and frequency resources. Alternatively, the PRACH resources may be fully or partially overlapped in time and frequency resources. In another example, the type A PRACH resource is a part of a type B PRACH resource.

The PRACH resources which may be used by or may be intended for use by WTRUs which may need or benefit from coverage enhancement may be referred to as enhanced PRACH (ePRACH) resources. The ePRACH resources may be configured by the eNB, for example by signaling to a WTRU, for example by broadcast (e.g., in a LC-SIB).

In an FDD system, in an embodiment, the type A PRACH resource may occupy consecutive 6 RBs in the selected set of UL subframes, while the type B PRACH resource may be configured with consecutive 6 RBs in a non-overlapped frequency location in the same set of UL subframes. Here, the frequency location for the type B PRACH resource may be indicated by an offset from the type A PRACH resource. In another embodiment, the type A PRACH resource may occupy consecutive 6 RBs in the selected set of UL subframes, and the type B PRACH resource may be configured with the center 6 RBs in the non-overlapped uplink subframes with type A PRACH resource. In another embodiment, the type A PRACH resource may occupy consecutive 6 RBs in the selected set of UL subframes, and the type B PRACH resource may configured with consecutive 6 RBs in any time frequency location non-overlapped with type-A PRACH resources. In another embodiment, the type A PRACH resource may be configured in any frequency location in the selected set of UL subframes while the type B PRACH resource may be configured in a predefined location. For example, the center 6 RBs in all UL subframes in a specific radio frame may be used for type B PRACH resources.

In an embodiment, more than one type B PRACH resources may be configured with different coverage enhancement levels. For example, there may be a PRACH resource type B-1 (level-1) and a PRACH resource type B-2 (level-2)), where PRACH resource type B-2 may provide better coverage than PRACH resource type B-2.

For PRACH resource type or level selection, in an embodiment, a WTRU may select the level of PRACH resource type according to a DL measurement, which may be related to at least one of DL pathloss, coupling loss, geometry, RSRP, and RSRQ. For example, a WTRU may first measure the RSRP, and if the RSRP is lower than a threshold, the WTRU may select the PRACH resource type B to transmit a PRACH preamble. Otherwise, the WTRU may select the PRACH resource type A to transmit the PRACH preamble. In another embodiment, the PRACH resource type selection may be based on WTRU category. For example, if a WTRU is a coverage enhanced LC-MTC WTRU, the WTRU may always select the PRACH resource type B for the PRACH preamble transmission. However, the other WTRUs may select PRACH resource type A. A coverage enhanced WTRU may be a WTRU which requires coverage enhancement or a WTRU which employs coverage enhancement techniques or supports a coverage enhancement mode. The terms coverage limited WTRU and coverage enhanced WTRU may be used interchangeably.

In another embodiment, for PRACH preamble transmission link adaptation, power control and PRACH resource hopping may be used. For example, if multiple PRACH resource types are configured with different levels of coverage limitations, a WTRU behavior when the WTRU does not receive an RAR for the transmitted PRACH preamble within an allotted time, (for example, ra-ResponseWindow-Size), may be at least one of the following behaviors. In an example behavior, if a WTRU is not configured with a coverage extension mode of operation, the WTRU may send another PRACH preamble at a later time with a higher power. For example, the preamble may be higher with respect to the previous preamble transmission by power-RampingStep. Thus, the transmission power for preamble transmission may be increased with respect to the amount of powerRampingStep. In another example behavior, if a WTRU is configured with a coverage extension mode of operation, the WTRU may send another PRACH preamble at a later time with either a higher power or a different PRACH resource type. For example, if a WTRU does not receive an RAR for the transmitted PRACH preamble within the allotted time, the WTRU may select to send another preamble at a later time with a higher power using the same PRACH preamble format, (e.g., format 0-3), in the same PRACH resource type, (e.g., type A) or send another preamble at a later time with a certain transmission power using different PRACH preamble format, (e.g., formats 5-7), in the corresponding PRACH resource for the preamble format, (e.g., PRACH resource type B).

In another example behavior, if a WTRU is configured with a coverage extension mode of operation, the WTRU may send another PRACH preamble at a later time with higher power until it reaches maximum transmission power, (e.g., Pcmax or Pcmax,c). Once the WTRU reaches maximum transmission power for PRACH preamble transmission and does not receive an RAR for the transmitted PRACH preamble within the allotted time, then the WTRU may send another PRACH preamble at a later time with a certain transmission power using a different PRACH preamble format in the corresponding PRACH resources for the preamble format.

Described herein are methods for indicating coverage enhancement level which may be needed by the WTRU, for example to the eNB, using PRACH. In an embodiment, coverage limitation (or enhancement) levels for each WTRU may be indicated by one or more of the following methods. In an example method, a WTRU may be configured with multiple PRACH resource types, and the WTRU may select a PRACH resource type according criteria such as DL measurements, (e.g. one or more of pathloss, coupling loss, geometry, RSRP, and RSRQ). For example, a WTRU may first measure RSRP and then select a PRACH resource type according to the measured RSRP, where the PRACH resource type may include one or more of a PRACH preamble format, a PRACH subframe, a PRACH frequency resource, and a preamble sequence. Criteria other than RSRP or other DL measurement may be used by the WTRU to determine which PRACH resource type to transmit to indicate the level of coverage enhancement needed. Based on the PRACH resource type transmitted by the WTRU, the eNB may learn the coverage limitation (or the coverage enhancement need) of the WTRU. For each resource type there may be a set of PRACH resources (which may be defined by one or more of a PRACH preamble format, a PRACH subframe, a PRACH frequency resource, and a preamble sequence). Once the WTRU may determine the PRACH resource type, the WTRU may choose from among the set of PRACH resources associated with the type and may do so according to the random access procedure selection rules such as according to Release 11.

In another example, a WTRU may be configured with a single PRACH resource type with PRACH resource partitioning. Therefore, according to the DL measurement or other criteria, the WTRU may select one of the partitioned PRACH resources so that the eNB may figure out the level of coverage limitation of the WTRU. The partitioning of PRACH resources may include one or more of a UL subframe, a frequency resource, and a PRACH preamble. For example, the PRACH resources in the even numbered radio frames may be considered as one PRACH partition associated with the measured RSRP level 1, while the PRACH resources in the odd number radio frames may be considered as another PRACH partition associated with the measured RSRP level 2. For another example, the PRACH preamble may be partitioned, and, according to the measured RSRP level a PRACH preamble may be selected by the WTRU among the set of PRACH preambles associated with the measured RSRP level. In these examples, the RSRP level may be replaced with any type of DL measurement or other criteria that may be related to WTRU coverage.

The PRACH preamble reserved for non-contention-based resources may be used to indicate coverage limitation level. The PRACH transmission power may be set to the maximum for a coverage-limited WTRU so that the eNB may estimate the coverage limitation level.

In an embodiment, the WTRU may indicate, or may be indicated with, coverage enhancement levels as part of the RACH process and RRC connection establishment procedures.

Described herein is pre-allocation or semi-static allocation of C-RNTI. A WTRU in limited coverage may be allocated with a C-RNTI, which may be pre-defined or may be provided by the network at initial access. The WTRU may continue to use the C-RNTI semi-statically until it is indicated otherwise by the network to use a different C-RNTI. The WTRU may consider the C-RNTI valid between long DRX and sleep cycles and between transitions from RRC_IDLE to RRC_CONNECTED mode for data transfer. In an embodiment, the WTRU may consider the C-RNTI valid between cell re-selection or cell re-establishment in RRC_IDLE mode and handover in RRC_CONNECTED mode.

The WTRU may be indicated with a coverage enhancement level by the reception of a random access response (RAR) from the eNB in response to the preamble transmission based on the RA-RNTI or C-RNTI, which may be allocated in one or more of the following methods. In an example method, a WTRU may use an RA-RNTI from a set that may be specifically allocated for WTRUs in coverage enhancement mode. For example, a WTRU may calculate the RA-RNTI as a function of time and frequency resources and, in an embodiment, as a function of an additional offset defined for coverage enhancement WTRUs. For another example, RA-RNTI values 60 to 119 may be allocated specifically for WTRUs in coverage enhancement mode.

In an embodiment, a WTRU may use an RA-RNTI specifically for coverage enhancement mode, which may be further subdivided and allocated into different amounts for coverage enhancement. For example, WTRUs in a 5 dB coverage enhancement amount may use a certain subset of RA-RNTIs, while WTRUs in a 10 dB coverage enhancement amount may use another set of RA-RNTIs.

In another example method, a WTRU may look for an (E)PDCCH for RAR from an eNB using multiple RA-RNTI candidates computed from time/frequency resources of the transmitted preamble, along with, in an embodiment, the RA-RNTI set for multiple coverage enhancement amounts. The WTRU may be indicated with the configured coverage enhancement amount from the eNB by an RA-RNTI for which the (E)PDCCH for the RAR has been successfully decoded. The WTRU may derive the RA-RNTI candidate set from a subset of available coverage enhancement levels or from all available levels.

In another example method, a WTRU may compute the coverage enhancement specific RA-RNTI, or coverage enhancement level specific to the RA-RNTI, based on the selection of PRACH preamble time and/or frequency resources. The allocation of certain PRACH and preamble resources to coverage enhancement WTRUs or coverage enhancement levels may be indicated to the WTRU by normal SIB (e.g. SIB2) or LC-MTC-specific MIBs and SIBs.

In another example method, a WTRU in coverage enhancement mode may receive an RAR in response to the transmitted PRACH preamble via a C-RNTI that has been pre-allocated or previously semi-statically allocated. The WTRU may detect and decode the (E)PDCCH for the RAR in CSS or WSS. Once the WTRU has received the RAR via (E)PDCCH scrambled with C-RNTI, it may no longer look for contention resolution upon transmitting msg3, (for example, an RRC connection request), in response to the RAR. In an embodiment, a WTRU receiving the RAR MAC control element (CE) via the (E)PDCCH and the C-RNTI may receive in said RAR, one or more of the following reduced MAC CE information: UL grant, timing advance (TA) command and amount of coverage enhancement mode. For example, the amount of coverage enhancement mode information element (IE) may indicate 5 dB, 10 dB or 15 dB coverage enhancement procedures.

In another example method, a WTRU may receive, in the MAC CE, information dedicated to itself in the C-RNTI-based RAR. In an embodiment, the WTRU may not receive any MAC subheader for RAR, including the RACH preamble identifier (RAPID) or temporary C-RNTI, thus reducing the potential size of the RAR control element.

Described herein are an indication of amount of coverage enhancements during RRC connection establishment procedures. In an example, a WTRU may indicate, during the RRC connection establishment procedure, the coverage enhancement amounts to the eNB. In an embodiment, the WTRU may be indicated in the amount from the eNB during the procedure. Upon completing the RACH procedure, the WTRU may be operating in coverage enhancement mode, and, in an embodiment, may have been configured with an amount of coverage enhancement. In another embodiment, the WTRU may overwrite or be overwritten with a new coverage enhancement amount using one or more of the following methods. In an example method, the WTRU may indicate it in the RRC connection request message, (the msg3, for example). The WTRU may receive the configuration for coverage enhancement amount in RRC connection setup or RRC connection reconfiguration messages from the eNB, or the WTRU may receive coverage enhancement amounts in the RRC connection reconfiguration message as a reconfiguration of coverage enhancement amounts, based on any possible changes in the coverage conditions.

With respect to the WTRU indicating the coverage enhancements amount in the RRC connection request message, the WTRU may include the indication in the establishment cause of the RRC connection request message. For example, the remaining spare values in the IE may be allocated to indicate coverage enhancement mode and amount. In another example, a WTRU may provide an extended or alternative information element in the message indicating the coverage enhancement amount or level in the RRC message to the network. For example, if the LC-MTC WTRU has indicated to the eNB that it is a coverage limited WTRU, or the eNB has derived that the accessing WTRU is coverage limited prior to or during the random access procedure, then it may use the establishment cause IE and re-interpret the IE bits to indicate the level of coverage enhancement. As a further example, the bits may be re-interpreted as enumeration of {coverage enhancements of 5 dB, coverage enhancements of 10 dB, coverage enhancements of 15 dB} in the information element and may be included in the message.

With respect to the WTRU receiving the configuration for coverage enhancement amount in the RRC connection setup or RRC connection reconfiguration message from the eNB, the eNB may derive coverage limited WTRUs and the amount of coverage enhancements based on detected preamble signal strength. In an embodiment, a WTRU may provide eNB information regarding coverage limitation, which may include one or more of the PRACH preamble transmit power, measured RSRP/RSRQ used for suitable cell selection criteria, number of preamble repetition and retransmissions or number of PDCCH and PDSCH repetitions needed for RAR reception.

In an embodiment, a WTRU may receive coverage enhancement amounts in an RRC connection reconfiguration message as a reconfiguration, based on any possible changes in the coverage conditions. A WTRU may apply the reconfigured coverage enhancement mode with appropriate processing delay (e.g., 15 ms) for any of the applicable techniques on the indicated channels.

Described herein is paging with enhanced coverage. To enhance coverage of the paging channel for WTRUs, WTRUs may be allocated a separate set of paging frames (PFs) and paging occasions (POs) from normal WTRUs for coverage enhancements purposes. In an embodiment, a paging message for LC-MTCs may be repeated with the same information over a number of frames and/or subframes such that the WTRU may take advantage of accumulation of the paging information.

A WTRU may be allocated with paging frames and paging occasions that are separate from normal WTRUs such that a subset of paging occasions for a cell may be read by certain WTRUs such as WTRUs needing coverage enhancement, including for example, LC-MTC WTRUs. This may be performed with one or a combination of allocation of second P-RNTI, allocation of LC-MTC specific paging frame (PF) and allocation of multiple paging frames (PF) in DRX/paging cycle.

With respect to allocation of a second P-RNTI, WTRUs may be indicated about an alternative P-RNTI from the P-RNTI that has been allocated in Release 8, (e.g., P-RNTI value of 0xFFFE). The WTRU may be indicated with the value of the second P-RNTI as part of the paging and DRX configuration, or it may be provided with an indication to use the second P-RNTI value, which may be pre-determined. For example, the second P-RNTI value may be set as 0xFFFC. The WTRU may, during its allocated paging occasion, look for both Release 8 P-RNTI and second P-RNTI or for the second P-RNTI only. The WTRU may be indicated, as part of paging configuration, whether or not to use a second P-RNTI.

With respect to allocation of LC-MTC specific paging frame (PF), the WTRU may be allocated with a pre-determined paging occasion and DRX/paging cycle by means of signaling, for example via RRC or non-access stratum (NAS), instead of being determined by the identity of the WTRU. The allocation of paging occasion to the WTRU by the eNB for paging coverage enhancements may be a function of allocation of a paging occasion for normal WTRUs and selecting paging frames that are not occupied by normal WTRUs. The WTRU may be provided with an explicit paging frame and paging occasion and may not apply its IMSI to determine the paging frame via legacy Rel-8 procedural means. For example, legacy WTRUs may be allocated with paging parameters of a DRX length of 256 frames and an nB of T/32. This may allow for PFs for normal WTRUs to occur at frames that are multiples of 32. WTRUs for coverage enhancements may be allocated with LC-MTC POs in frames 1~31, for example, with a long DRX cycle of 256 such that LC-MTC WTRUs and normal WTRUs do not share a common paging occasion.

With respect to allocation of multiple paging frames (PF) in DRX/paging cycle, the WTRU may be allocated with multiple PFs specifically for LC-MTC WTRUs during a DRX cycle. For example, this indication of multiple POs may be in the form of a bitmap to indicate frames during the DRX cycle that are allocated as LC-MTC specific or in the form of an offset of frames indicating consecutive frames from the allocated LC-MTC PO that are allocated to the WTRU.

The WTRU may receive, as part of the paging records in the specified LC-MTC PO, an indication for connection initiation to the network. The WTRU may not decode its own specific WTRU identity in the paging record, but, instead, the indication may commonly apply to all the LC-MTC WTRUs that are allocated with that particular PO. For example, in an RRC Paging message, instead of using the pagingRecordList IE, which includes the WTRU identity of each WTRU being paged, there may be a one bit indicator indicating that all WTRUs allocated to this PO should respond to the paging message with the RRC connection establishment procedure.

The WTRU may receive repeated RRC paging messages over a period of time such that the WTRU may accumulate the paging message for coverage enhancements gain. The page may include a WTRU-specific paging record or a group paging indication (as described above). The paging message may be repeated for the multiple allocated LC-MTC paging frames during a DRX cycle or, in an embodiment, may be repeated over the course of multiple DRX/paging cycles.

The WTRU may, in PFs allocated for LC-MTC WTRUs, receive a repeated paging message in multiple subframes, which may be accumulated over those repeated subframes. For example, similar to Release 8 where PO may occur in subframes {0, 4, 5, 9} of all the paging frames, the WTRU may be indicated to receive repeated paging messages in up to four of those paging occasions. The WTRU may be explicitly notified by the network that the number of subframes the paging message may be repeated. In an embodiment, the WTRU may decode the PDCCH with P-RNTI in subframe 0 and not decode the PDCCH with P-RNTI in the other subsequent subframes but decode the PDSCH in the same location as the first subframe, (e.g., subframe 0).

For additional cumulative gains of the paging message, the WTRU may receive the paging message in other subframes beyond the four subframes {0, 4, 5, 9}. The WTRU may be explicitly notified by the network of the subframes that may send a paging message during the paging frame.

Figure 13:
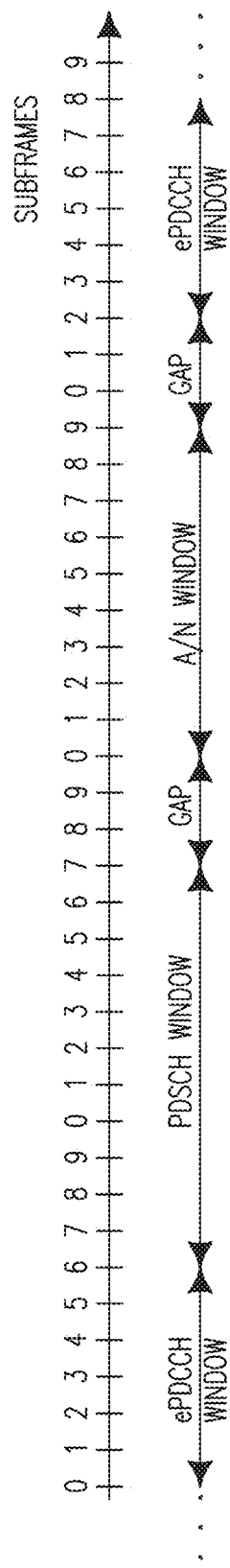
FIG. 13 is a diagram of an example of window-based downlink transmission.

In an embodiment, all transmission steps may have a time window so that a WTRU may perform one step at a time. For example, the DL transmission steps may be defined as four time windows such as an (E)PDCCH window, a PDSCH window, a Gap, and an A/N window so that a WTRU may receive a DL control channel only in the (E)PDCCH window and the PDSCH in the PDSCH window. Likewise, the A/N for a PDSCH may be transmitted only in an ACK/NACK (A/N) window. Therefore, a WTRU may monitor (E)PDCCH in (E)PDCCH while the WTRU may assume that PDSCH is not transmitted during the (E)PDCCH window. In addition, the WTRU may assume that no (E)PDCCH associated with PDSCH is transmitted in (E)PDCCH window. FIG. 13 is a diagram of an example of window-based downlink transmission as described herein.

In another embodiment, a specific step may use the window-based transmission. In this case, the following methods may be used. For example, the (E)PDCCH and PDSCH may have the window, while the A/N transmission may be finished within a subframe. In another example, the (E)PDCCH may have the time window, while the other transmissions may be finished within a subframe. In another example, the (E)PDCCH and A/N transmissions may have the window, while the PDSCH transmission may be finished within a subframe. In another example, the PDSCH transmissions may have the window, while the other transmissions may be finished within a subframe.

For the window-based transmission, one or more of the followings methods may apply. In an example method, each time window may include two or more subframes, and a different number of subframes may be used according to the type of window. For example, $N_{epdcch}$, $N_{pdsch}$, $N_{gap}$, and $N_{harq}$ may be respectively used for the (E)PDCCH window, the PDSCH window, the Gap, and the A/N window to define the window size. The values for the example configuration illustrated in FIG. 13 are $N_{epdech}$=6, $N_{pdsch}$=11, $N_{gap}$=4, and $N_{harq}$=9. The values of $N_{epdcch}$, $N_{pdsch}$, $N_{gap}$, and $N_{harq}$ may be predefined for the coverage enhanced transmission. The values of $N_{epdcch}$, $N_{pdsch}$, $N_{gap}$, and $N_{harq}$ may be configured via broadcasting channels.

In an embodiment, in the (E)PDCCH window, a WTRU may monitor search spaces to receive DCIs for the PDSCH and/or the PUSCH. In an example, the (E)PDCCH window may be defined separately for UL and DL transmissions. Therefore, two types of (E)PDCCH windows may be defined, such as the UL-(E)PDCCH-window and the DL-(E)PDCCH-window. The UL-(E)PDCCH-window and the DL-(E)PDCCH-window may be mutually exclusive in the time domain. Thus, a WTRU may be required to monitor either PUSCH-related DCI or PDSCH-related DCI. Alternatively, the UL-(E)PDCCH-window and the DL-(E)PDCCH-window may be partially or fully overlapped in the time domain so that a WTRU may monitor both PDSCH and PUSCH-related DCI in the subframe where the UL-(E)PDCCH-window and DL-(E)PDCCH-window are overlapped.

In another example, the WTRU-specific search space may be split to a UL-(E)PDCCH-window and a DL-(E)PDCCH-window, while the common search space may be located in both windows. For instance, the DCI formats related to the PDSCH transmission, (for example, 1A/2/2A/2B/2C), may only be transmitted in the DL-(E)PDCCH-window, and the DCI formats related to the PUSCH transmission, (for example, 0/1), may only be transmitted in the UL-(E)PDCCH-window. In this case, the following window may be dependent on the type of (E)PDCCH window. For example, the PDSCH window may be or may always be located after the DL-EPDCCH-window, and the PUSCH window may be located after the UL-(E)PDCCH-window.

In another example, a single (E)PDCCH window may be used for both the PDSCH and the PUSCH. Hence, a WTRU may need to monitor DCI formats for both the PDSCH and the PUSCH within the (E)PDCCH window. Here, the following window may be dependent on the DCI format type in the (E)PDCCH window. For example, if a WTRU may receive a DCI format related to the PUSCH, the following window may become the PUSCH window so that the WTRU may transmit the PUSCH. On the other hand, if a WTRU receives a DCI format related to the PDSCH, the following window may become the PDSCH window so that the WTRU may receive the PDSCH in the following window.

In another example, if a WTRU receives a DCI and its CRC is scrambled with the WTRU's C-RNTI and the DCI is related to the PDSCH, the WTRU may need to report an A/N within the A/N window. The A/N transmission corresponding to the PDSCH may be transmitted repetitively within the A/N window.

In another example, an (E)PDCCH targeting a WTRU may be transmitted only in a single subframe within the (E)PDCCH window. Therefore, if a WTRU receives the (E)PDCCH targeted for the WTRU in the WTRU-specific search space in a subframe within the (E)PDCCH window, the WTRU may be allowed/permitted not to monitor the (E)PDCCH in a WTRU-specific search space in the (E)PDCCH window. In other words, if a WTRU succeeds to receive a DCI scrambled with a C-RNTI in a WTRU-specific search space, the WTRU may assume that there is no other DCI scrambled with the C-RNTI in the WTRU-specific search space. This may allow for avoiding unnecessary WTRU complexity.

In another example, an (E)PDCCH may be transmitted over multiple subframes within the (E)PDCCH window so that a WTRU may accumulate the signals over multiple subframes. Here, the repetition may be guaranteed in the same (E)PDCCH candidate so that a WTRU may accumulate the same (E)PDCCH candidate over multiple subframes within the (E)PDCCH window. Therefore, the (E)PDCCH WTRU-specific search space may be fixed over the (E)PDCCH window. Alternatively, although the same (E)PDCCH candidate may be used for the repetition, the WTRU-specific search space may be changed as a function of the subframe number. In another example, the (E)PDCCH candidate may be hopped in a predefined manner so that time/frequency diversity gain may be increased.

In another embodiment, in the PDSCH window, a WTRU may receive the PDSCH in the PDSCH window and one or more of the following methods may apply. In an example, the PDSCH may be repetitively transmitted in the same frequency resources within the PDSCH window. For instance, if a corresponding DCI for the PDSCH indicates that the PDSCH is located in specific PRBs, the PRBs may all be reserved within the PDSCH window. Therefore, if a WTRU receives the PDSCH, the WTRU may accumulate the signals in the specific PRBs for PDSCH decoding over multiple subframes within PDSCH window. In another example, the PDSCH may be repetitively transmitted in the frequency domain so that a WTRU may accumulate the PRBs in the frequency domain. Here, the repetition may be based on PRB level, and the same MCS level may be used. Therefore, a WTRU may integrate signals before demodulation.

In another example, the PDSCH may be repetitively transmitted in the time and frequency domains. Here, the frequency domain repetition may be based on the rate-matching operation, while the time domain repetition may be based on the data symbol repetition.

In another example, the PDSCH may be transmitted in a specific subframe only. Here, the DCI for a DL transmission transmitted in the (E)PDCCH window may include the subframe information as well as the frequency resource information for the PDSCH transmission. For example, if 4 subframes are used in a PDSCH window, two-bits may be used to indicate which subframe includes the PDSCH.

In another embodiment, in the A/N window, a WTRU may transmit an A/N in the A/N window if the WTRU received the PDSCH in the PDSCH window. In this case, one or more of the following methods may apply. In an example, the A/N resource may be allocated as a function of the resource index of the corresponding (E)PDCCH for the PDSCH transmission. For example, the first (E)CCE index of the (E)PDCCH may be used if the repetition-based (E)PDCCH is used. Alternatively, the A/N resource may be allocated as a function of the resource index and subframe number in which the corresponding (E)PDCCH is transmitted if the (E)PDCCH is transmitted only in a subframe within the (E)PDCCH window. For example, if 4 subframes are used in the (E)PDCCH window, the A/N resource may be allocated as a function of the subframe location within the (E)PDCCH window (e.g., 0, 1, 2, or 3), and the first (E)CCE index.

In another example, the A/N resource may be allocated as a function of the resource index of the PDSCH. For example, the first PRB index for the PDSCH may be used if repetition-based PDSCH is used. Alternatively, the A/N resource may be allocated as a function of the resource index and subframe in which the PDSCH is transmitted if the PDSCH is transmitted only in a subframe within the PDSCH window.

In another example, the A/N resource may be allocated as a function of the resource index of the PDSCH and corresponding (E)PDCCH. Here, the first (E)CCE index and the first PRB index may be used at the same time so that A/N resource collision may be avoided even though multi-user based (E)PDCCH and PDSCH transmission is used. In another example, the A/N may be transmitted repetitively within the A/N window. For instance, if a PUCCH resource is allocated, the WTRU may need to transmit the same A/N signal repetitively in the same A/N resource in every subframe during the A/N window. In another example, the A/N corresponding to a PDSCH may be transmitted only in a subframe. Therefore, the A/N resource may be allocated only in a subframe based on the (E)PDCCH and/or PDSCH resource used.

Described herein are applications for using a coverage enhancement mode. A WTRU may apply all embodiments and examples herein individually or in combination as part of a coverage enhancement mode of operation.

A WTRU may operate in coverage enhancement mode from power on, which may be indicated in its capabilities. For example, a WTRU may be pre-configured to start operating in coverage enhancement mode and, accordingly, may perform cell search, network access, (e.g., PRACH process, and other connected mode procedures based on the procedures as described herein instead of legacy, for example, Release 11 or earlier procedures.

A WTRU may switch between legacy operations and coverage enhancement mode and may indicate support for coverage enhancement mode to the network as part of its WTRU capabilities indication, for example, via RRC signaling.

A WTRU may switch from normal to coverage enhancement mode using one or more of the following methods. In an example, the WTRU may receive an indication to operate in coverage enhancement mode from the network. For example, the WTRU may receive an RRC reconfiguration message with PDCP, RLC, and MAC parameters with reduced SN sizes and other changes to the header configuration as described above.

In another example, the WTRU may measure and/or detect changes in environment such that a WTRU may no longer operate in normal mode and may begin operation in coverage enhancement mode. The WTRU may switch under one or more of the following example conditions. In an example, during cell selection/reselection, a WTRU may find a suitable cell under coverage enhancement conditions but not in normal operation conditions. For instance, the WTRU may not be able to meet the criteria of a suitable cell, as defined in SIB1 of a cell, but may meet the criteria of a suitable cell with coverage enhancements, as defined, for example, in the LC-MIB. In another example, if network access attempts and PRACH procedures fail in normal mode, the WTRU may switch to a coverage enhancement mode PRACH procedure as described herein. In another example, the WTRU may switch upon radio link failure detection and subsequent re-establishment to the serving cell. In another example, the WTRU may switch based on connected mode or IDLE mode measurements, the current serving cell RSRP/RSRQ falling below a certain threshold, or there being no neighbor cells whose measurements meet the criteria for handover or cell re-selection.

In another example, if PSS/SSS detection takes a longer time than a certain threshold, the WTRU may switch to coverage enhancement mode. The threshold may be defined as a time window, such as x-ms. In another example, the WTRU may not be able to properly acquire and decode the PBCH and/or the SIB1 and may be able to acquire the LC-MIB and may be able to acquire full or a subset of SFN through signals from the cell for coverage enhancement purposes as described herein. For example, the WTRU may continue with a cell access and connection establishment procedure, (e.g., an RRC connection request), in coverage enhancement mode if the WTRU acquires the necessary configuration, such as for random access through the LC-SIB and the SFN value, to determine the appropriate RACH resource to initiate the random access procedure.

In another embodiment, a WTRU may indicate the change to coverage enhancement mode and/or request to change to coverage enhancement mode to the network by using one or more of the following methods. In an example, a measurement report, which may include a request indication to change operation modes may be sent periodically or in response to an event trigger, as configured, for example, in the measurement object from the network. In another example, PRACH preambles may indicate to the network that the mode of operation of the WTRU has changed. In another example, an indication may be made in the RRC connection request or re-establishment that the WTRU may operate in a coverage enhancements mod. For example, this indication may be included as a cause IE in an RRC connection request or re-establishment request message.

In another embodiment, a WTRU may transition from a coverage enhancement mode back to normal operation mode using one or more of the following example methods. In an example, a WTRU may autonomously return back to a normal mode of operation upon detection of improved coverage conditions while in IDLE or connected mode. This detection may be done using one or more of the following methods. In an example, the WTRU may detect this improvement by acquiring legacy MIBs and/or SIBs using, for example, legacy procedures. In another example, the WTRU may be able to meet the suitable cell criteria as specified in SIB1 of a cell. For instance, this may be part of a cell selection procedure when the WTRU returns from connected to IDLE mode or as part of connection establishment for data transmission. In another example, random access procedures may be successful using legacy RACH procedures. For example, the WTRU may consider returning to normal operating conditions upon receiving a successful random access response from the eNB within X preamble re-transmissions. The threshold value X for preamble transmissions may be defined as the maximum number of preamble transmissions as defined in SIB2 or a separate value as configured by the cell and may be transmitted as part of RACH configurations in SIB2. In another example, based on measurements, the WTRU may detect improvements, for example, to RSRP measurement values. For example, the WTRU may provide a measurement report to an eNB indicating that RSRP has improved above a pre-defined threshold, indicating that normal operation mode may be possible. In another example, a WTRU may indicate detected improvements based on power headroom report (PHR) and the transmitted UL power. The trigger for a PHR to the eNB may be triggered by an improvement to measured pathloss, for example.

In another embodiment, a WTRU may, during RRC connection establishment, indicate its return to normal operation mode by using a normal, (e.g., Release 11), defined cause for an RRC connection request.

In another embodiment, the eNB may also detect coverage improvements for the WTRU, and the WTRU may be indicated to operate normally by an eNB. This may be done using one or more of the following methods. In an example, the WTRU may receive RRC reconfiguration with data radio bearer parameters for Release 11 or earlier configurations. In another method, the WTRU may receive an RRC connection release with an indication for normal operation mode such that the WTRU may perform cell selection to the same cell with, for example, normal Release 11 cell selection procedures and criteria. In another example, the WTRU may receive an RRC message for intra-cell handover with a dedicated RACH procedure. The WTRU may be able to verify improved coverage conditions with the contention free RACH procedure, and, additionally, the WTRU may reset the MAC, RLC, and PDCP layers for the traffic bearer to allow for a normal mode of operation.

Described herein are example methods of detection of improved coverage conditions in which an eNB may trigger the above signaling for a WTRU to return to normal operating mode. In an example, an eNB may detect that the number of HARQ retransmissions and RLC SDU retransmissions for each data packet that the WTRU in coverage enhancement mode needs to receive and/or transmit has decreased. The eNB may also detect the decreased BLER rate of the data bearer. In another example, the eNB may detect that the transmission power of the WTRU has decreased by a certain threshold based on the closed power control parameters provided to the WTRU for UL transmissions. In another example, the eNB may detect improved UL conditions based on measurements of the SRS, as transmitted by the WTRU.

Described herein are methods for multi-level coverage limitation indications. In an embodiment, a WTRU may indicate the coverage limitation level by using one or more of the following methods. In an example, a WTRU may report, or may be configured to report, a required repetition level for data, control, and/or broadcasting channels, including one or more of the PUSCH, the PDSCH, and the (E)PDCCH. For instance, if a WTRU required 'n' repetitions for the PDSCH for coverage enhancement, the WTRU may report the 'n' so that the eNB may determine the coverage limitation level of the WTRU. In another example, a WTRU may directly report RSRP measurements via higher layer signaling or UL control channels.

A WTRU in coverage enhancement mode may use one or more of the following modified radio link monitoring (RLM) and radio link failure (RLF) detection procedures. In an example, a WTRU may configure the $Q_{in}$ and/or $Q_{out}$ threshold values for in-sync and out-of-sync indications, respectively, as a function of the coverage enhancement mode and/or an amount of coverage enhancements for which the WTRU may be configured. The adjustment of $Q_{in}/Q_{out}$ threshold values for normal operation may be pre-defined according to the coverage enhancement amount or may be signaled to the WTRU by the network. The WTRU may reconfigure $Q_{in}/Q_{out}$ threshold values based on any reconfiguration of the coverage enhancement amount. For example, if the WTRU has been configured by the network to operate with a coverage enhancement amount corresponding to 15 dB of coverage enhancement gain, then the WTRU may use the RSRP values for $Q_{in}$ and $Q_{out}$ thresholds, which may be reduced by 15 dB or more.

In another example, a WTRU may configure $Q_{in}$ and/or $Q_{out}$ threshold values based on number of repetitions for the (E)PDCCH channel. The amount of adjustment to the $Q_{in}/Q_{out}$ thresholds may be a function of the number of (E)PDCCH repetitions or may be signaled explicitly from the network. A WTRU may configure the $Q_{in}$ and/or $Q_{out}$ threshold values based on certain channels that may be configured by the eNB with power spectral density (PSD) boosting. For example, the WTRU may decrease the RSRP value for $Q_{in}$ and/or $Q_{out}$ based on PSD boosting of the EPDCCH and/or PSS/SSS transmission from the cell.

In an example, a WTRU may configure the $Q_{in}$ and/or $Q_{out}$ condition period to a longer period than 100 ms and 200 ms, respectively, based on the amount of coverage enhancement. For example, the WTRU may extend the evaluation period based on the number of (E)PDCCH repetitions that is configured for the current coverage enhancement mode. The condition period may be pre-defined according to the number of (E)PDCCH repetitions or may be signaled by the network.

In an example, a WTRU may configure the $Q_{in}$ and/or $Q_{out}$ condition period based on an (E)PDCCH receive window length and whether a WTRU may correctly decode the (E)PDCCH during the receive window. For example, a WTRU in coverage enhancement mode may evaluate the $Q_{in}/Q_{out}$ conditions during one or multiple receive windows for decoding the (E)PDCCH. When a WTRU is successfully able to decode a (E)PDCCH addressed to it via any possible RNTI, (e.g., C-RNTI, RA-RNTI, Temporary C-RNTI), a WTRU may consider to have met the $Q_{in}$ threshold criteria and indicate in-sync to higher layers. A WTRU may be unable to correctly decode any (E)PDCCH during one or multiple receive windows, then the WTRU may consider the $Q_{out}$ condition to have been met and indicates an out-of-sync condition to higher layers. After a consecutive number of out-of-sync evaluations, for example, as defined by an N310 counter and configured by higher layers, the WTRU may declare radio link failure. After a consecutive number of in-sync evaluations, for example, as defined by N311, the WTRU may be considered to be in-sync with the network.

In another example, a WTRU may not perform RLM for detection of RLF based on physical layer issues. A WTRU may declare RLF based on indications from MAC for issues with random access and from RLC for reaching the maximum number of retransmissions.

Described herein is energy saving for LC-MTC in coverage enhanced mode. A WTRU in coverage enhancement mode may remain in connected mode and may be configured with a connected mode DRX configuration. In between small data transfers, the WTRU may move to inactive or sleep mode in order to conserve energy and reduce power consumption.

A WTRU in coverage enhancement mode may consider the following to be active time for connected mode DRX: subframes for expected (E)PDCCH reception, subframes for expected PDSCH reception based on DCI from (E)PDCCH, subframes for expected PHICH reception, subframes for expected PUCCH transmission and subframes for expected PUSCH transmission based on DCI from (E)PDCCH.

The WTRU may consider expected reception and/or transmission of the above channels to also include the repetitions configured for each channel. For example, the WTRU may use window based transmission and reception timing in coverage enhancement mode, and the corresponding active time for DRX may include the (E)PDCCH window, the PDSCH window, and the A/N window. The WTRU may move to inactive or sleep mode for a certain period of time when currently not in active time. The WTRU may consider one or more of the following instances to be opportunities for inactive/sleep mode: no data to transmit in buffer, remaining time of window based reception of channel in which data has already been received successfully, (e.g., the WTRU may configure the remaining time in the reception window of (E)PDCCH upon successfully receiving and decoding the DCI as an opportunity for inactive mode until the reception window ends), and gaps in between reception and transmission windows for the WTRU HARQ process based on reception and transmission windows for repetition.

The WTRU may, as part of coverage enhancement mode indication and/or configuration, provide its DRX capabilities to the network, which may include a preferred active and/or inactive time duration. The WTRU may indicate to the network its estimated data transmission periodicity such that the inactive time duration after data transmission may be properly configured such that the WTRU may have the opportunity to transmit and receive data at the appropriate time with excessive power consumption.

In general, a method for physical broadcast channel (PBCH) enhancement includes receiving system information at a wireless transmit/receive unit (WTRU) on an enhanced PBCH (ePBCH) from a base station. The ePBCH is located in a set of radio frames which is a subset of available radio frames. The subset includes fewer than all the available radio frames. The WTRU receives the ePBCH in at least one radio frame of the set of radio frames. The available radio frames in a system frame number (SFN) cycle include all radio frames in the SFN cycle. The WTRU may receive the ePBCH upon failing to receive a legacy PBCH. The WTRU may receive the ePBCH on determining a measurement is below a threshold. The WTRU may determine a system frame number (SFN) based on at least the at least one radio frame in which the ePBCH was received. The WTRU may determine a SFN based on at least the at least one radio frame in which the ePBCH was received and a physical cell ID. The WTRU may determine a SFN from at least an offset value in the ePBCH. The ePBCH may be located in a center six physical resource blocks. The multiple ePBCH transmissions may be received in a radio frame. The WTRU may receive at least two ePBCH transmissions in at least one radio frame, combine the received ePBCH and decode the system information from the combined ePBCH.

In general, a method for physical random access channel (PRACH) enhancement includes receiving configuration of legacy PRACH resources by a WTRU and receiving configuration of enhanced PRACH (ePRACH) resources by the WTRU. The WTRU selects one of legacy PRACH resources or ePRACH resources based on a coverage capability. The WTRU determines the coverage capability based on a measurement. The enhanced preamble is transmitted using the ePRACH resources.

In general, a method for physical random access channel (PRACH) enhancement includes receiving configuration of enhanced PRACH (ePRACH) resources, where the herein the ePRACH resources comprise multiple ePRACH resource types, and each ePRACH resource type is associated with a coverage capability. The ePRACH resource type may be distinguished from another ePRACH resource type by at least one of preamble format, preamble repetitions, time resource, and frequency resource. The WTRU selects an ePRACH resource type based on the WTRU's coverage capability and transmits an enhanced preamble using the selected ePRACH resource type. The enhanced preamble is at least a repetition of at least a portion of a legacy preamble. The WTRU determines the coverage capability based on a measurement. The enhanced preamble is transmitted using ePRACH resources.

In general, a method for physical random access channel (PRACH) enhancement includes receiving configuration of enhanced PRACH (ePRACH) resources, where the ePRACH resources comprise multiple ePRACH resource groups where each group is associated with a coverage capability. The WTRU selects an ePRACH resource group based on the WTRU's coverage capability and transmits an enhanced preamble using a resource from the selected ePRACH resource group. The enhanced preamble is at least a repetition of at least a portion of a legacy preamble. The WTRU determines the coverage capability based on a measurement. The enhanced preamble is transmitted using ePRACH resources. The enhanced preamble is at least a repetition of at least a portion of a legacy preamble. The enhanced preamble comprises multiple enhanced preamble types where each type is associated with a coverage capability.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a wireless transmit receive unit (WTRU), the method comprising:
receiving control information, wherein the control information indicates one or more physical shared channel resources to be used for a physical shared channel transmission;
receiving the physical shared channel transmission, wherein the physical shared channel transmission is received using the one or more physical shared channel resources; and
transmitting ACK or NACK (A/N) feedback for the physical shared channel transmission, wherein the A/N feedback is sent using a set of A/N resources that is determined based on a function of an index of the one or more physical shared channel resources in which the physical shared channel transmission was received, wherein the set of A/N resources is determined based on a beginning resource of the one or more physical shared channel resources.

2. The method of claim 1, wherein the set of A/N resources are at least one resource block of time and frequency.

3. The method of claim 1, wherein the set of A/N resources includes at least one resource block and at least one cyclic shift, wherein determining the at least one cyclic shift is based on information from higher layers.

4. The method of claim 3, wherein determining the at least one cyclic shift is based on information from higher layers.

5. The method of claim 1, wherein the A/N resources are not determined based on the control channel information or resources of a transmission that contained the control channel information.

6. A wireless transmit receive unit (WTRU) the WTRU comprising:
a processor;
a transceiver operatively connected to the processor, wherein the transceiver and processor are configured to receive control information, wherein the control information indicates one or more physical shared channel resources to be used for a physical shared channel transmission;
the transceiver and processor are configured to receive the physical shared channel transmission, wherein the physical shared channel transmission is received using the one or more physical shared channel resources; and
the transceiver and processor are configured to transmit ACK or NACK (A/N) feedback for the physical shared channel transmission, wherein the A/N feedback is sent using a set of A/N resources in which the physical shared channel transmission was received, wherein the set of A/N resources is determined based on a function of an index of the one or more physical shared channel resources, wherein the set of A/N resources is determined based on a beginning resource of the one or more physical shared channel resources.

7. The WTRU of claim 6, wherein the set of A/N resources are at least one resource block of time and frequency.

8. The WTRU of claim 6, wherein the set of A/N resources includes at least one resource block and at least one cyclic shift.

9. The WTRU of claim 8, wherein determining the at least one cyclic shift is based on information from higher layers.

10. The WTRU of claim 6, wherein the A/N resources are not determined based on the control channel information or resources of a transmission that contained the control channel information.

11. A wireless transmit receive unit (WTRU) the WTRU comprising:
a processor;
a transceiver operatively connected to the processor, wherein the transceiver and processor are configured to receive control information, wherein the control information indicates one or more physical shared channel resources to be used for a physical shared channel transmission;
the transceiver and processor are configured to receive the physical shared channel transmission, wherein the physical shared channel transmission is received using the one or more physical shared channel resources; and
the transceiver and processor are configured to transmit ACK or NACK (A/N) feedback for the physical shared channel transmission, wherein the A/N feedback is sent using a set of A/N resources in which the physical shared channel transmission was received, wherein the set of A/N resources is determined based on a function of an index of the one or more physical shared channel resources, wherein the set of A/N resources is determined based on a beginning resource of the one or more physical shared channel resources wherein the set of A/N resources are at least one resource block of time and frequency, wherein the set of A/N resources includes at least one resource block and at least one cyclic shift, wherein the at least one cyclic shift is determined based on information from higher layers.

* * * * *